United States Patent
Weaver et al.

(10) Patent No.: US 7,685,237 B1
(45) Date of Patent: Mar. 23, 2010

(54) MULTIPLE PERSONALITIES IN CHAT COMMUNICATIONS

(75) Inventors: Andrew Weaver, Herndon, VA (US); Kristine Amber Krantz, Cincinnati, OH (US); Eric Jeffrey Wolf, Arlington, VA (US); Julie McCool, Reston, VA (US); Julie Mills, Reston, VA (US); Brian D. Heikes, Ashburn, VA (US)

(73) Assignee: AOL Inc., Dulles, VA (US)

( * ) Notice: Subject to any disclaimer, the term of this patent is extended or adjusted under 35 U.S.C. 154(b) by 1190 days.

(21) Appl. No.: 11/252,890

(22) Filed: Oct. 19, 2005

Related U.S. Application Data

(63) Continuation-in-part of application No. 10/718,039, filed on Nov. 21, 2003, which is a continuation-in-part of application No. 10/305,015, filed on Nov. 27, 2002, and a continuation-in-part of application No. 10/334,027, filed on Dec. 31, 2002, and a continuation-in-part of application No. 10/334,128, filed on Dec. 31, 2002, and a continuation-in-part of application No. 10/334,129, filed on Dec. 31, 2002, now abandoned, application No. 11/252,890, which is a continuation-in-part of application No. 10/715,209, filed on Nov. 18, 2003.

(60) Provisional application No. 60/384,147, filed on May 31, 2002, provisional application No. 60/416,902, filed on Oct. 9, 2002, provisional application No. 60/427,941, filed on Nov. 21, 2002, provisional application No. 60/464,106, filed on Apr. 21, 2003, provisional application No. 60/488,399, filed on Jul. 21, 2003, provisional application No. 60/619,699, filed on Oct. 19, 2004.

(51) Int. Cl.
*G06F 15/16* (2006.01)
*G06F 12/00* (2006.01)

(52) U.S. Cl. ..................... 709/205; 709/250
(58) Field of Classification Search ......... 709/204–205, 709/216–218, 249–250
See application file for complete search history.

(56) References Cited

U.S. PATENT DOCUMENTS 5,388,202 A 2/1995 Squires et al.

(Continued)

FOREIGN PATENT DOCUMENTS

EP 1011248 A2 6/2000

(Continued)

OTHER PUBLICATIONS

Optimizing Linux's User Interface, Jeff Arnholt, Linux Journal, Issue 19, Specialized Sys. Consultants, Inc. 1995, p. 1-6.

(Continued)

*Primary Examiner*—Zarni Maung
(74) *Attorney, Agent, or Firm*—Fish & Richardson P.C.

(57) ABSTRACT

The same user is able to project different personalities while visiting different chat rooms. The personalities are tailored to the chat room being visited. Different personalization items (e.g., an icon or avatar, wallpaper, sounds, a smiley set, and text style) are provided based upon the chat room that the user is visiting. The personalization items may be customized based upon the identity of the chat room (such as a particular chat room, the type of chat room, or the content of the chat room). The personalization items may be host based and may leverage instant messaging ("IM") personalization items. The personalization items may be user selected or user provided.

29 Claims, 35 Drawing Sheets

U.S. PATENT DOCUMENTS

| | | | |
|---|---|---|---|
| 5,657,462 | A | 8/1997 | Brouwer et al. |
| 5,659,692 | A | 8/1997 | Poggio et al. |
| 5,675,752 | A | 10/1997 | Scott et al. |
| 5,745,556 | A | 4/1998 | Ronen |
| 5,793,365 | A | 8/1998 | Tang et al. |
| 5,812,126 | A | 9/1998 | Richardson et al. |
| 5,872,521 | A | 2/1999 | Lopatukin et al. |
| 5,880,731 | A | 3/1999 | Liles et al. |
| 5,894,305 | A | 4/1999 | Needham |
| 5,944,780 | A | 8/1999 | Chase et al. |
| 5,963,217 | A | 10/1999 | Grayson et al. |
| 6,128,618 | A | 10/2000 | Eliovson |
| 6,192,396 | B1 | 2/2001 | Kohler |
| 6,205,432 | B1 | 3/2001 | Gabbard et al. |
| 6,219,045 | B1 | 4/2001 | Leahy et al. |
| 6,248,946 | B1 | 6/2001 | Dwek |
| 6,252,952 | B1 | 6/2001 | Kung et al. |
| 6,301,609 | B1 | 10/2001 | Aravamudan et al. |
| 6,324,569 | B1 | 11/2001 | Ogilvie et al. |
| 6,346,952 | B1 | 2/2002 | Shtivelman |
| 6,373,817 | B1 | 4/2002 | Kung et al. |
| 6,389,028 | B1 | 5/2002 | Bondarenko et al. |
| 6,430,604 | B1 | 8/2002 | Ogle et al. |
| 6,434,599 | B1 | 8/2002 | Porter |
| 6,453,294 | B1 | 9/2002 | Dutta et al. |
| 6,487,584 | B1 | 11/2002 | Bunney |
| 6,633,850 | B1 | 10/2003 | Gabbard et al. |
| 6,671,682 | B1 | 12/2003 | Nolte et al. |
| 6,731,323 | B2 | 5/2004 | Doss et al. |
| 6,772,195 | B1 | 8/2004 | Hatlelid et al. |
| 6,784,901 | B1 | 8/2004 | Harvey et al. |
| 6,876,728 | B2 | 4/2005 | Kredo et al. |
| 6,961,755 | B2 | 11/2005 | Matsuda |
| 6,983,305 | B2 | 1/2006 | Danker et al. |
| 7,035,803 | B1 | 4/2006 | Ostermann et al. |
| 7,043,530 | B2 | 5/2006 | Isaacs et al. |
| 7,085,259 | B2 | 8/2006 | Wang et al. |
| 7,133,900 | B1 | 11/2006 | Szeto |
| 7,145,678 | B2 | 12/2006 | Simpson et al. |
| 7,194,542 | B2 | 3/2007 | Segan et al. |
| 7,216,143 | B2 | 5/2007 | Creamer et al. |
| 7,249,139 | B2 | 7/2007 | Chuah et al. |
| 7,343,312 | B2* | 3/2008 | Capek et al. ............. 705/8 |
| 7,363,246 | B1* | 4/2008 | Van Horn et al. ......... 705/26 |
| 2001/0030664 | A1 | 10/2001 | Shulman et al. |
| 2001/0054084 | A1 | 12/2001 | Kosmynin |
| 2002/0002542 | A1 | 1/2002 | Ando et al. |
| 2002/0054139 | A1 | 5/2002 | Corboy et al. |
| 2002/0059425 | A1 | 5/2002 | Belfiore et al. |
| 2002/0078153 | A1 | 6/2002 | Chung et al. |
| 2002/0113820 | A1 | 8/2002 | Robinson et al. |
| 2002/0119789 | A1 | 8/2002 | Friedman |
| 2002/0138286 | A1 | 9/2002 | Engstrom |
| 2002/0174026 | A1 | 11/2002 | Pickover et al. |
| 2002/0178206 | A1 | 11/2002 | Smith |
| 2002/0181009 | A1 | 12/2002 | Fredlund et al. |
| 2002/0184309 | A1 | 12/2002 | Danker et al. |
| 2003/0004967 | A1* | 1/2003 | Calderaro et al. ........ 707/104.1 |
| 2003/0037112 | A1 | 2/2003 | Fitzpatrick et al. |
| 2003/0088789 | A1 | 5/2003 | Fenton et al. |
| 2003/0140103 | A1 | 7/2003 | Szeto et al. |
| 2003/0160815 | A1 | 8/2003 | Muschetto |
| 2003/0182375 | A1 | 9/2003 | Zhu et al. |
| 2003/0191682 | A1* | 10/2003 | Shepard et al. ............ 705/10 |
| 2003/0204474 | A1* | 10/2003 | Capek et al. ............... 705/64 |
| 2003/0210265 | A1 | 11/2003 | Haimberg |
| 2004/0205480 | A1 | 10/2004 | Moore |
| 2005/0060198 | A1* | 3/2005 | Bayne ........................ 705/2 |

FOREIGN PATENT DOCUMENTS

| | | | |
|---|---|---|---|
| EP | 1130869 A1 | 5/2001 | |
| JP | 11355619 A | 12/1999 | |

OTHER PUBLICATIONS

David Kurlander et al., "International Conference on Computer Graphics and Interactive Techniques-Proceedings of the 23$^{rd}$ annual conference on Computer graphics and interactie techniques," *Comic Chat*, printed from http://portal.acm.org/citation.cfm?id=237260&coll=portal&d1=portal&CFID=3718856&CF . . . on Aug. 9, 2002, pp. 225-236.

Cerulean Studios, Trillian Help Center, Chapter 4, Section 1, printed from http://www.trillian.cc/help/sec-1.php?hchap=4&hsub=1 on Nov. 12, 2002, pp. 1-2.

Cerulean Studios, Trillian Help Center, Tutorials, Chapter 10, Section 5, printed from http://www.trillian.cc/help/sec-l.php?hchap=10&hsub=5 on Nov. 12, 2002, p. 1.

Cerulean Studios, Trillian Help Center, Tutorials, Chapter 10, Section 7, printed from http://www.trillian.cc/help/sec-1.php?hchap=10&hsub=7 on Nov. 12, 2002, pp. 1-2.

Pamela Parker, "Oct. 22, 2001—New Yahoo! Messenger Incorporates Viral Marketing", printed from http://siliconvalley.internet.com/news/article.php/908221 on Oct. 30, 2002, pp. 1-3.

InternetNews.com Staff, Apr. 17, 2002—IAR Bits and Bytes, "Yahoo! Debuts Purina IM Skin, Eagles Tour Promo," printed from http://www.intrnetnews.com/IAR/article.php/1011751 on Oct. 30, 2002, pp. 1-3.

Yahoo! Messenger, Yahoo! Help—IMVironments, printed from http://help.yahoo.com/help/us/mesg/imv/index.html on Oct. 30, 2002, p. 1.

Yahoo! Messenger, Yahoo! Help—IMVironments, printed from http://help.yahoo.com/help/us/mesg/imv/imv-04.html on Oct. 30, 2002, p. 1.

Yahoo! Messenger, Yahoo! Help—IMVironments, printed from http://help.yahoo.com/help/us/mesg/imv/imv-01.html on Oct. 30, 2002, p. 1.

Making your own Yahoo! Messenger IMVironments, printed from http://www.xcflabs.com/~yaroslav/imvironments/instructions.html on Oct. 30, 2002, pp. 1-2.

Bob Woods, Instant Messaging Planet: Public IM: IM—The Cat's Meow, printed from http://www.instantmessagingplanet.com/public/article/0,,10817_1011011,00.html. on Oct. 30, 2002, pp. 1-3.

Roy Santos, Tech TV/Review: Yahoo! Messenger 5.0, printed from http://www.techtv.com/products/print/0,23102,3351041,00.html on Oct. 30, 2002, pp. 1-2.

Rebecca Viksnins, First Look: Yahoo Messenger 5.0—Software Reviews—CNET.com, printed from http://www.cnet.com/software/0-5566362-8-7787365-1.html on Oct. 30, 2002, pp. 1-2.

ZDNet: Yahoo Messenger 5.0 Review, printed from http://www.zdnet.com/supercenter/stories/review/0,12070,538313,00.html on Oct. 30, 2002, pp. 1-3.

ZDNet: Yahoo Messenger 5.0 Overview, printed from http://www.zdnet.com/supercenter/stories/overview/0,12069,538313,00.html on Oct. 30, 2002, pp. 1-3.

Screenshot demonstration of Yahoo Messenger Help—IMVironments, Nov. 12, 2002, p. 1.

Screenshot Menu, Yahoo! Messenger Preferences, Nov. 12, 2002, p. 1.

Screenshot demonstration, karl_renner2002—Instant Message, Nov. 12, 2002, p. 1.

Yahoo: Messenger—IMVironments™, printed from http://messenger.yahoo.com/messenger/imv/index.html on Nov. 12, 2002, pp. 1-2.

Yahoo! Help—IMVironments, "How do I send an IMVironment to a friend?", printed from http://help.yahoo.com/help/us/mesg/imv/imv-04.html on Nov. 12, 2002, p. 1.

Yahoo!Messenger, Instantly communicate with all of your online friends . . . , printed from http://messenger.yahoo.com/ on May 24, 2002, p. 1.

Yahoo!Messenger—IMVironments™, List of Available IMVironments, printed from http://messenger.yahoo.com/messenger/imv/ on May 24, 2002, pp. 1-2.

Screenshot, nikebball87: AIM—nikebball87, printed from http://www.trillian.cc/skins/windowsxp.gif on May 14, 2002, p. 1.

Screenshot, Trillian 7 Skin: GoneBlue v.01, printed from http://www.trillian.cc/skins/goneblue.jpg on May 14, 2002, p. 1.

Screenshot, Dream Green, printed from http://www.trillian.cc/skins/DreamGreen.jpg on May 14, 2002, p. 1.

Screenshot, Trillian chosenOS, printed from http://www.trillian.cc/skins/chosen_trill.jpg on May 14, 2002, p. 1.

Netscape 7.0, Preview Release 1, Reviewer's Guide, May 17, 2002, chapter 2, "Internet Messaging," pp. 9-10 and "Instant Messaging with AIM (AOL Instant Messenger$^{SM}$)," pp. 16-18.

iPlanet Instant Messenger Release 3.0 Quick Reference, Oct. 2001, pp. 1-5.

Salem, B. et al.; "Designing a Non-Verbal Language for Expressive Avatars"; Collaborative Virtual Environments; University of Plymouth, ISBN: 1-58113-303-0; pp. 93-101 (2000).

\* cited by examiner

1400A

| Member 1 | Emotion | Action | Member Selected | Text | Chat Output | IM Output |
|---|---|---|---|---|---|---|
| Bob | Ecstatic | None | None | None | Bob is ecstatic! | |
| Bob | Ecstatic | None | None | Hi Room | Bob <bursting with excitement> Hi Room! | |
| Bob | Ecstatic | None | Steve | None | Bob trembles ecstatically at Steve | |
| Bob | None | Jump | None | None | Bob <jumps across the room> | |
| Bob | None | Jump | Steve | None | Bob <jumps across the room toward Steve> | |
| Bob | Ecstatic | Jump | None | None | Bob <ecstatically jumps across the room> | |
| Bob | Ecstatic | Jump | Steve | None | Bob <ecstatically jumps across the room toward Steve> | |
| Bob | Ecstatic | Jump | Steve | Hi Steve | Bob <jumping ecstatically to Steve> Hi Steve! | |
| Chris | Angry | None | None | None | Chris is angry. | |
| Chris | Angry | None | None | Bah humbug | Chris <grumpily mutters> Bah humbug. | |
| Chris | Angry | None | Dan | None | Chris <gives Dan a grumpy look> | |
| Chris | None | Frown | None | None | Chris <frowns in frustration. | |
| Chris | None | Frown | Dan | None | Chris <rowns at Dan> | |
| Chris | Angry | Frown | Dan | None | Chris <frowns angrily at Dan> | |
| Chris | Angry | Frown | Dan | Where's the beef? | Chris <frowning angrily at Dan> Where's the beef? | |

Fig. 14A

| Personalization Item | Chat | IM |
|---|---|---|
|  | Term x | Term y |
|  | Term a | Term b |
|  | Term c | Term d |
|  | Term e | Term f |
Fig. 14B

1500

1505

3000

Personality 1 — 3005
Personality 2 — 3010
Personality 3 — 3015
Personality 4 — 3020
Personality 5 — 3025
Personality 6 — 3030
Personality 7 — 3035
Personality 8 — 3040
Personality 9 — 3045
Personality 10 — 3050
Personality 11 — 3055

Snag MattKellyM's Personality — 3060
My Personalities — 3065

MULTIPLE PERSONALITIES IN CHAT COMMUNICATIONS

CROSS REFERENCE TO RELATED APPLICATIONS

This application is a continuation-in-part of U.S. application Ser. No. 10/718,039, filed Nov. 21, 2003, and titled "Chat Personalization," which is a continuation-in-part of U.S. application Ser. No. 10/305,015, claims filed Nov. 27, 2002, Ser. No. 10/334,027, filed Dec. 31, 2002, Ser. No. 10/334,128, filed Dec. 31, 2002, and Ser. No. 10/334,129, filed Dec. 31, 2002 now abandoned and which claims priority from U.S. Provisional Application No. 60/384,147, filed May 31, 2002 and U.S. Provisional Application No. 60/416,902, filed Oct. 9, 2002, all of which are incorporated by reference in their entirety. This application also is a continuation-in-part of U.S. application Ser. No. 10/715,209, filed Nov. 18, 2003, and titled "Multiple Personalities" that claims priority from U.S. Provisional Application No. 60/427,941, filed Nov. 21, 2002, U.S. Provisional Application No. 60/464,106, filed Apr. 21, 2003, and U.S. Provisional Application No. 60/488,399, filed Jul. 21, 2003, all of which are incorporated by reference in their entirety. This application claims the benefit of U.S. Provisional Application No. 60/619,699, filed Oct. 19, 2004, and titled "Multiple Personalities in Chat, and Context-Customization of Personalization Items for a Chat Identity," which is incorporated by reference in its entirety.

TECHNICAL FIELD

This description relates to chat communications.

BACKGROUND

Online service providers facilitate access to information and services by providing interactive user interfaces (UIs) that help users navigate to desired resources. For example, in the case of a system for communicating using chat messages, a UI allows a chat participant to invoke actions, such as establishing a communications link, through the selection of screen objects such as icons, windows, and drop-down menus. A chat participant may select a chat room to exchange chat messages with other chat participants. A chat room may be associated with subject matter.

SUMMARY

A method, performed at least partially on a computer, for enabling perception of a personalization item in a chat communication session is presented. The method may include receiving an indication of an identity of a chat communication session in which a chat user is to participate. Next, the method may include selecting one or more of the personalization items based upon the identity of the chat communication session and an identity of the chat user. Finally, the method may include enabling rendering of the selected personalization items in a chat application.

In another implementation, a computer-implemented method for enabling perception of multiple online personas in chat communication sessions is presented. The method may include first receiving an identity of a first chat communication session. Then the method may include selecting a first persona of a user from among at least two personas of the same user. The selection is based on the identity of the first chat communication session. Finally, the method may include enabling the first persona of the user to be projected in the first chat communication session. Each persona comprises personalization items and the first persona differs from each of the other personas of the user.

In yet another implementation, the method may include receiving an identity of a second chat communication session. Then, the method may include selecting a second persona of a user from among the at least two personas of the same user. The selection is based on the identity of the second chat communication session. Finally, the method may include enabling the second persona of the user to be concurrently projected in the second chat communication session.

A computer program product tangibly embodied in a computer-readable medium also is presented. The computer program product may include instructions that, when executed, generate a graphical user interface on a display device of a computing or communication device that enables perception of communications that leverage a chat platform. The instructions may include instructions for rendering a chat application user interface for a chat communication session involving at least a chat user and a second chat participant. The user interface may be presented at a system display presented to the chat user. The instructions also may include instructions for selecting a personalization item associated with the chat user based upon an identity of the chat communication session. The instructions also may include instructions for receiving the selected personalization item presented to the system display. The selected personalization item corresponds to an identifier obtained by a chat user system and the identifier enables identification of the selected personalization item of the chat user. The instructions also may include instructions for rendering the selected personalization item independently of a message used to obtain the identifier.

Other features will be apparent from the following description, including the drawings, and from the claims.

DESCRIPTION OF DRAWINGS

FIGS. 6-13, 14A, 14B, 15, and 20 are illustrations of different graphical user interfaces that may be implemented by systems such as those of FIGS. 1-4 when executing processes such as those of FIGS. 5A, 5B, 16-19, and 21-25.

Like reference symbols in the various drawings indicate like elements.

DETAILED DESCRIPTION

Figure 1:
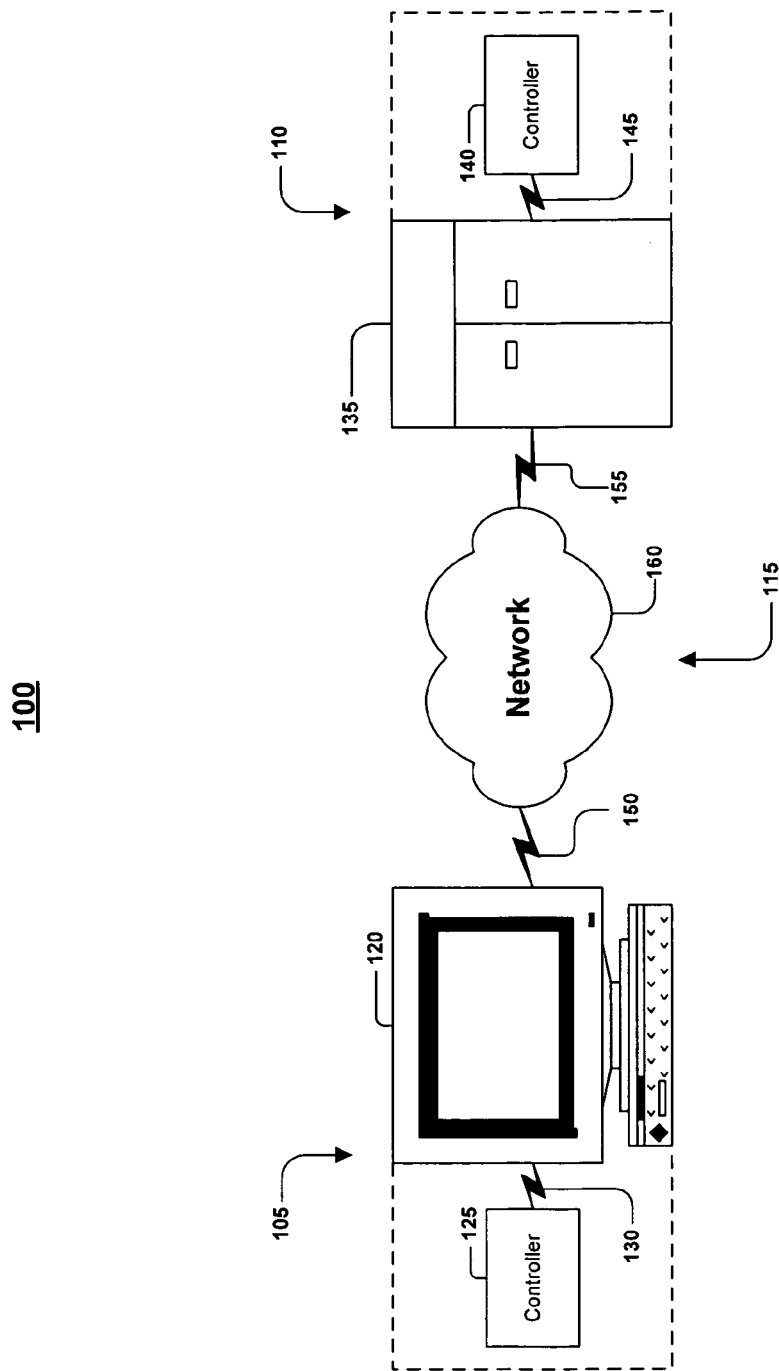
FIGS. 1-4 are block diagrams of an exemplary communications system.

The same user is able to project different personalities while visiting different chat rooms. The personalities may be tailored to the chat room being visited. Different personalization items (e.g., an icon or avatar, wallpaper, sounds, a smiley set, and text style) are provided based upon the chat room that the user is visiting. The personalization items may be customized either directly or indirectly. Personalization items may be directly customized and triggered, based upon the identity of the chat room the user is visiting (such as a particular chat room, the type of chat room, or the content of the chat room). Upon entering a particular chat room, individual personalization items may automatically be selected, and projected, for the user. For example, upon entering a football chat room, particular and individual personalization items may be selected for the user, such as an icon depicting a football helmet, wallpaper depicting a football field, or a smiley set that includes footballs smiling, frowning, and making other faces. A set of one or more personalization items (collectively called a "personality" or "persona") may also be customized, and triggered, based upon the identity of the chat room (such as a particular chat room, the type of chat room, or the content of the chat room). For example, a sports persona, including a set of sports-related personalization items may be automatically provided when the user is participating in a sports chat room, and a film persona including a set of film-related personalization items may be are provided when the user is participating in a film chat room.

Personas (and/or individual personalization items) may be automatically provided based on an association made by a chat user between a persona (and/or individual personalization items) and a chat room identity or other trigger related to chat room. For example, a user may associate a sports persona with a chat room having a sports identity, but the same user may associate one or more individual personalization items related to film, such as a film reel icon, with a chat room having a film identity. Personas and individual personalization items also may be automatically provided based solely on an identity of a chat room. For example, when a particular or any user enters a football chat room, the user's wallpaper personalization item may change to depict a football field. In another example, when any user enters a gardening chat room, the user's avatar may be animated to hold a flower and pretend to water it with a gardening can.

The personalization items may be host based. For example, personalization items may be stored at a host, such as a computer that houses a chat communication system, rather than being stored at a client, such as a home or office computer associated with a user. The personalization items also may leverage instant messaging ("IM") personalization items. In other words, the same personalization items projected by a user when engaging in instant message communications also may be projected when the user visits a chat room. For example, a user may project a personalization item including a football helmet icon while instant messaging another user. However, when the user enters a chat room, the football helmet icon also may be projected in the chat room. The personalization items may be user-selected or user-provided.

Related to the notion of allowing a chat participant, also referred to as a chat application operator or chat user, to supplement their identity with personalization items, but which does not explicitly address multiple different personalities, is the notion that personalization items are selected based on context or identity of the chat room.

To fully understand the techniques presented in this description, a discussion of personalization items for chat participants is now presented. A first chat participant may have personalization items that may be sent or otherwise made perceivable to a second chat participant. Personalization items may represent a user or a characteristic of a user, and may include user-selectable binary objects. A personalization item may also be referred to as a self-expression item. For example, personalization items include images such as wallpaper that is rendered in a location having a contextual placement on a user interface. The contextual placement typically indicates an association with the user represented by the wallpaper. For example, the wallpaper may be rendered in an area where messages from a particular user represented by the wallpaper are sent or received. In one implementation, wallpaper is a (border (e.g., chrome) around a dialog area on a user interface. Personalization items also may include icons, avatars, sounds, animation, video clips, and emoticons (e.g., smileys).

An avatar item is one example of the type of personalization item that may be included in a chat user's personality. An avatar is similar to an icon used to represent the chat user, but avatars are three-dimensional, whereas icons are merely two-dimensional. An avatar may have dimensions, such as height, width, and color. Although both icons and avatars can be animated, avatars are capable of more detailed animation and can be animated in response to various triggers. The first trigger that may cause an avatar to be animated is a specific word in a text message sent by a chat user during a chat communication session. When a send or enter button in the chat room user interface is activated by the chat user, chat room application searches the text of the message for animation triggers. When an animation trigger is identified, the avatar is animated with an animation associated with the identified trigger. By way of example, the text of a message may include a character string "LOL," which is an acronym that stands for "laughing out loud." The character string "LOL" may trigger an animation in the avatar such that the avatar appears to be laughing. The avatar may be animated by triggers in text entered by the chat user, as well as text entered by other chat users communicating in the chat room. Additional triggers include a request by the chat user (e.g., inviting a participant in the current chat room to join the chat user in a different, private chat room), detection of an idle period (e.g., the avatar may be animated to appear to be asleep if the chat user has not entered text in the chat room for a certain amount of time), or reflection of the chat user's other activity or current location (e.g., if music is playing on the chat user's computer, the avatar may be animated to sing, dance, or put on headphones; if it is raining at the chat user's location, the avatar may be animated to put up an umbrella). In some implementations, an avatar may have accessories associated with the avatar. For example, an avatar may hold an object or wear clothing. The object and/or clothing may change depending on the same, or different, triggers that cause the avatar to be animated. In one example, if it is raining, an avatar may be animated to hold an umbrella or wear a rain slicker. In another example, an avatar may be animated to wear sunglasses or a leather jacket to indicate that the avatar is cool. In yet another example, an avatar may be animated to sometimes hold a sword and sometimes hold a shield. In addition to being triggered by animation triggers, accessories associated with an avatar also may be triggered when a user enters a particular chat room, chats with a particular other chat participant, or the user explicitly selects a change in the accessories associated with the avatar.

One or more personalization items may be rendered at the first chat participant system and/or at one or more second chat participant systems. Personalization items associated with a first chat participant may be made available to the one or more second chat participant systems ("second chat participant system") by sending one or more identifiers corresponding to the personalization items to the one or more second chat participants ("second chat participant"). An identifier may be associated with a single personalization item, or with a group of two or more personalization items. A group of one or more personalization items that are associated with a chat participant may be referred to as a "personality" or "persona." of the user the second chat participant system uses the identifier to identify the personalization item associated with the sender, and to locate perceivable content corresponding to the identifier. For instance, an identifier received from a sender may be used as a basis for determining if the corresponding personalization item is available locally at the second chat participant system, and, if so, the identifier may be used to retrieve the corresponding personalization item. If the personalization item is not available locally at the second chat participant system, the second chat participant system may use the identifier as a basis for generating one or more requests for the personalization item from another location, such as a chat host system or another remotely-accessible data store such as the first chat participant system, or a remote or third-party server (e.g., a server accessible through the Internet).

In another implementation, a chat message from the first chat participant does not contain an identifier of personalization items associated with the first chat participant, and the second chat participant system retrieves one or more identifiers associated with the personalization items of the first chat participant. For example, the second chat participant system may retrieve the identifiers from a remote location such as a chat host system or another remotely-accessible data store such as those noted above. The identifiers may be stored at the remote location and associated with a screen name or other user identity. The second chat participant system may send a screen name or other user identity to the remote location. The remote location associates the screen name or other user identity with the corresponding identifiers, and sends those identifiers to the second chat participant system. For instance, the chat host may store identifiers associated with the screen name of a first chat participant. The second chat participant system passes the screen name of the first chat participant to the chat host, and the chat host returns the identifiers associated with that screen name to the second chat participant system. In another implementation, the chat host system or other remotely accessible data store may retrieve and send the personalization items themselves rather than the identifiers.

In another example in which the chat message from the first chat participant does not contain an identifier of personalization items, the second chat participant system may locally store the identifiers in association with a screen name or other user identity. The second chat participant system may then retrieve the locally-stored identifiers based on the screen name or other user identity of the first chat participant. In another implementation, the second chat participant system may retrieve the personalization items themselves rather than the identifiers.

The identifiers may be retrieved before, during, or after receipt of a chat message from the first chat participant. The identifiers may be stored at the second chat participant system, or at another location, such as a chat host system or another remotely-accessible data store such as those noted above. Alternatively, the personalization item itself may be sent by the first chat participant system to the second chat participant system, with a message or through a separate negotiation or communication, and also may be stored locally on the second chat participant system. Upon locating or receiving the personalization item, the second chat participant system renders the item for perception by the second chat participant.

In yet another implementation, second chat participant personalization items may be made available to the first chat participant system by selecting one or more identifiers corresponding to the one or more personalization items of the second chat participant. The personalization items may be selected manually by the second chat participant or may be automatically selected for the second chat participant. The identifiers may be associated with a screen name or other identifying information of the second chat participant. For example, the identifiers associated with the screen name of a potential second chat participant may be stored locally at the first chat participant system, or the first chat participant system may retrieve such identifiers from a remotely-accessible data store such as the chat host system, the second chat participant system, or those noted above. The first chat participant system uses the identifier to determine if the corresponding personalization item is available locally at the first chat participant system, and, if so, the first chat participant system retrieves the corresponding personalization item. If the personalization item is not available locally at the first chat participant system, the first chat participant system requests the personalization item from a remotely-accessible data store, as described above. Alternatively, the personalization item itself may be associated with the second chat participant and retrieved by the first chat participant system. Once the first chat participant system locates or receives the one or more personalization items associated with a destination recipient, the first chat participant system renders the one or more personalization item(s) for perception by the first chat participant. Thus, the personalization items of the second chat participant may be rendered to the first chat participant before correspondence is initiated or communications are established by the recipient and without previously having received a chat message from the second chat participant.

In another implementation, first chat participant personalization items may be made available to the first chat participant system and rendered at the first chat participant system by selecting the identifiers corresponding to the personalization items of the first chat participant. The personalization items may be selected manually by the first chat participant or may be automatically selected for the first chat participant. The identifiers may be associated with a screen name or other identifying information of the first chat participant. For example, the identifiers may be associated with the screen name of the first chat participant and stored locally at the first chat participant system, or the first chat participant system may retrieve the identifiers associated with the screen name of the first chat participant from another location such as the chat host system or another remotely-accessible data store such as those noted above. The first chat participant system uses the identifier to determine if the corresponding personalization item is available locally at the first chat participant system, and if so, the first chat participant system retrieves the corresponding personalization item. If the personalization item is not available locally at the first chat participant system, the first chat participant system requests the personalization item from a remotely-accessible data store, as described above. Alternatively, the personalization item itself may be associated with the first chat participant and retrieved by the first chat participant system.

Once the first chat participant system locates or receives the one or more personalization items associated with a destination recipient, the first chat participant system renders the one or more personalization items for perception by the first chat participant. Thus, the personalization items of the first chat participant may be rendered to the first chat participant similarly to the manner in which the personalization items of the first chat participant are rendered to the second chat participant. Also, the personalization items of the second chat participant may be rendered to the second chat participant in the manner described for rendering the personalization items of the first chat participant to the first chat participant.

A personalization item may be rendered at any time. Typically, a personalization item is rendered upon the occurrence of one or more particular events. For example, a customized sound, a personalized wallpaper, an icon and/or an avatar, selected by a first chat participant may be made perceivable to a second chat participant during a chat conversation. In one instance, wallpaper selected by the first chat participant appears on the second chat participant system when a chat message is received from the first chat participant or when a chat message is returned to the first chat participant by the second chat participant. As another example, a particular sound is played or an icon or avatar is displayed at the second chat participant system when the first chat participant's presence state changes (e.g., when the first chat participant logs on, logs off, becomes inactive, enables or disables the second chat participant's ability to detect the first chat participant's presence, or enters or leaves a particular chat room).

Chat personalization items may be rendered for a first chat participant and/or a second chat participant at the first chat participant system, the second chat participant system, or both. The chat personalization items of the first chat participant and the second chat participant may be rendered at the same time or at different times. The same method may be used to render the chat personalization items of the first chat participant and/or the second chat participant at the first chat participant system, the second chat participant system, or both. Alternatively, different methods may be used to render these chat personalization items. In one implementation, a second chat participant may not change the personalization items of a first chat participant, and a first chat participant may not change the personalization items of a second chat participant. A first chat participant may choose to have different personalization items displayed for different second chat participants, and a second chat participant may choose to have different personalization items displayed for different first chat participants. Once a personalization item is designated by a first chat participant or a second chat participant, the personalization item is typically made available for perception by the second chat participant or the first chat participant automatically. The personalization items may also be selected automatically for a first chat participant or a second chat participant based upon a characteristic of the first chat participant or the second chat participant.

Chat users may assemble multiple personalization items into a collective "persona" or "personality." As discussed above, personalization items include icons or avatars, wallpaper, sounds, smileys, and even animations or video clips. In addition to these personalization item types, a set of features or functionalities may be associated with a persona. For example, features such as encrypted transmission, chat communication session logging, and forwarding of chat communications to an alternative communication system may be enabled for a given persona. Moreover, personas may be assigned, established and/or associated with other settings, such that a particular persona may be projected based on time-of-day, geographic or virtual location, or even characteristics or attributes of each (e.g., cold persona for winter in Colorado or chatting persona while participating in a chat room). A persona may be saved and optionally associated with one or more customized names.

A particular chat room has an identity. An identity of a chat room may be determined by the title of the chat room or a category in which the chat room is associated. A chat room may have an identity related to a category subject matter discussed in the chat room. For example, a chat room may be used to discuss professional football or may be associated with a sports category. The chat room may also have an identity based on the subject matter included in the messages being exchanged in the chat room. For example, if a chat user is in a football chat room, but the conversation turns to gardening, the chat room identity may reflect gardening in addition to, or in lieu of, football or sports. In another example a chat room identity may relate to a type of chat room other than a type based on subject matter. For example, a chat room may host a question-and-answer session with an expert or celebrity and, in such a case, the chat room may have a different, or an additional, identity than a chat room where users communicate among themselves. Additionally, the identity of a chat room may depend on the type of language allowed in the room, including, for example whether adult language is permitted.

Chat users may be able to assign multiple personalization items and functions to a particular persona for projection when participating in a chat communications session in a chat room. A persona of a chat user may be associated with one or more particular chat rooms, either in advance of entering a chat room or "on-the-fly" during a chat communication session. This allows the user to project different personas while participating in different chat rooms.

Chat personalization items may be rendered by any type of hardware, software, device, computer, computer system, equipment, component, program, application, code, or storage medium. In one implementation, the chat personalization items may be rendered in a client/host context, and the chat personalization items may be accessed or updated through a remote device in a client/host environment. In another implementation, the chat personalization items may be implemented in a standalone or offline client context. The chat personalization items may be rendered by the standalone/offline device and may be accessed or updated through a remote device in a non-client/host environment such as, for example, a LAN (Local Area Network) server serving an end user or a mainframe serving a terminal device.

Typically, chat communications involve an instantaneous or nearly instantaneous communication between two or more users, where each user is able to transmit, receive and display communicated information. Additionally, chat communications may involve the display and perception of online presence information regarding other users present in the chat room. However, chat communications may occur in the absence of online presence information. The chat communications may be machine-to-machine communications that occur without intervention by or communication through a chat server after a communication session is established or authentication is performed. Examples of chat communications exist over AOL (America Online), Yahoo, and MSN, among others. Although discussed below primarily with respect to chat applications, other implementations are contemplated for providing similar functionality in platforms and online applications such as e-mail, and streaming media applications.

Figure 2:
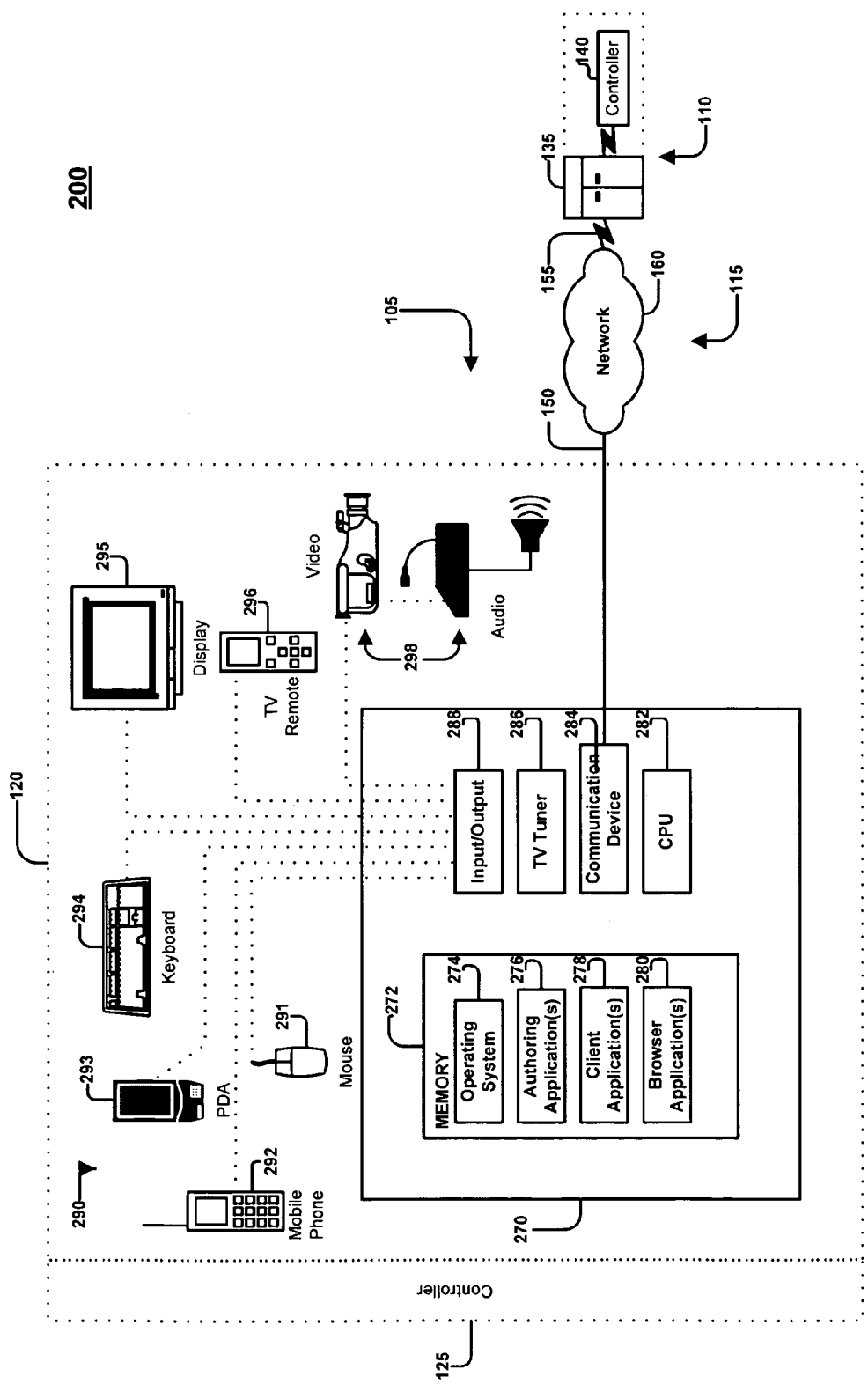

For illustrative purposes, FIGS. 1 and 2 show an example of a communications system for implementing techniques for transferring electronic data. For brevity, several elements in the figures described below are represented as monolithic entities. However, as would be understood by one skilled in the art, these elements each may include numerous interconnected computers and components designed to perform a set of specified operations and/or may be dedicated to a particular geographic region.

Referring to FIG. 1, a communications system 100 is capable of delivering and exchanging data between a first chat participant system 105 and a host system 110 through a communications link 115. The first chat participant system 105 typically includes one or more client devices 120 and/or client controllers 125, and the host system 110 typically includes one or more host devices 135 and/or host controllers 140. For example, the first chat participant system 105 or the host system 110 may include one or more general-purpose computers (e.g., personal computers), one or more special-purpose computers (e.g., devices specifically programmed to communicate with each other and/or the first chat participant system 105 or the host system 110), or a combination of one or more general-purpose computers and one or more special-purpose computers. The first chat participant system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, or storage medium capable of providing instructions to the client device 120 and the host device 135.

The communications link 115 typically includes a delivery network 160 that provides direct or indirect communication between the first chat participant system 105 and the host system 110, irrespective of physical separation. Examples of a delivery network 160 include the Internet, the World Wide Web, WANs, LANs, analog or digital wired and wireless telephone networks (e.g., Public Switched Telephone Network (PSTN), Integrated Services Digital Network (ISDN), and a type of Digital Subscriber Line (DSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including a first chat participant system 105 communicating with a host system 110 through a communications link 115.

The first chat participant system 105 includes a client device 120 that typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing programs, database programs, spreadsheet programs, or graphics programs) capable of generating documents or other electronic content; client applications 278 (e.g., America Online (AOL) client, CompuServe client, AOL Instant Messenger (AIM) client, interactive television (ITV) client, Internet Service Provider (ISP) client, chat client or instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed on the internal or external storage 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125, and a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 optionally includes a television ("TV") tuner 286 for receiving television programming in the form of broadcast, satellite, and/or cable TV signals. The TV tuner 286 permits the client device 120 to selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant (PDA) 293, an MP3 player (not shown), a keyboard 294, a display monitor 295 with or without a touch screen input, a TV remote control 296 for receiving information from and rendering information to users, and an audio-visual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the first chat participant system 105 may include one, some or all of the components and devices described above.

Figure 3:
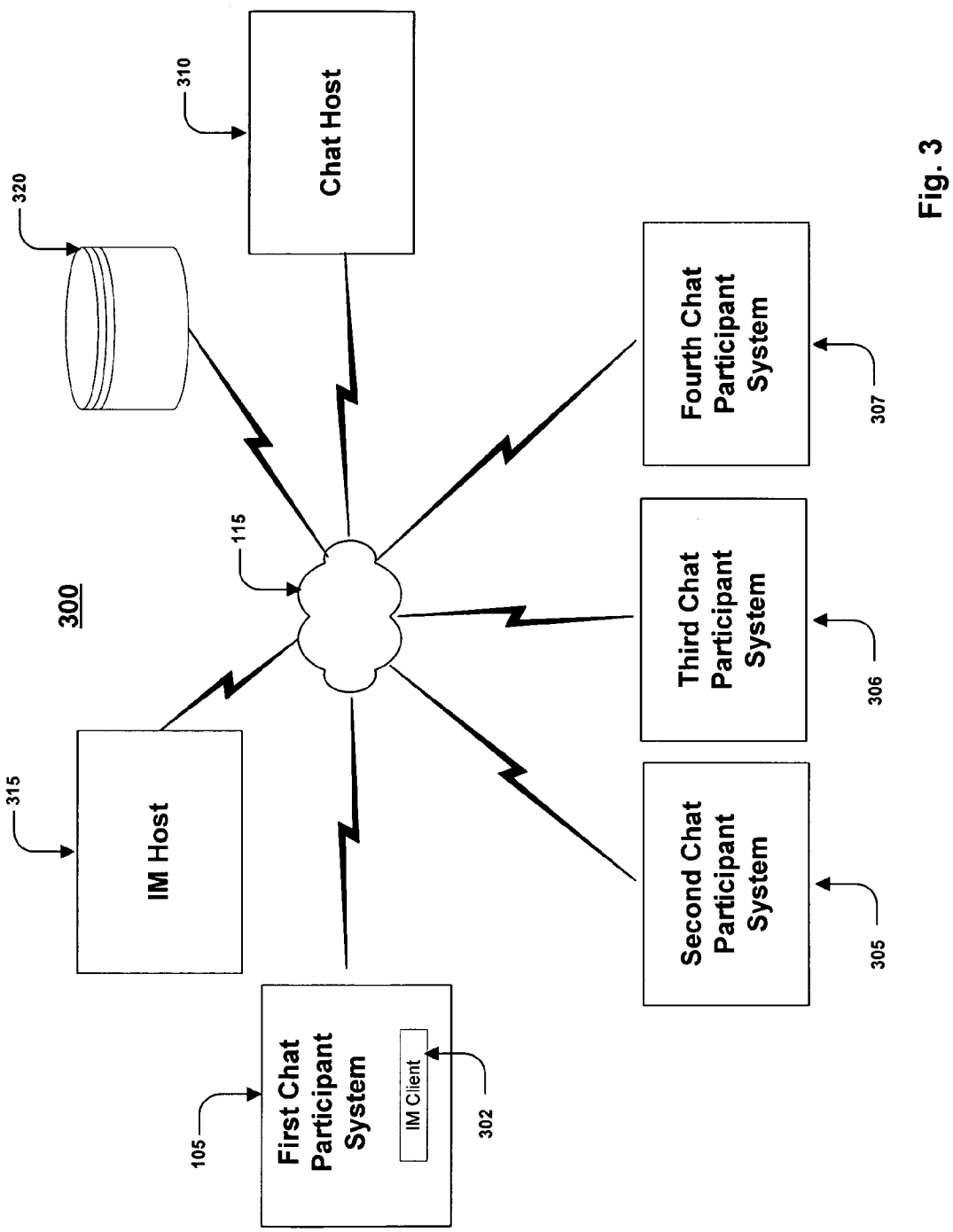

FIG. 3 illustrates a communications system 300 that supports a chat service including a first chat participant system 105 communicating with one or more other chat participant systems 305, 306, 307 and a chat host system 310 through a communication link 115. Chat system users may be distributed geographically and communicate with the chat host system 310 using chat participant systems, such as second chat participant system 305, third chat participant system 306, or fourth chat participant system 307. Second chat participant system 305 runs chat client software that communicates with a corresponding chat host software on chat host system 310, by way of a browser or otherwise. Chat host system 310 coordinates chat sessions by receiving the textual, or other, input sent from a first chat participant system 105 or a second chat participant system 305 and replicating that input to other systems such as a second chat participant system 305 or first chat participant system 105, as appropriate. Such a communications system may be used by users of chat service providers, such as, for example, AOL, Yahoo, and MSN.

In one implementation, the chat host system 310 may have characteristics similar to those described above with respect to the host system 110, the second chat participant system 305 may have characteristics similar to those described above with respect to the first chat participant system 105, and the first chat participant system 105 and the second chat participant system 305 may include communication software to enable users of the client systems to access the chat host system 310.

The chat host system 310 may support chat services irrespective of a first chat participant's network or Internet access. Thus, the chat host system 310 may allow users to send and receive messages, regardless of whether they have access to any particular ISP. The chat host system 310 also may support associated services, such as administrative matters, advertising, directory services, chat, and interest groups related to the chat. The chat host system 310 has an architecture that enables the devices (e.g., servers) within the chat host system 310 to communicate with each other. To transfer data, the chat host system 310 employs one or more standard or exclusive chat protocols.

To access the chat host system 310 to begin a chat session in the implementation of FIG. 3, the first chat participant system 105 establishes a connection to the chat host system 310. Once a connection to the chat host system 310 has been established, the first chat participant system 105 may directly or indirectly transmit data to and access content from the chat host system 310. By accessing the chat host system, a first chat participant can use the chat client application to view which other users (e.g., a "people here list") are online in the chat room, and/or, exchange messages with the other users in the chat room. The user also may be supplied with other capabilities, such as the ability to trade files such as pictures, invitations or documents, find other users with similar interests, get customized information (such as news and stock quotes), and search the Web. The second chat participant system 305 may be similarly manipulated to establish a contemporaneous connection with chat host system 310.

Once connectivity is established, a first chat participant who is using the first chat participant system 105 may view whether a second chat participant using the second chat participant system 305 is online, and typically may view whether the second chat participant is able to receive messages. If the second chat participant is online, the first chat participant may exchange messages with the second chat participant.

In one implementation, the messages sent between first chat participant system 105 and second chat participant system 305 are routed through chat host system 310. In another implementation, the messages sent between first chat participant system 105 and second chat participant system 305 are routed through a third party server (not shown), and, in some cases, are also routed through chat host system 310. In yet another implementation, the messages are sent directly between first chat participant system 105 and second chat participant system 305.

In one implementation, personalization items may be leveraged from an instant messaging host 315 or an instant messaging client 302 by a chat participant, such as first chat participant 105. The personalization items may be accessed, stored, retrieved, edited, or otherwise manipulated from a data repository designated for an instant messaging system. For example, the personalization items may be stored in a data storage 320. Data storage 320 may be located in a host system such as the IM host 315, the chat host 310, or a different host system such as a host system accessible through the Internet. The data storage may also be located in a chat sender system such as first chat participant system 105, second chat participant system 305, third chat participant system 306, or fourth chat participant system 307, and may be accessible through a client such as an instant messaging client 302 or a chat client.

IM profiles for particular users may be stored in a data repository, which may be the same data repository or a different data repository than the data repository used to store the personalization items. The data repository storing the IM profiles may be used to determine how to personalize the chat environment.

As discussed below with respect to FIGS. 14A and 14B, a mapping may be made between the chat personalization items, opportunities, and settings and IM personalization items, opportunities, and settings. The mapping enables something defined in IM for a particular context encountered in IM to be used for a different context in chat, or vice versa. For example, presence in IM may be defined as the use of the IM application by a user, whereas presence in chat may be defined as participation in a chat room. Therefore, the IM personalization item, such as a sound of a door opening, for becoming present in the IM context may be applied to chat. However, the application in chat for becoming present is not beginning to use the chat application by the user, but instead for entry into one of several chat rooms. The mapping may be modified, for example, by the user or by a-system administrator.

In one implementation, different sets of personalization items may be used for different chat rooms, as appropriate. For example, the first chat participant may designate a set of personalization items to be used in a sports chat room and a different set of personalization items to be used when participating in an arts and entertainment chat room. These sets of personalization items may be stored in a data store, such as data store 320 so as to be associated with the particular chat participant and the particular chat room context where they are to be used.

Figure 4:
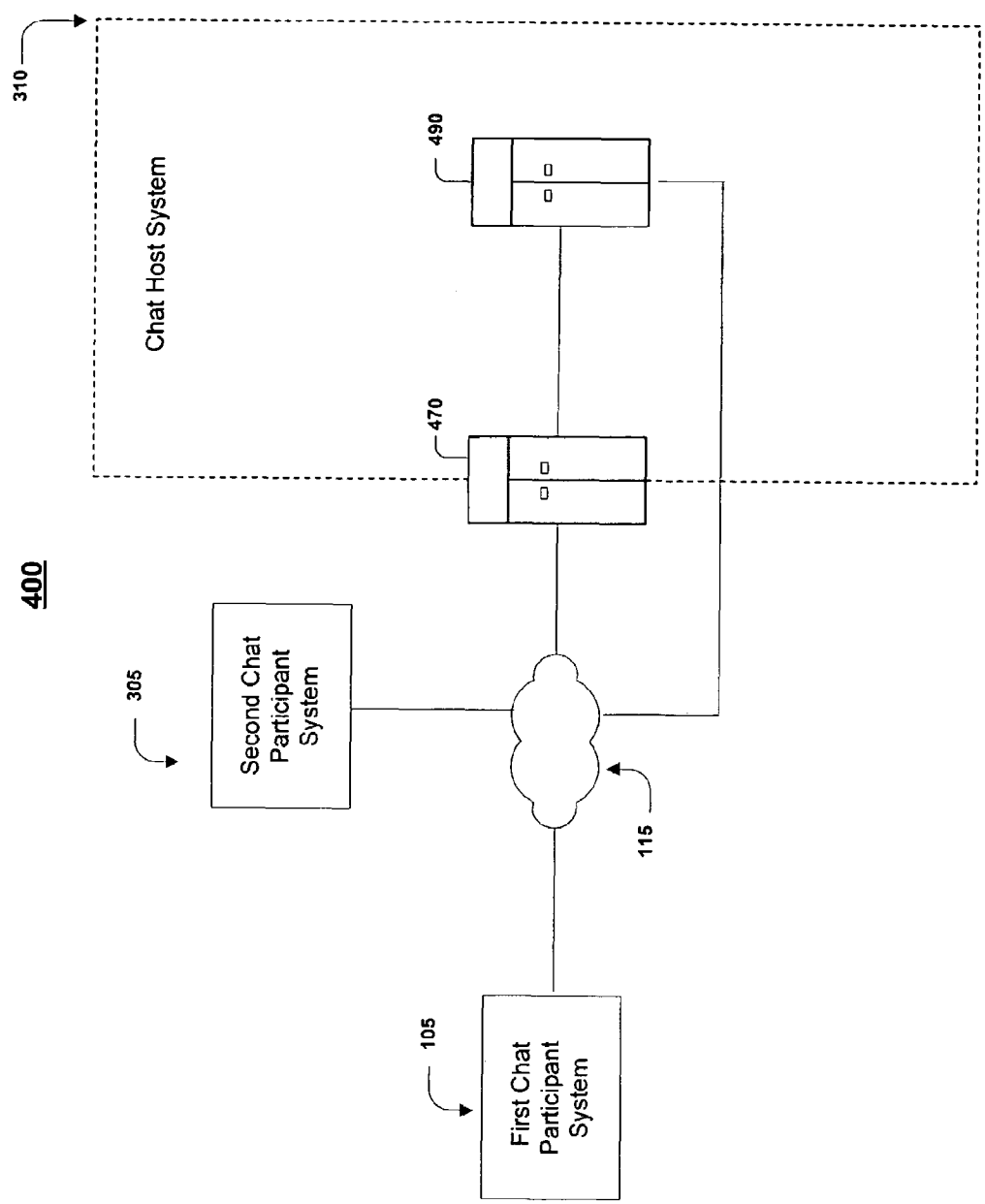

FIG. 4 illustrates a communications system 400 including a first chat participant system 105 communicating with a second chat participant system 305 and a chat host system 310 through a communication link 115. System 400 illustrates a possible implementation of the communications system 300 of FIG. 3.

In system 400, the chat host system 310 includes a login server 470 for enabling access by users and routing communications between the first chat participant system 105 and other elements of the chat host system 310. The chat host system 310 also includes a chat server 490. To enable access to and facilitate interactions with the chat host system 310, the first chat participant system 105 and the second chat participant system 305 may include communication software, such as for example, an online service provider (OSP) client application and/or a chat client application.

As described with respect to FIG. 3, the chat host system 310 may support chat services irrespective of a first chat participant's network or Internet access. Thus, the chat host system 310 may allow users to send and receive messages, regardless of whether they have access to any particular ISP. The chat host system 310 also may support associated services, such as administrative matters, advertising, directory services, chat, and interest groups related to the chat. The chat host system 310 has an architecture that enables the devices (e.g., servers) within the chat host system 310 to communicate with each other. To transfer data, the chat host system 310 employs one or more standard or exclusive chat protocols.

In one implementation, the first chat participant system 105 establishes a connection to the login server 470 in order to access the chat host system 310 and begin a chat session. The login server 470 typically determines whether the particular first chat participant is authorized to access the chat host system 310 by verifying the first chat participant's identification and password. If the first chat participant is authorized to access the chat host system 310, the login server 470 usually employs a hashing technique on the first chat participant's screen name to identify a particular chat server 490 within the chat host system 310 for use during the first chat participant's session. The login server 470 provides the first chat participant (e.g., first chat participant system 105) with the IP address of the chat server 490, gives the first chat participant system 105 an encrypted key, and breaks the connection. The first chat participant system 105 then uses the IP address to establish a connection to the particular chat server 490 through the communications link 115, and obtains access to the chat server 490 using the encrypted key. Typically, the first chat participant system 105 will be able to establish an open transmission control protocol (TCP) connection to the chat server 490. The second chat participant system 305 establishes a connection to the chat host system 310 in a similar manner.

In one implementation, the first chat participant system 105 may directly or indirectly transmit data to and access content from the chat server 490 once a connection to the chat server 490 has been established. By accessing the chat server, a first chat participant can leverage the chat client application to determine whether particular users ("buddies" or potential second chat participants) are online, exchange messages with particular buddies, participate in group chat rooms, trade files such as pictures, invitations or documents, find other buddies with similar interests, get customized news and stock quotes, and search the Web. For example a first chat participant who is using first chat participant system 105 may view whether a buddy using second chat participant system 305 is online, and if so, may exchange messages with that buddy. In one implementation, the messages sent between first chat participant system 105 and second chat participant system 305 are routed through chat host system 310. In another implementation, the messages sent between first chat participant system 105 and second chat participant system 305 are routed through a third party server (not shown) and, in some cases, are also routed through chat host system 310. In yet another implementation, the messages are sent directly between first chat participant system 105 and second chat participant system 305.

In one implementation, the chat host system 310 also includes a chat user profile server (not shown) connected to a database (not shown) for storing large amounts of user profile data. The chat user profile server may be used to enter, retrieve, edit, manipulate, or otherwise process user profile data. In one implementation, a first chat participant's profile data includes, for example, the first chat participant's screen name, instant messaging buddy list, identified interests, and geographic location. The first chat participant's profile may also include personalization items selected by the first chat participant. The first chat participant may enter, edit and/or delete profile data using an installed chat client application on the first chat participant system 105 to interact with the user profile server.

In another implementation, the chat host system 310 also includes a user profile server (not shown) connected to a database (not shown) for storing large amounts of user profile data. The user profile server may be used to enter, retrieve, edit, manipulate, or otherwise process user profile data. In one implementation, a second chat participant's profile data includes, for example, the second chat participant's screen name, instant messaging buddy list, identified interests, and geographic location. The second chat participant may enter, edit and/or delete profile data using an installed chat client application on the second chat participant system 305 to interact with the user profile server.

Because the first chat participant's data are stored in the chat host system 310, the first chat participant does not have to re-enter or update such information in the event that the first chat participant accesses the chat host system 310 using a new or different first chat participant system 105. Accordingly, when a first chat participant accesses the chat host system 310, the chat server can instruct the user profile server to retrieve the first chat participant's profile data from the database and to provide profile data to the chat server. Alternatively, user profile data may be saved locally on the first chat participant system 105.

Figure 5A:
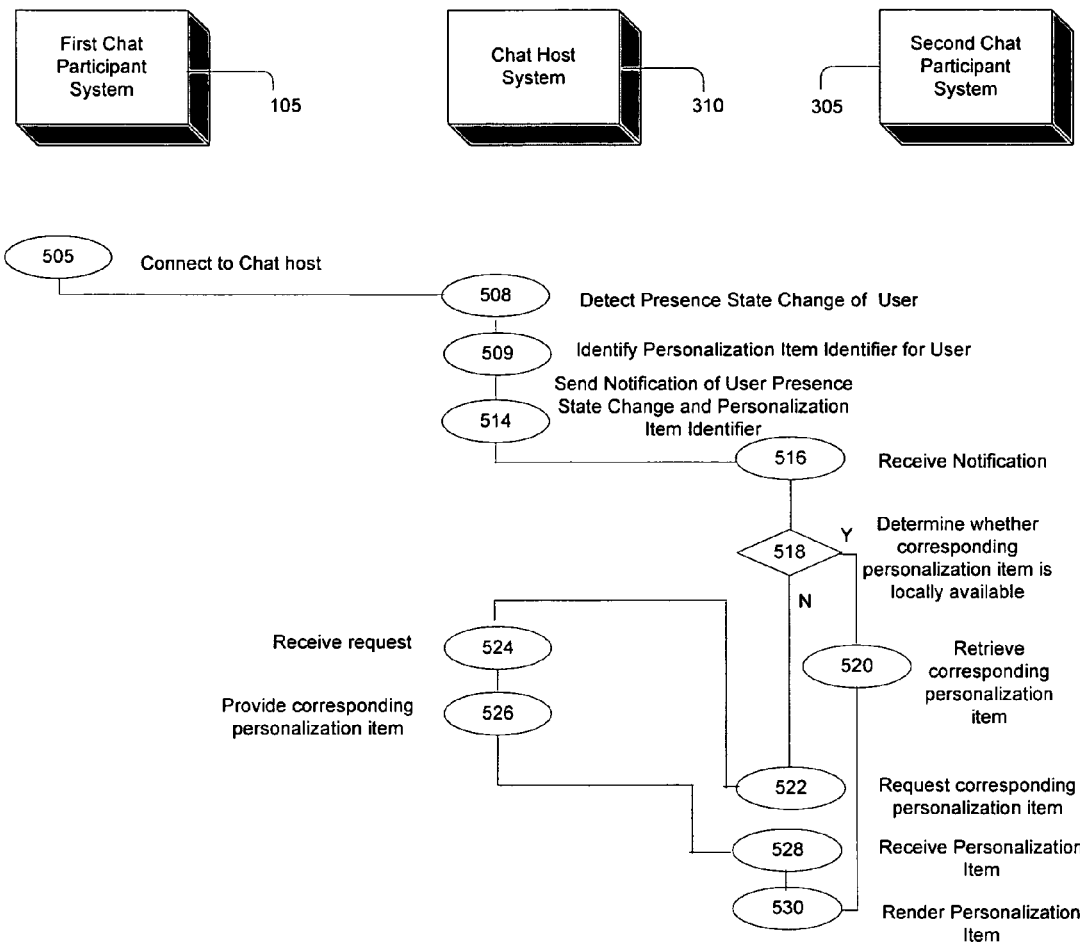
FIGS. 5A, 5B, 16-19, and 21-25 are flow charts of exemplary processes that may be implemented by systems such as those of FIGS. 1-4.
Figure 5B:
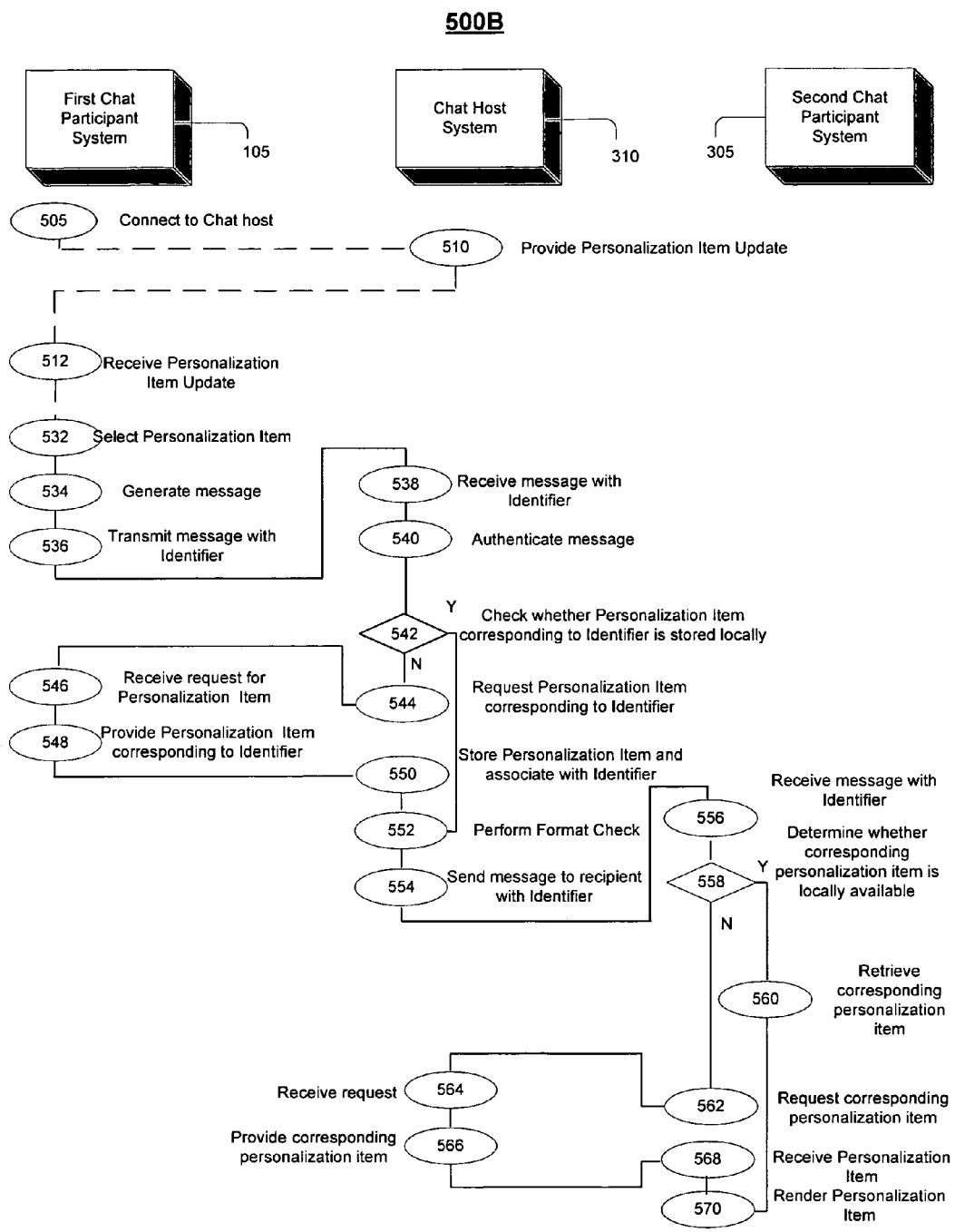

Referring to FIGS. 5A and 5B, the first chat participant system 105, the second chat participant system 305, and the chat host system 310 interact according to exemplary procedures 500A and 500B to make a personalization item selected by the first chat participant perceivable to the second chat participant during a chat communications session. The procedures 500A and 500B may be implemented by various types of hardware, software, device, computer, computer system, equipment, component, program, application, code, or storage medium. Furthermore, although not shown in FIGS. 5A and 5B, the first chat participant system 105, the second chat participant system 305, and the chat host system 310 may be directly or indirectly interconnected through known or described delivery networks, examples of which are described with respect to network 160. The procedures 500A and 500B may be implemented in a client/host context, or a standalone or offline client context. The personalization item may be rendered by the standalone/offline device and may be accessed or updated through a remote device in a non-client/host environment such as, for example, a LAN server serving an end user or a mainframe serving a terminal device. Thus, the procedures 500A and 500B described below may be implemented for any OSP, ISP, browser and/or other software program having a graphical user interface, such as programs for chat, instant messaging, electronic mail and stand-alone browsers.

Procedures 500A and 500B generally involve transporting and rendering a personalization item. While some functions of procedures 500A and 500B may be performed entirely by the first chat participant system 105 or the second chat participant system 305, other functions may be performed by the collective operation of the first chat participant system 105, the second chat participant system 305, and the chat host system 310. For example, a personalization item may be rendered entirely by the first chat participant system 105. However, the UI may be rendered based upon information and/or chat messages provided to the second chat participant system 305 by the chat host system 310.

Referring to FIG. 5A, in the procedure 500A, the first chat participant system 105 and the chat host system 310 are physically and/or logically connected (step 505). For instance, first chat participant system 105 may connect to the chat host system 310 across a network (e.g., network 160) by supplying a first chat participant identification and password to a server (e.g., a login server) in order to obtain access to the chat host system 310.

Next, the presence state in the chat room or presence state change in the chat room of the first chat participant system 105, (e.g., login state), is detected by the chat host system 310 (step 508). The chat host system 310 may detect other presence states or state changes, such as, for example, when the first chat participant signs out, is inactive for a period of time, becomes active after having been inactive for a period of time, indicates an ability to receive chat messages, or indicates an inability to receive chat messages. Presence in a chat context typically is defined by the entry of the chat participant into a chat room.

Next, the personalization item identifiers are identified for the first chat participant (step 509). Identifying the personalization item identifiers may include leveraging IM personalization items of the first chat participant, for example, as described above with respect to FIG. 3. In one implementation, the personalization items themselves may be identified for the first chat participant.

The identifiers corresponding to the personalization items to be projected by the first chat participant may be chosen on behalf of the first chat participant system by others, or may be presented to the first chat participant to depict the status or attributes of others. The identifier may be chosen to override or supplement a selection of personalization items to be projected by others, or may be chosen as a default in the absence of a selection by others.

After detecting the presence state change of the first chat participant system 105, the chat host system 310 may send or otherwise make accessible to other chat systems a notification of the first chat participant presence state change to other chat systems (step 514). Sending notification of the presence state change may include sending an identifier corresponding to a personalization item selected by the first chat participant system 105. For example, the chat host system 310 may send an identifier corresponding to a sound chosen by the first chat participant system 105 for the presence state change.

In one implementation, the chat host system 310 assigns an identifier to the personalization item. In another implementation, the system sending the personalization item assigns the identifier to the personalization item.

The identifier typically includes information allowing the corresponding personalization item to be located and retrieved. For example, the identifier may include a location of the personalization item. The identifier also may include a type identifier that identifies the personalization item as, for example, an icon, an avatar, a chat wallpaper, an emoticon, or a sound. The type identifier also may include a file format of the personalization item. Also, the identifier may include one or more flags to indicate, for example, if the personalization item is a custom item or an "official" item, has been banned, or has expired. Another flag may redirect the recipient to a different personalization item. The identifier may further include information concerning the size of the personalization item. The identifier may be in a predetermined format and may be of a predetermined length.

The second chat participant system 305 receives the notification from the chat host system 310 (step 516). In the above example, receiving the notification may include receiving an identifier corresponding to a personalization item selected by the first chat participant system 105. In another implementation, the notification may be received without an identifier. In another implementation, only the identifier itself may be received, and the identifier may serve as both notification and identifier.

Next, the second chat participant system 305 determines whether the corresponding personalization item is locally available (step 518). For example, the second chat participant system 305 may have stored the personalization in a local memory or another local storage location. The second chat participant system uses the identifier to determine whether the corresponding personalization item is locally available. For instance, the identifier may contain the location at which the corresponding personalization item is stored.

If the corresponding personalization item is available locally, the second chat participant system retrieves the corresponding personalization item (step 520) and renders the personalization item (step 530).

Otherwise, if the corresponding personalization item is not available locally, the second chat participant system 305 requests the corresponding personalization item from the chat host system 310 or a location otherwise specified by or inferred from the identifier (step 522). That is, the second chat participant system 305 may request the corresponding personalization item from another location such as the first chat participant system 105 or a remote, third party server. Requesting the corresponding personalization item may include sending the identifier associated with the personalization item to the chat host system 310 along with a request to download the personalization item to the second chat participant system 305.

When the chat host system 310 receives the request for a personalization item from the second chat participant system (step 524), and the personalization item is available, the chat host system 310 provides the corresponding personalization item to the second chat participant system (step 526). Receiving the request may include having the chat host system 310 receive the identifier associated with the personalization item along with a request to download the personalization item to the second chat participant system 305.

Next, the corresponding personalization item is received by the second chat participant system (step 528), which may save the personalization item in a memory or other storage at the local second chat participant system 305. Then, the personalization item is rendered (step 530). For example, as discussed below with respect to FIG. 10, the personalization items may include personalization items for a chat participant list 1005.

Referring to FIG. 5B, in procedure 500B, after the first chat participant system 105 connects to the chat host system 310 (step 505), the chat host system 310 optionally may provide the first chat participant system 105 with a personalization item update or notification (step 510), which generally is responsive or related to the detected state of the first chat participant system 105. For example, if personalization items corresponding to certain identifiers have changed or expired, the updated personalization item may be transmitted to the first chat participant system 105. The update may be automatic or may be requested by the first chat participant system 105.

The first chat participant system 105 may receive the personalization item update or notification when first accessing chat host system 310 (step 512), or at a later time, assuming that updates exist. Updates received by first chat participant system 105 may be stored locally at the first chat participant system 105.

Based on personalization updates received (optional steps 510 and 512) and other personalization items available, a personalization item is selected at the first chat participant system 105 (step 532). As discussed below with respect to FIGS. 6-10, the selection may be made with the assistance of first chat participant interfaces 600, 700, 800, 900, and 1000, and the first chat participant may make the selection using a mouse or other input device. The selection may be made in a non-chat environment, and the user may not be aware of the application of the selected personalization items in chat. For example, the selection may be made in an IM application environment, and the IM personalization items may be leveraged by the chat system.

The personalization items may be selected manually by the first chat participant or may be automatically selected for the first chat participant. The first chat participant personalization items may be made available to the first chat participant system and rendered at the first chat participant system by selecting the identifiers corresponding to the personalization items of the first chat participant. The identifiers may be associated with a screen name or other identifying information of the first chat participant. For example, the identifiers may be associated with the screen name of the first chat participant and stored locally at the first chat participant system, or the first chat participant system may retrieve the identifiers associated with the screen name of the first chat participant from another location, such as the chat host system or another remotely accessible data store.

The first chat participant system uses the identifier to determine if the corresponding personalization item is available locally at the first chat participant system, and if so, the first chat participant system retrieves the corresponding personalization item. If the personalization item is not available locally at the first chat participant system, the first chat participant system requests the personalization item from another location such as a chat host system or another remotely accessible data store. Alternatively, the personalization item itself may be associated with the first chat participant and retrieved by the first chat participant system. Once the first chat participant system locates or receives the personalization item, the first chat participant system renders the item for perception by the first chat participant.

Thereafter, a chat message is generated by the first chat participant system 105 to be sent to the second chat participant system 305 (step 534). In one implementation, the first chat participant may generate the chat message by manipulating a UI, such as the 1000 shown in FIG. 10. The UI 10500 may include personalization items of the second chat participant, such as an icon or avatar of the second chat participant.

To make the personalization items of the second chat participant available to the first chat participant in UI 1000, the first chat participant system 105 selects the identifiers corresponding to the personalization items of the second chat participant. The identifiers may be associated with a screen name or other identifying information of the second chat participant. For example, the identifiers may be associated with the screen name of the second chat participant and stored locally at the first chat participant system 105, or the first chat participant system may retrieve the identifiers associated with the screen name of the second chat participant from a remotely-accessible data store such as the chat host system 310, the second chat participant system 305, or a remote or third-party server. As such, personalization items of the second chat participant may be made available to the first chat participant before the receipt by the first chat participant of a chat from the second chat participant.

The first chat participant system 105 uses the identifiers to identify the personalization item associated with the recipient, and to locate perceivable content corresponding to the identifier. For instance, an identifier received from a recipient may be used as a basis for determining if the corresponding personalization items are available locally at the first chat participant system, and if so, may be used to retrieve the corresponding personalization items. If the personalization items are not available locally at the first chat participant system 105, the first chat participant system may use the identifiers as a basis for generating one or more requests for the personalization items from another location such as the chat host system 310 or another remotely accessible data store, such as the second chat participant system 305 or a remote or third-party server. Once the first chat participant system 105 locates or receives the personalization items, that system renders the items for perception by the first chat participant.

Next, the first chat participant system 105 transmits the chat message along with an identifier corresponding to each personalization item to the chat host system 310 (step 536). The first chat participant may manipulate a user interface to render a chat user interface. The first chat participant may select the screen name of the second chat participant system, cause the chat UI to be rendered, and type the message in a chat compose area to generate the chat. The first chat participant system 105 includes one or more personalization items to be transported in the chat message. The chat message may be transmitted, for example, by selecting a send control.

The chat host system 310 receives the chat message and the identifier (step 538). The chat host system 3110 then may authenticate the chat message for security purposes (step 540).

The chat host system 310 determines whether the corresponding personalization item is stored at the chat host 310 (step 542). The chat host system 310 may have stored the personalization on a server 390 or in a local memory or other local storage location. The chat host system 310 uses the identifier in determining whether the corresponding personalization is available locally. For instance, the identifier may contain the location at which the corresponding personalization item is stored. If the corresponding personalization item is available locally at the chat host system 310, a format check may be performed on the personalization item (step 552) and the personalization item may be made available to the second chat participant system 305 (step 554).

Otherwise, if the corresponding personalization item is not available at the chat host system 310, the chat host system 310 may request the corresponding personalization item from the first chat participant system (step 544). Alternatively, the chat host system 310 may request the corresponding personalization item from another location, such as the second chat participant system 305 or a remote, third party server. Requesting the corresponding personalization item may include sending the identifier associated with the personalization item to the first chat participant system 105 along with a request to download the personalization item to the chat host system 310.

The first chat participant system 105 receives the request for the personalization item from the chat host system (step 546). Receiving the request may include receiving the identifier associated with the personalization item along with a request to download the personalization item to the chat host system 310.

The first chat participant system 105 provides the corresponding personalization item to the second chat participant system (step 548). The personalization item provided by the first chat participant system may include a user-customized personalization item.

The corresponding personalization item is received by the chat host system 310 and the personalization item and/or the associated identifier are stored (step 550). Storing the personalization item and/or the identifier may include saving the personalization item and/or the identifier in a memory or other storage at the chat host system 310.

A format check may be performed on the personalization item (step 552). The format check may include comparing the actual format of the personalization item to the expected format of the personalization item based upon the identifier.

The chat host system 310 sends the chat message and the identifier corresponding to the selected personalization item to the second chat participant system 305 (step 554). Because various aspects of steps 554-570 are similar to those discussed above with respect to steps 514-530 of procedure 500A, the following discussion of steps 554-570 is somewhat abbreviated.

In one implementation, the chat host system 310 assigns an identifier to the personalization item. In another implementation, the client system sending the personalization item assigns the identifier to the personalization item.

The second chat participant system 305 receives the notification from the chat host system 310 (step 556). Receiving the notification includes receiving an identifier corresponding to the personalization item selected by the first chat participant system 105, as discussed above with respect to step 516.

Next, the second chat participant system 305 determines whether the corresponding personalization item is available locally (step 558). As discussed above with respect to step 518, the second chat participant system 305 may have stored the personalization in a local memory or other local storage location. The second chat participant system 305 uses the identifier to determine whether the corresponding personalization is available locally. For instance, the identifier may contain the location at which the corresponding personalization item is stored. Such a determination may include determining whether the corresponding personalization items are available through IM, and/or determining whether the corresponding personalization items are available through chat. For example, a determination may be made as to whether the corresponding personalization items are available through an IM client or a chat client.

If the corresponding personalization item is available locally, the second chat participant system 305 retrieves the corresponding personalization item (step 560) and the personalization item is rendered (step 570).

Otherwise, if the corresponding personalization item is not available locally, the second chat participant system 305 requests the corresponding personalization item from the chat host system 310 (step 562). Alternatively, as discussed above with respect to step 522, the second chat participant system 305 may request the corresponding personalization item from another location, such as the first chat participant system 105 or a remote, third party server. In one implementation, the personalization item may be provided by a third party, and may be made available in consideration of a payment by the first chat participant or the second chat participant. Requesting the corresponding personalization item may include sending to the chat host system 310 the identifier associated with the personalization item along with a request to download the personalization item to the second chat participant system 305.

The chat host system 310 receives the request for the personalization item from the second chat participant system 305 (step 564). As discussed above with respect to step 524, receiving the request may include receiving the identifier associated with the personalization item along with a request to download the personalization item to the second chat participant system 305. The chat host system 310 provides the corresponding personalization item to the second chat participant system 305 (step 566).

The corresponding personalization item is received by the second chat participant system 305 (step 568). As discussed above with respect to step 528, receiving the corresponding personalization item may include saving the personalization item in a memory or other storage at the local second chat participant system 305.

Finally, the personalization item is rendered (step 570). As discussed below with respect to FIG. 10, the personalization item to be rendered may include an icon or avatar.

The relative order of steps 505-530 with respect to other steps in procedure 500A, and the relative order of steps 505-570 with respect to other steps in procedure 500B, and also with respect to each other, may vary. For example, a personalization update (step 510 of FIG. 5B) may be performed during, after, or simultaneously with sending notification of a first chat participant presence state change (step 514 of FIG. 5A). Also, certain steps may be omitted entirely, as appropriate. For example, referring to FIG. 5A, if the first chat participant has not chosen a personalization item to be sent to the second chat participant system 305 upon a presence state change, then no such item will be sent and steps 516-530 may be eliminated entirely. In another example, referring to FIG. 5B, steps 540-552 may be eliminated such that, after receiving the chat with the identifier from the first chat participant system, the host next sends the chat with the identifier to the second chat participant system.

Figure 6:
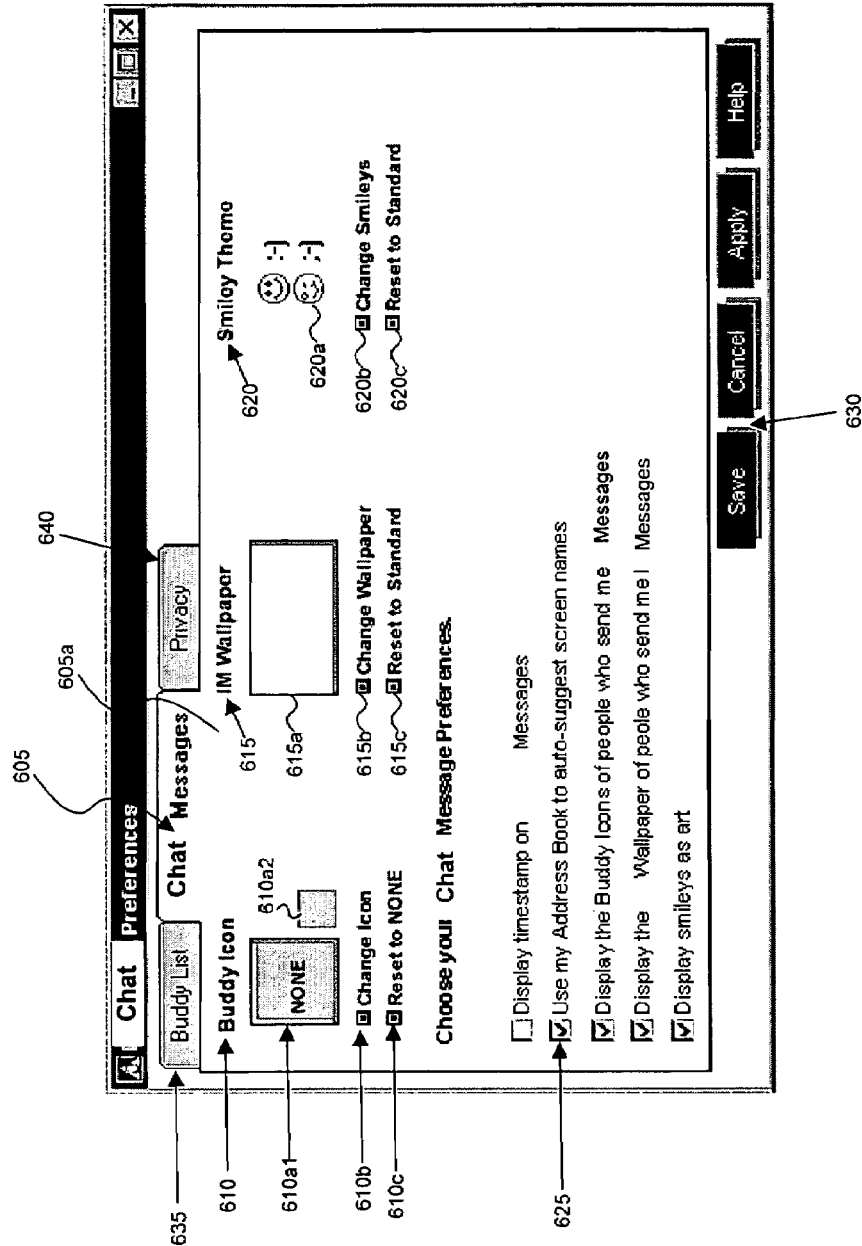

FIG. 6 illustrates one example of a first chat participant UI 600 for enabling a first chat participant to select personalization items (e.g., at step 532). The UI 600 may be presented to a first chat participant of a chat service provider. In general, the UI 600 is rendered on the first chat participant system 105 using software stored on the first chat participant system 105. The personalization items to be selected by the first chat participant may be stored on the first chat participant system 105, on the chat host system 310, or on a different host system 110 such as a host system of an authorized partner.

The UI 600 includes menu tabs 605, 635 and 640 that each have a corresponding menu to assist the first chat participant with selecting personalization items. For example, as shown in FIG. 6, the menu 605a corresponding to menu tab 605 enables a first chat participant to make selections of personalization items including icons 610, chat wallpaper 615, and smiley (or emoticon) themes 620. The first chat participant's current selections of icon $610a_1$, mini icon $610a_2$, chat wallpaper 615a, and smiley theme 620a are displayed. Each of these personalization items may be made available to and rendered by a second chat participant during a chat conversation with the first chat participant.

A control 610b is provided for the first chat participant to select a large icon $610a_1$ and/or a mini icon $610a_2$, and a control 610c is provided to enable reset of the icon selections back to a default setting (e.g., none). Another control 615b is provided to enable selection of chat wallpaper 615a, and a control 615c is provided to enable reset of the chat wallpaper selection back to a default setting. Yet another control 620b is provided to enable a smiley theme 620a, and a control 620c is provided for the first chat participant to reset the smiley theme selection back to a default setting.

Other controls 625 are provided for functions such as, for example, displaying a timestamp on chat messages, using an address book to automatically suggest screen names, displaying the icons or avatars of people who send chat messages to the first chat participant, displaying the chat wallpaper of people who send chat messages to the first chat participant, and displaying smileys as art. Controls 630 are provided for the first chat participant to save the changes made, apply the changes, cancel the changes, or get help.

Figure 7:
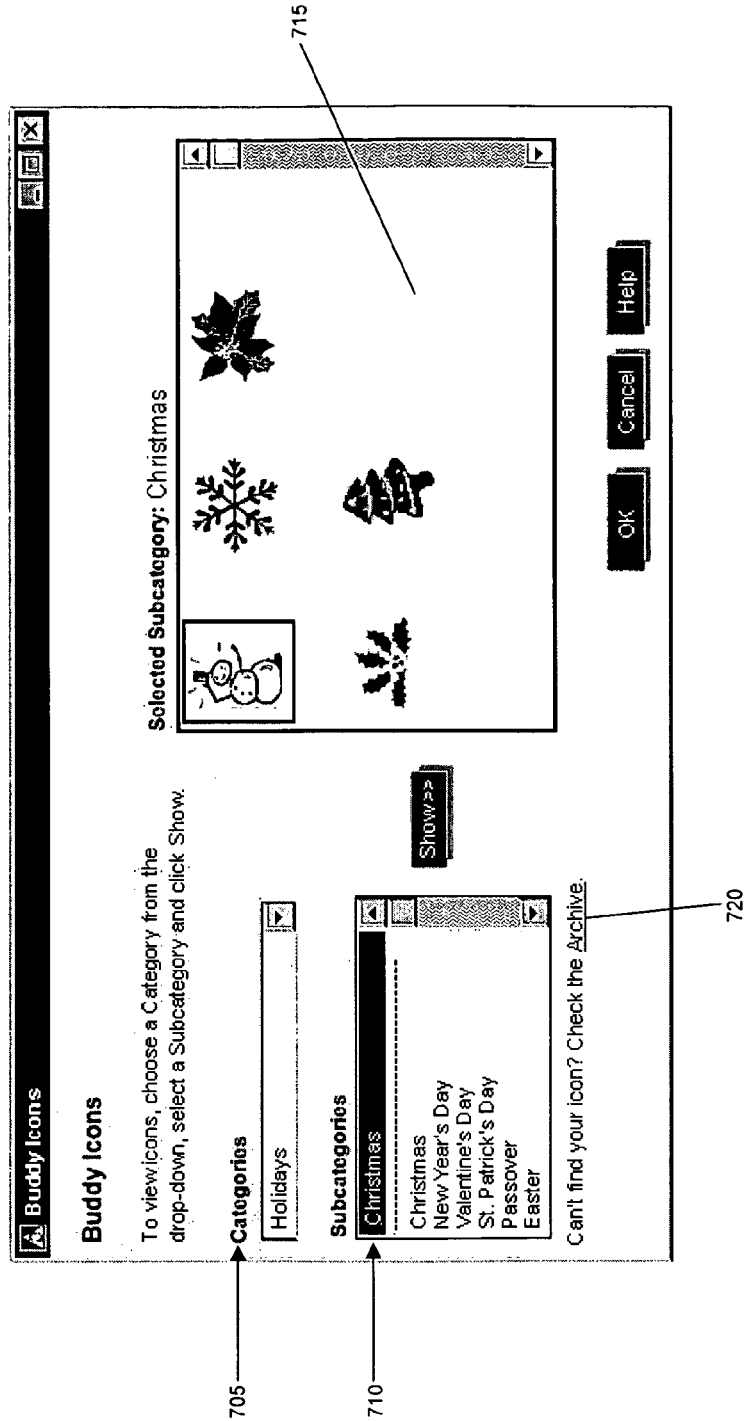

FIG. 7 illustrates an example of a first chat participant UI 700 for enabling a first chat participant to select an icon or avatar (or a personalization item). The UI 700 is rendered in response to user manipulation of a control 610b (shown in FIG. 6). In the example of FIG. 7, the first chat participant is presented with a list of icon or avatar categories 705 and a list of subcategories 710 corresponding to a selected category. When a first chat participant selects a category 705 and a subcategory 710, a window 715 displays the personalization items available in the selected subcategory. The first chat participant may select a personalization item by, for example, using a mouse or other input device to make a selection among the available personalization items displayed in the window 715. Also, an archive 720 of old personalization items may be provided for first chat participant selection. In another implementation, the first chat participant may provide a custom icon or avatar as a personalization item.

Figure 8:
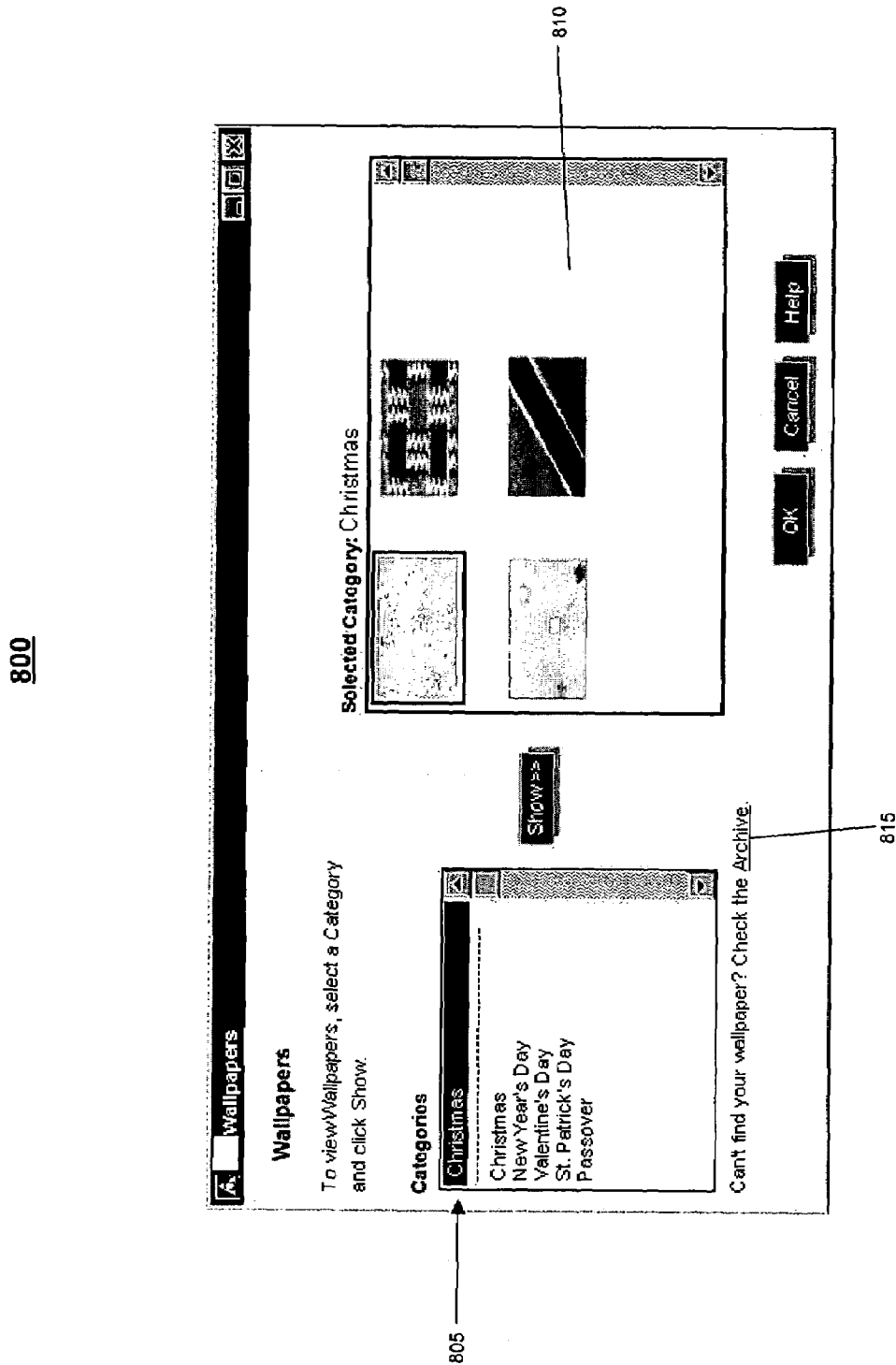

FIG. 8 illustrates an example of a UI 800 for enabling a first chat participant to select chat wallpaper. The UI 800 is rendered in response to user manipulation of a control 615b (shown in FIG. 6). In the example of FIG. 8, the first chat participant is presented with a list of chat wallpaper categories 805. When a first chat participant selects a category 805, a window 810 displays the personalization items available in the selected category. The first chat participant may select a personalization item by, for example, using a mouse or other input device to make a selection among the available items in the window 810. Also, an archive 815 of old personalization items may be provided for user selection. In another implementation, the first chat participant may provide a custom chat wallpaper as a personalization item.

Figure 9:
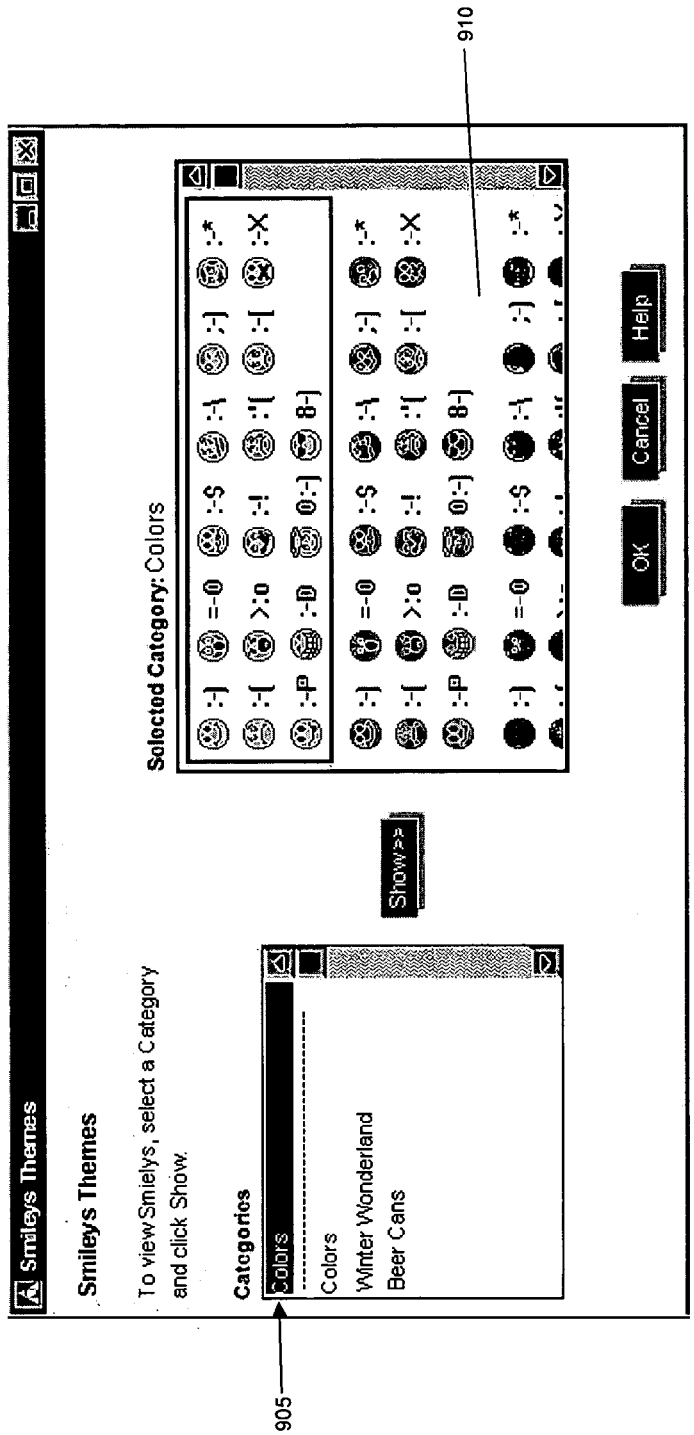

FIG. 9 illustrates yet another example of a UI 900 for enabling a first chat participant to select smiley themes. The UI 900 is rendered in response to user manipulation of a control 620b (shown in FIG. 6). In the example of FIG. 9, the first chat participant is presented with a list of smiley theme categories 905. When a first chat participant selects a category 905, a window 910 displays the personalization items available in the selected category. The first chat participant may select a personalization item by, for example, using a mouse or other input device to make the selection among the available items in the window 910. Also, an archive of old personalization items may be provided for first chat participant selection. In another implementation, the first chat participant may provide a custom smiley theme as a personalization item.

Figure 10:
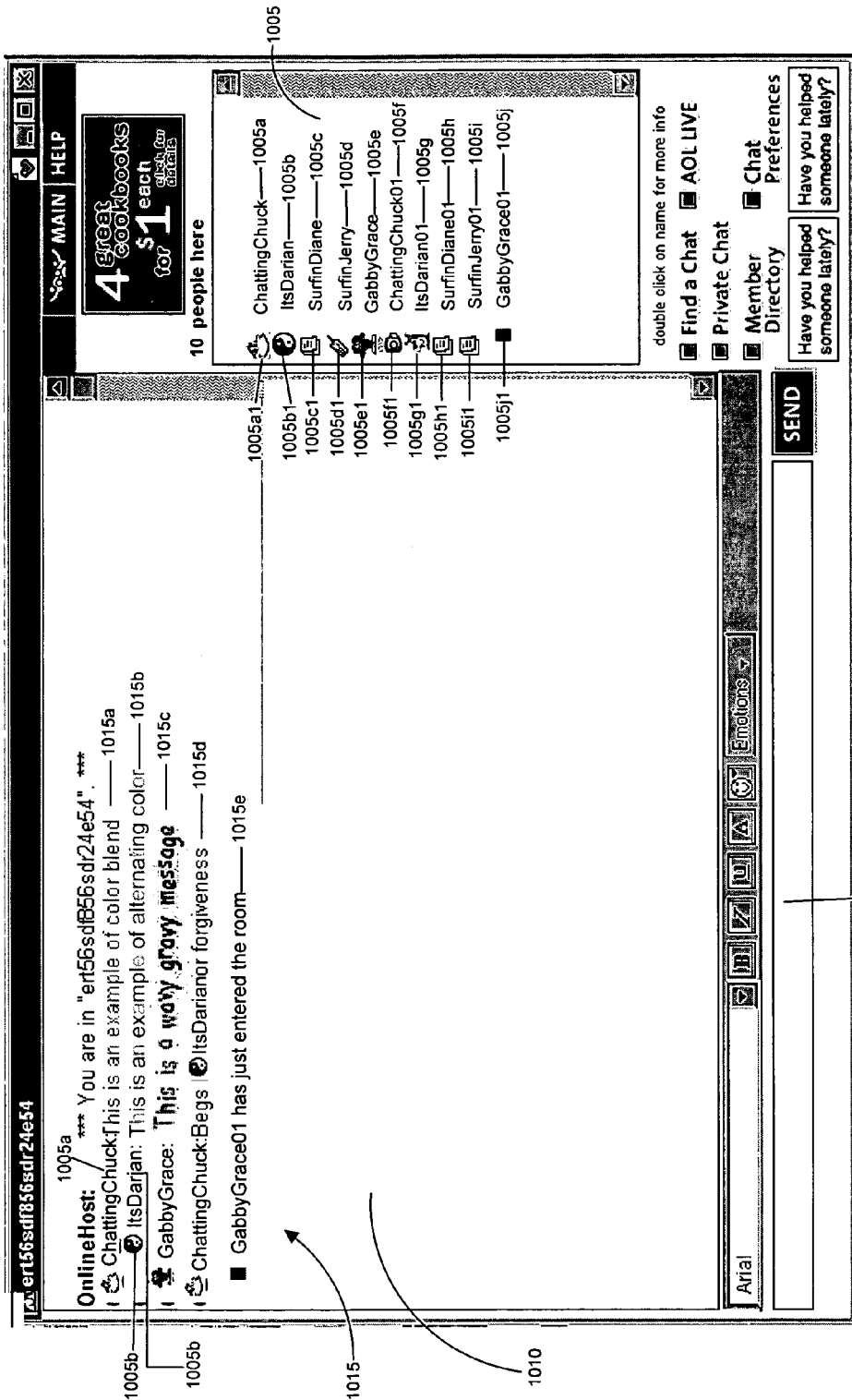

FIG. 10 illustrates one example of a chat UI 1000 that may be presented to a first chat participant of a chat service provider such as provided by America Online. The UI 1000 is rendered in response to user manipulation of a user interface control. In general, the UI 1000 is rendered on the first chat participant system 105 using software stored on the first chat participant system 105. One or more personalization items may be provided for the UI. Generally, to be a part of a conversational group, a user joins a chat room. The chat host system 310 then replicates the messages sent to the chat room by a user (e.g., the first chat participant or a second chat participant) to other users who have joined the chat room.

The UI 1000 includes a chat participant list 1005 that enables a first chat participant of a chat service to, among other things, perceive the presence state of other second chat participants that have joined the chat room, and to send chat messages to second chat participants on the chat participant list 1005. As shown, there are ten chat participants, including the first chat participant 1005a and nine second chat participants 1005b, 1005c, 1005d, 1005e, 1005f, 1005g, 1005h, 1005j present in the chat room. The chat participant list 1005 may include personalization items for each participant. As shown, the chat participants 1005a, 1005b, 1005c, 1005d, 1005e, 1005f, 1005g, 1005h, and 1005j have corresponding personalization items $1005a_1$, $1005b_1$, $1005c_1$, $1005d_1$, $1005e_1$, $1005f_1$, $1005g_1$, $1005h_1$, and $1005j_1$ displayed respectively. Each chat participant may manually select the personalization items to be displayed in the chat room, or the personalization items may be selected automatically for the chat participant. The personalization items may be rendered to the first chat participant as described above with respect to step 532 of FIG. 5B. The transmission of the personalization items may occur during machine-to-machine communications that are not visible to the user. The chat participant list 1005 also may contain personalized links (not shown) to content and may have a customized appearance. The chat participant list 1005 may have a background image that may be, for example, an image file.

The UI 1000 includes a chat display area 1010 to display the messages 1015a, 1015b, 1015c, 1015d, 1015e of an active chat session 1015. The conversation in the active chat session 1015 normally appears the same for all participants in the chat room. A participant typically converses with other participants by typing a line of text in an edit box 1025 and activating a send command, for example, by pressing the ENTER key of the keyboard of the participant's second chat participant system 305. In response, the entered text is displayed in the chat display area 1010. The participants in the chat room may now see the entered text.

As shown, the active chat session 1015 includes the second chat participant and the personalization of the second chat participant next to the text entered by that second chat participant. For example, message 1015a includes the identity of the first chat participant 1005a ("ChattingChuck") and the personalization item 1005a1 associated with that first chat participant, and message 1015b includes the identity of the second chat participant 1005b ("ItsDarian") and the personalization item 1005b1 associated with that second chat participant. Also, the style of text may be viewed as a personalization item. For example, the text characters of message 1015a have a "blended" color effect, the text characters of message 1015b have an alternating color effect, and the text characters of message 1015c have a "wavy" effect by alternating superscript and subscript characters. Other combinations are possible. For example, different fonts or effects such as bold, underline, italics, or combinations of these may be used.

In one implementation, the first chat participant may choose a personalization item, such as an icon or an emoticon to be sent in a chat message from the first chat participant to the second chat participant. The first chat participant system sends an identifier corresponding to the personalization item in the chat message, and the second chat participant system retrieves the corresponding personalization item based on the identifier. If the personalization item is not stored locally at the second chat participant system, the second chat participant system requests the personalization item from another source, such as a chat host.

The UI 1000 includes personalization items 1005*b*1 through 1005*j*1 from the second chat participant and personalization item 1005*a*1 from the first chat participant. Typically, the personalization items are transported from the second chat participant to the first chat participant by inserting an identifier corresponding to personalization item into a chat message from the second chat participant to the first chat participant. The first chat participant system 105 receives the chat message and the identifier, and searches for the corresponding chat wallpaper and icon on the system of the first chat participant. If a personalization item is not found on the system of the first chat participant, then the system retrieves the personalization item from a different location, such as, for example, a chat host 305. Once retrieved, the first chat participant system renders the personalization item. A similar process is used when the first chat participant sends a personalization item to be displayed to a second chat participant.

Alternatively, personalization items of the second chat participant may be made available to the first chat participant without having to receive a chat message from the second chat participant. The first chat participant system 105 selects the identifiers corresponding to the personalization items of the second chat participant. The identifiers may be associated with a screen name or other identifying information of the second chat participant. For example, the identifiers may be associated with the screen name of the second chat participant and stored locally at the first chat participant system 105, or the first chat participant system may retrieve the identifiers associated with the screen name of the second chat participant from another location such as the chat host system 310 or another remotely accessible data store such as the second chat participant system 305 or a remote or third-party server.

Also, as discussed above with respect to step 532 of FIG. 5B, the personalization items of the first chat participant may be rendered to the first chat participant.

The first chat participant system 105 uses the identifiers to determine if the corresponding personalization items are available locally at the first chat participant system, and if so, the first chat participant system retrieves the corresponding personalization items. If the personalization items are not available locally at the first chat participant system 105, the first chat participant system requests the personalization items from another location such as a chat host system 310 or another remotely accessible data store such as the second chat participant system 305, or a remote or third-party server. Once the first chat participant system 105 locates or receives the personalization items, the first chat participant system renders the items on UI 1000 for perception by the first chat participant.

Figure 11:
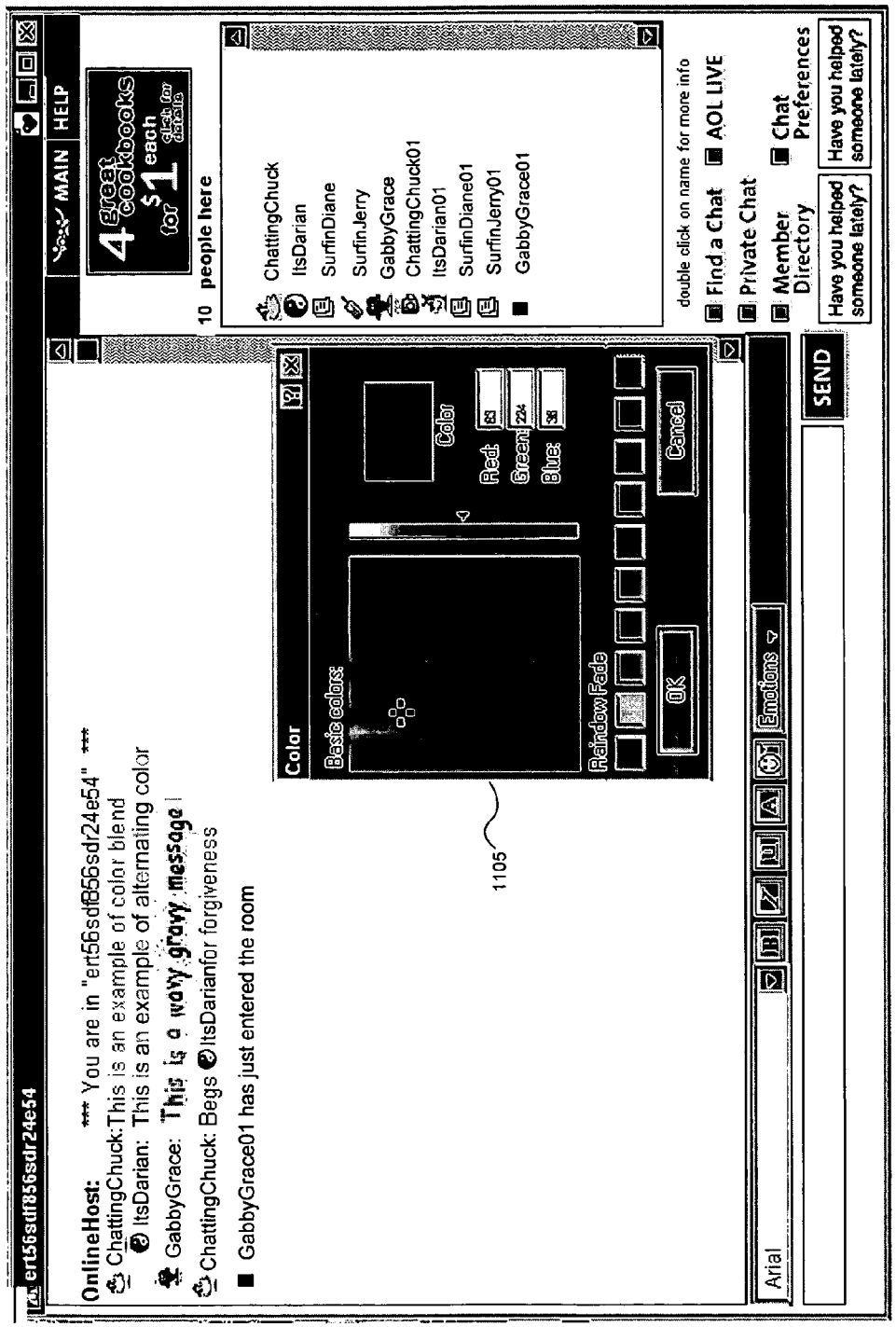

Similarly, personalization items chosen by the first chat participant may be rendered in UI 1000. These items are typically stored locally on the first chat participant system 105, and may be retrieved by the first chat participant system 105. If an item is not stored locally, the first chat participant system 105 may retrieve the personalization item from a different location such as, for example, a chat host 310. Once retrieved, the first chat participant system 305 renders the personalization items. When the first chat participant sends a chat message to the second chat participants, the personalization items are transported along with the chat message by sending an identifier corresponding to personalization items. As described above with respect to FIGS. 5A and 5B, the second chat participant system 305 receives the chat message and the identifier, and searches for the corresponding personalization item on the system of the second chat participant. If a personalization item is not found on the system of the second chat participant, then the second chat participant system 305 may retrieve the personalization item from a different location such as, for example, a chat host 305. Once retrieved, the second chat participant system 305 renders the personalization item. FIG. 11 illustrates one example of a chat UI 1100 is similar to the UI 1000 discussed with respect to FIG. 10. UI 1100 illustrates a color selection interface 1105 that assists a chat participant in selecting a color scheme to be applied to the participants' messages in order to personalize them.

Figure 12:
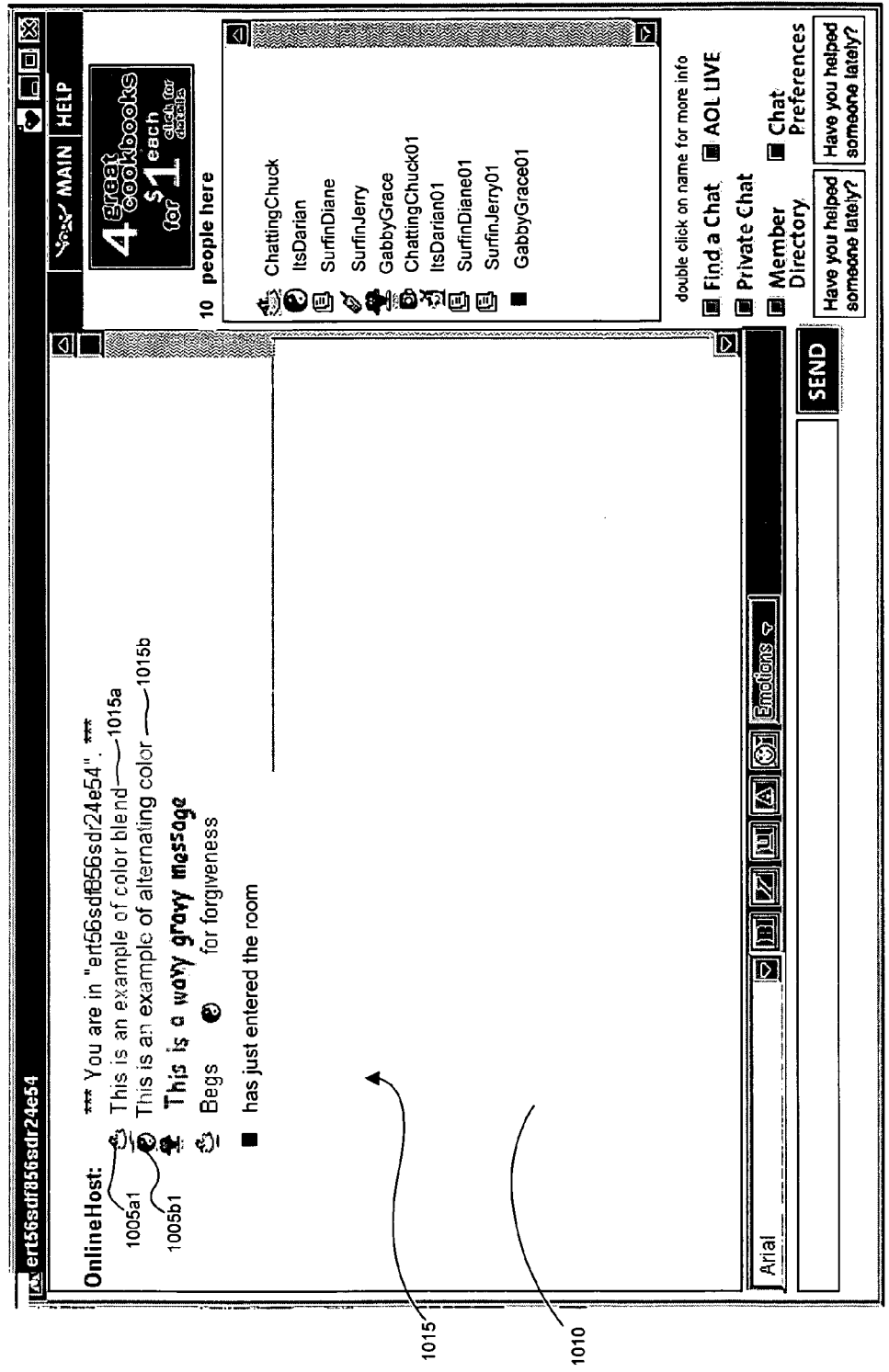

FIG. 12 illustrates one example of a chat UI 1200 is similar to the UI 1000 discussed with respect to FIG. 10. In the UI 1200, however, the chat display area 1010 does not display the names of the chat participants. Instead, one or more personalization items of the chat participants are displayed to represent the participant. For example, in message 1015*a*, only the personalization item 1005*a*1 of the first chat participant 1005*a* is displayed and represents the first chat participant 1005*a*. Similarly, in message 1015*b*, only the personalization item 1005*b* 1 of the second chat participant 1005*b* is displayed and represents the second chat participant 1005*b*. This may increase the privacy protection of the participants in the chat room.

Figure 13:
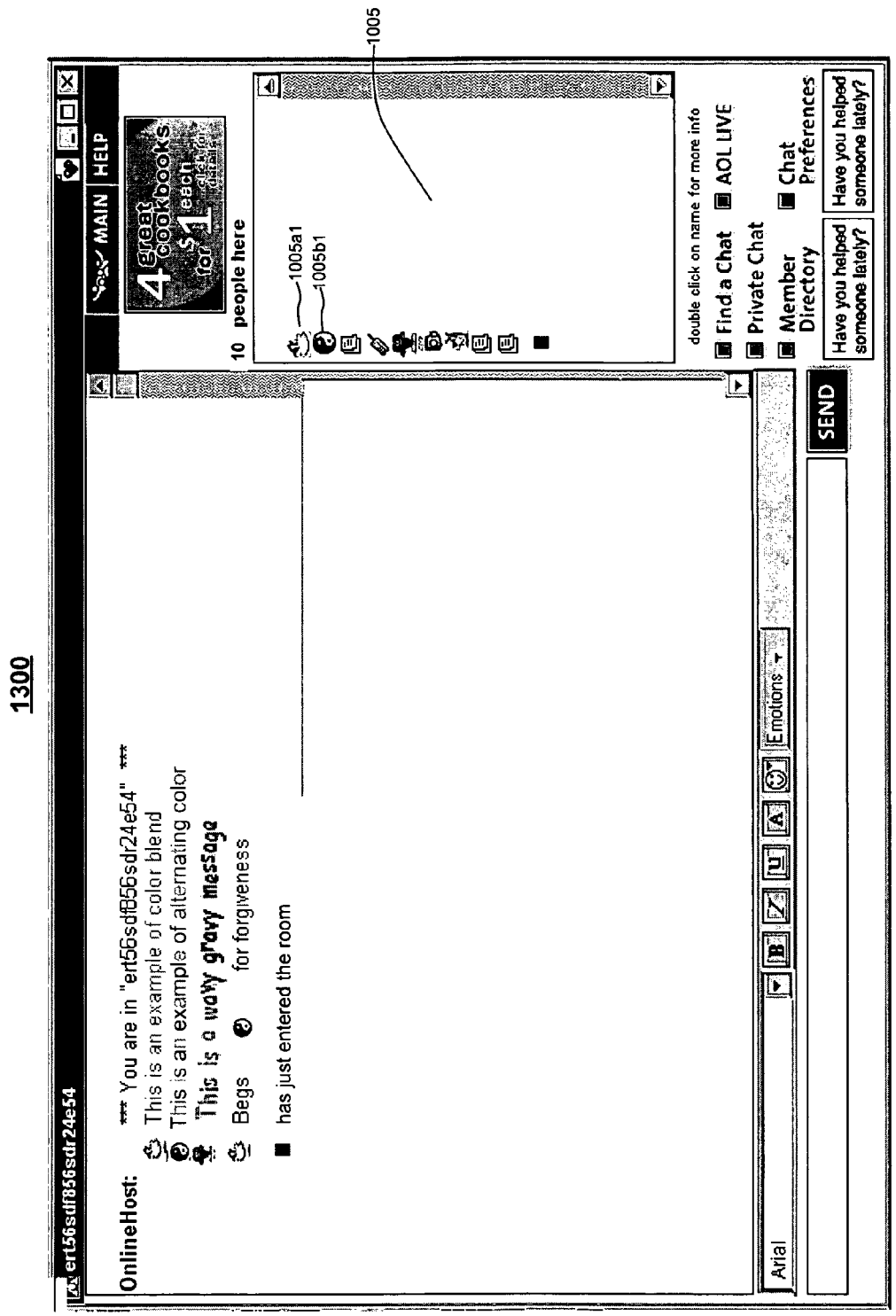

FIG. 13 illustrates one example of a chat UI 1300 is similar to the UI 1200 discussed with respect to FIG. 12. In the UI 1300, however, the chat participant list 1005 does not display the names of the chat participants. Instead, one or more personalization items of the chat participants are displayed to represent the participant. For example, only the personalization item 1005*a*1 of the first chat participant 1005*a* is displayed and represents the first chat participant 1005*a* in the chat participant list 1005. Similarly, only the personalization item 1005*b*1 of the second chat participant 1005*b* is displayed and represents the second chat participant 1005*b* in the chat participant list 1005. This may increase the privacy protection of the participants in the chat room.

FIG. 14A shows a table 1400A of text-based emotions and actions. The emotions and actions may be personalized and may be considered a personalization item in some implementations. For example, the emotions and actions may be distinguished by a color or other characteristic. A chat participant may insert emotions and actions into the chat display area 1010 (FIG. 10). In one implementation, a first chat participant selects the desired second chat participant and selects the desired emotion and/or action to produce an output that will appear in the chat display area. For example, table 1400 illustrates examples of various combinations of first chat participant 1405, emotion 1410, action 1415, second chat participant 1420, text 1425, the chat outputs generated 1430, and IM outputs generated 1435. An action in the IM environment may be used to trigger different actions in the chat environment. The table 1400A may be stored in a data storage such as data store 320 described above with respect to FIG. 3.

Referring to FIG. 14B, a table 1400B provides a mapping for one or more personalization items 1450 to definitions in chat 1455 and definitions in IM 1460. The mapping may be made between the chat personalization items, opportunities, and settings and IM personalization items, opportunities, and settings. The mapping enables something defined in IM for a particular context encountered in IM to be used for a different context in chat, or vice versa. For example, presence in IM may be defined as the use of the IM application by a user, whereas presence in chat may be defined as participation in a chat room. Therefore, the IM personalization item, such as a sound of a door opening, for becoming present in the IM context may be applied to chat. However, the application in chat for becoming present is not beginning to use the chat application by the user, but instead for entry into one of several chat rooms. The mapping may be modified, for example, by the user or by a system administrator. In another example, a personalization item 1450 may be subject to a definition in chat 1455 that differs from the definition in IM 1460. The definitions may be modified by the user, a system administrator, or automatically.

Figure 15:
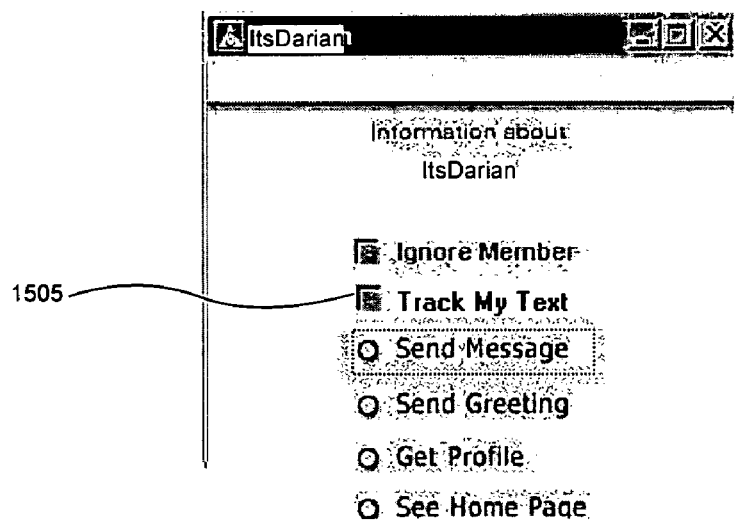

FIG. 15 illustrates an exemplary UI 1500 for enabling a chat participant to track the messages from another chat participant. The tracking may be customized and may be considered a personalization item in one implementation. For example, the tracking may be controlled by the first chat participant and accomplished through color or other text changes chosen by the first chat participant and tracked in the chat display area 1010 of the chat UI 1000 (FIG. 10). In another implementation, the appearance of the tracked text is controlled by the second chat participant.

Figure 16:
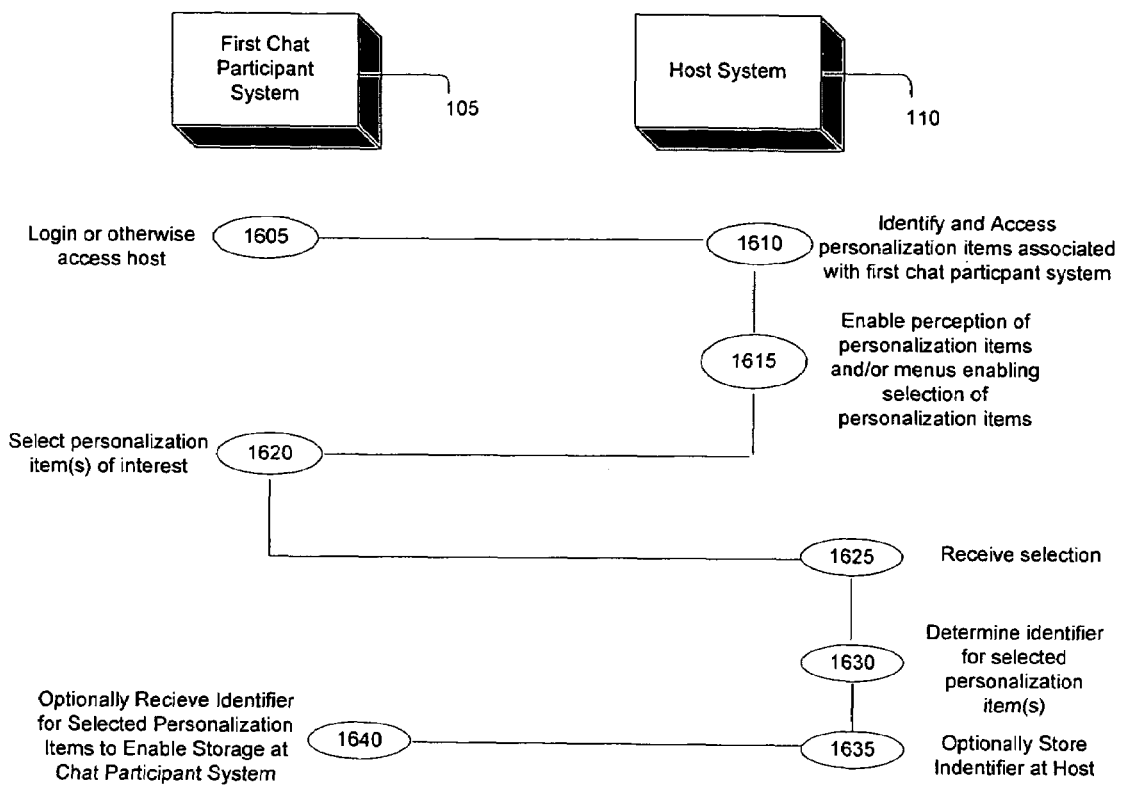
Figure 17:
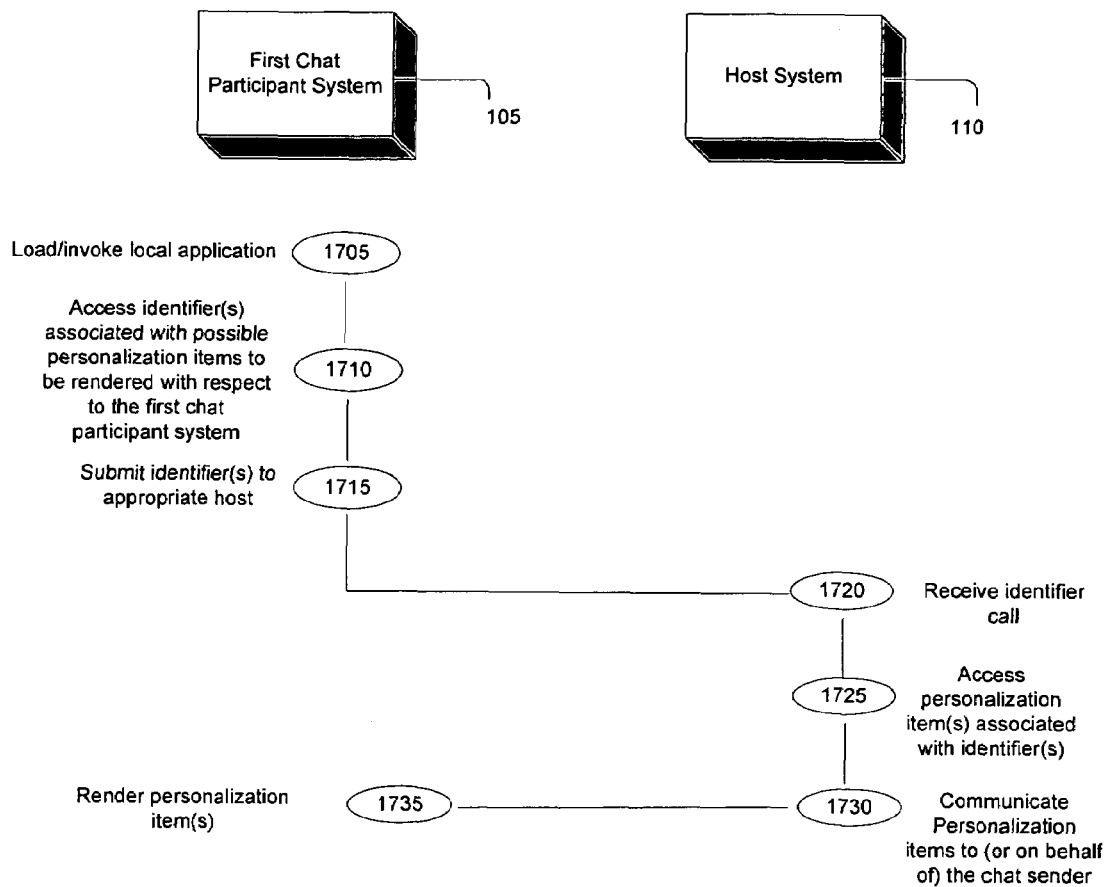

Referring to FIGS. 16 and 17, the first chat participant system 105 and the host system 110, such as a chat host system 310, interact according to exemplary procedure 1600 to enable a first chat participant to select a personalization item and according to exemplary procure 1700 to make the host-based personalization item selected by the first chat participant in procedure 1600 perceivable to the first chat participant.

Procedures 1600 and 1700 may be implemented by various types of hardware, software, device, computer, computer system, equipment, component, program, application, code, or storage medium. Although not shown in FIGS. 16 and 17, the first chat participant system 105 and the host system 110 may be directly or indirectly interconnected through known or described delivery networks, examples of which are described with respect to network 160.

The procedures 1600 and 1700 may be implemented in a client/host context, or a standalone or offline client context. For example, while some functions of procedures 1600 and 1700 may be performed entirely by the first chat participant system 105, other functions may be performed by host system 110, or the collective operation of the first chat participant system 105 and the host system 110. The host system 110 is a computer remote to the chat operator systems, and may be, for example, a chat host system 310. In procedures 1600 and 1700, the personalization item may be respectively selected and rendered by the standalone/offline device, and the personalization item may be accessed or updated through a remote device in a non-client/host environment such as, for example, a LAN server serving an end user or a mainframe serving a terminal device. Thus, the procedures 1600 and 1700 described below may be implemented for any OSP, ISP, browser and/or other software program having a graphical user interface, such as programs for chat, instant messaging, electronic mail and stand-alone browsers.

Procedure 1600 generally involves selecting a personalization item. In the procedure 1600, the first chat participant system 105 logs in or otherwise accesses the host system 110 (step 1605). For instance, first chat participant system 105 may connect to the host system 110 across a network (e.g., network 160) by supplying verifiable credentials to a server (e.g., a login server) at the host system 110. More specifically, a browser may be used to access a web-available interface, a chat message may be used to access a selectable interface, or a chat client that has an interface to a host may be used, among other options.

The host system 110 identifies (e.g., through a lookup) and accesses personalization items associated with the first chat participant for selection by the first chat participant system 105 (step 1610). In one implementation, the host system 110 may use a screen name of the first chat participant system 105 or another identification of the first chat participant system 105 to select/identify personalization items available to the first chat participant system 105. IM personalization items may be leveraged in the identification and access of the personalization items, as discussed, for example, with respect to FIG. 5A and FIG. 3.

Next, the host system 110 enables perception by the first chat participant system 105 of personalization items and/or menus enabling the selection of personalization items (step 1615). FIGS. 6-9 describe various interfaces available to the operator, which may be used to select personalization items and which were previously described. Based on the personalization items or menus provided or otherwise made perceivable to the operator of the first chat participant system 105, the first chat participant system selects personalization item(s) of interest (step 1620).

The host system 110 receives the personalization item selection from the first chat participant system 105 (step 1625), associates the selection with an identifier for the selected personalization items, and determines the identifier for the selected personalization item(s) (step 1630). The identifier typically includes information allowing the corresponding personalization item to be located and retrieved. For example, the identifier may include a location of the personalization item. The identifier also may include a type identifier that identifies the personalization item as, for example, an icon or avatar, a chat wallpaper, an emoticon, or a sound. The type identifier also may include a file format for the personalization item. The identifier may include one or more flags to indicate whether the personalization item is, for example, a custom item or an "official" item, whether the personalization item has been banned, or whether the personalization item has expired. Where appropriate, another flag may redirect the recipient to a different personalization item. The identifier may further include information concerning the size of the personalization item. The identifier may have a predetermined format and a predetermined length.

Optionally, the identifier may be stored at the host (step 1635). The host system 110 may store the identifier(s) in a memory or other storage, either local or remote to the host system 110. The host system 110 also may send the identifier(s) to the first chat participant system 105. The first chat participant may have chosen a personalization item from a location including the first chat participant system 105, the host system 110, or another host system. When the first chat participant chooses a personalization item that is locally stored on the first chat participant system 105, an identifier may be created for the chosen personalization item based upon a hash of the item data. The identifier, when sent to the a remote location such as the host 110, may be checked to determine if the chosen personalization item is already known to the host system, and if so, whether the personalization item is designated as, for example, an official item. This allows the first chat participant to select personalization items from the first chat participant's own client system, but prevents the host system or other remote location from needing to store duplicate copies of the same items. Also, the host system or other remote location is able to determine if such items are specially designated as, for example, official items and may be rendered to users who desire to view only items so designated.

Finally, the first chat participant system 105 optionally receives the identifier(s) for the selected personalization items to enable storage at the first chat participant system (step 1640).

The relative order of steps 1605-1635 with respect to other steps in procedure 1600, and also with respect to each other, may vary. Certain steps may be omitted entirely, as appropriate.

FIG. 6 illustrates one example of a first chat participant UI 600 for enabling a first chat participant to select personalization items, and is discussed above with respect to FIGS. 5A and 5B.

FIG. 7 illustrates an example of a first chat participant UI 700 for enabling a first chat participant to select an icon or avatar (or a personalization item) and is described above with respect to FIGS. 5A and 5B.

FIG. 8 illustrates an example of a UI 800 for enabling a first chat participant to select chat wallpaper (or a personalization item) and is discussed above with respect to FIGS. 5A and 5B.

FIG. 9 illustrates an example of a UI 900 for enabling a first chat participant to select smiley themes (or a personalization item) and is discussed above with respect to FIGS. 5A and 5B.

As discussed with respect to FIGS. 6-9, the personalization item perception and selection may be assisted by user interfaces 600, 700, 800 and 900, which enable the first chat participant to make a selection using a mouse or other input device.

Personalization item(s) may be selected manually by the first chat participant or the personalization item(s) may be automatically selected for the first chat participant. The first chat participant personalization items may be made available to the first chat participant system by obtaining one or more identifiers corresponding to the personalization items selected the first chat participant. The identifiers may be associated with a screen name or other identifying information of the first chat participant. For example, the identifiers may be associated with the screen name of the first chat participant and stored locally at the first chat participant system, or the first chat participant system may retrieve the identifiers associated with the screen name of the first chat participant from another location, such as a host system, including the chat host system, or another remotely-accessible data store.

Referring to FIG. 17, an exemplary process 1700 may be used to render a personalization item. In procedure 1700, the first chat participant system 105 loads/invokes a local application (1705). The invocation may result from user selection of the interface or it may occur automatically in response to a triggering event, such as the receipt of a chat message. Loading/invoking a local application may include invoking an application having an interface that renders a personalization item such as, for example, a chat program having a local client or local interface (e.g., a browser).

The local application may be loaded/invoked (1705) at various times. In one implementation, a local application having personalization items to be rendered may be loaded/invoked upon literal loading of the client application. For instance, the application may be loaded or invoked without regard to whether the personalization items are being rendered in the main interface of the application or in a sub-interface of the application. In another implementation, a local application having personalization items to be rendered may be loaded/invoked only after an interface within the application is invoked that requires a host-based personalization item, even if the application itself were previously loaded/invoked. For example, a chat communications window may be invoked after the chat application has been loaded. In yet another implementation, a local application having personalization items to be rendered may be loaded/invoked upon receiving a status updated from a remote source other than the host system 110. For example, while a chat communications window/session is open, if the application is notified that the status of the remote communications has changed, the process may be invoked such that an identifier is accessed based on the received message or credentials, for example, the screen name of the party whose status has changed, and used as the basis for identifying an appropriate personalization item from the host.

In one implementation, the personalization items are not downloaded until a triggering event occurs. Once a triggering event, such as the loading of an application UI, occurs, the personalization item may be down loaded.

Next, the first chat participant system 105 accesses the identifier(s) associated with possible personalization items to be rendered with respect to the first chat participant (step 1710). For example, where identifier(s) have been selected, received, and subsequently stored by the first chat participant system 105, as described with respect to step 1635 of procedure 1600, they then are submitted to the appropriate host for retrieval of the personalization item(s) corresponding to the identifier(s) (step 1715). In one implementation, the first chat participant system 105 requests the corresponding personalization item from the host system 110 or a location otherwise specified by or inferred from the identifier. That is, the first chat participant system 105 may request the corresponding personalization item from another location such as a remote, third party server different from host system 110.

Thus, the identifier generally identifies the personalization items that reside on the host. It may do so explicitly, by referencing particular personalization items or indirect addressing for such personalization items stored elsewhere, or it may do so indirectly by referencing groups of personalization items. Where indirect, it may identify a predefined grouping, or it may instead merely identify the user specifically (e.g., a screen name) or by class (e.g., business class user to be provided business class personalization items).

The identifiers corresponding to the personalization items to be projected by the first chat participant may be chosen on behalf of the first chat participant system by others, or may be presented to the first chat participant to depict the status or attributes of others. The identifier may be chosen to override or supplement a selection of personalization items to be projected by others, or may be chosen as a default in the absence of a selection by others.

Next, the host system 110 receives the identifier call from the first chat participant system 105 (step 1720), and the host system accesses the personalization item(s) associated with the identifier(s) (step 1725). Where indirect personalization item identifiers are used, the host system 110 uses the received identifier to locate other identifiers for personalization items associated with the submitted identifier.

Thereafter, the host system 110 communicates personalization items to (or on behalf of) the first chat participant system 105 with the personalization item(s) corresponding to the submitted identifier(s) (step 1730), and the first chat participant system 105 renders the personalization item(s) (step 1735). Upon receipt of personalization items from the host system 110, the first chat participant system 105 save the personalization item(s) in a memory or other storage at the local first chat participant system 105 (e.g., it may cache them for future access/display).

The relative order of steps 1705-1735 with respect to other steps in procedure 1700, and also with respect to each other, may vary. Certain steps may be omitted entirely, as appropriate.

FIG. 10 shows an example of a chat participant list 1005 and is discussed above with respect to FIGS. 5A and 5B.

The chat participant list bar 1105 may contain personalized links 1105a, 1105b, 1105c, and 1105d to content and may have a customized appearance. The chat participant list image 1110 and the chat participant list background image 1115 may be, for example, image files from a remote source. The chat participant list background image 1115 may have a washed out appearance. The chat participant list fill pattern 1120 may be a color or pattern background for the buddy list, or may also be an image. One or more of these personalization items may be transmitted to a first chat participant and rendered on the first chat participant system 105. The transmission of the personalization items may occur during machine-to-machine communications that are not visible to the user.

FIG. 10 illustrates one example of a chat UI 1000 and is discussed above with respect to FIGS. 5A and 5B.

Figure 18:
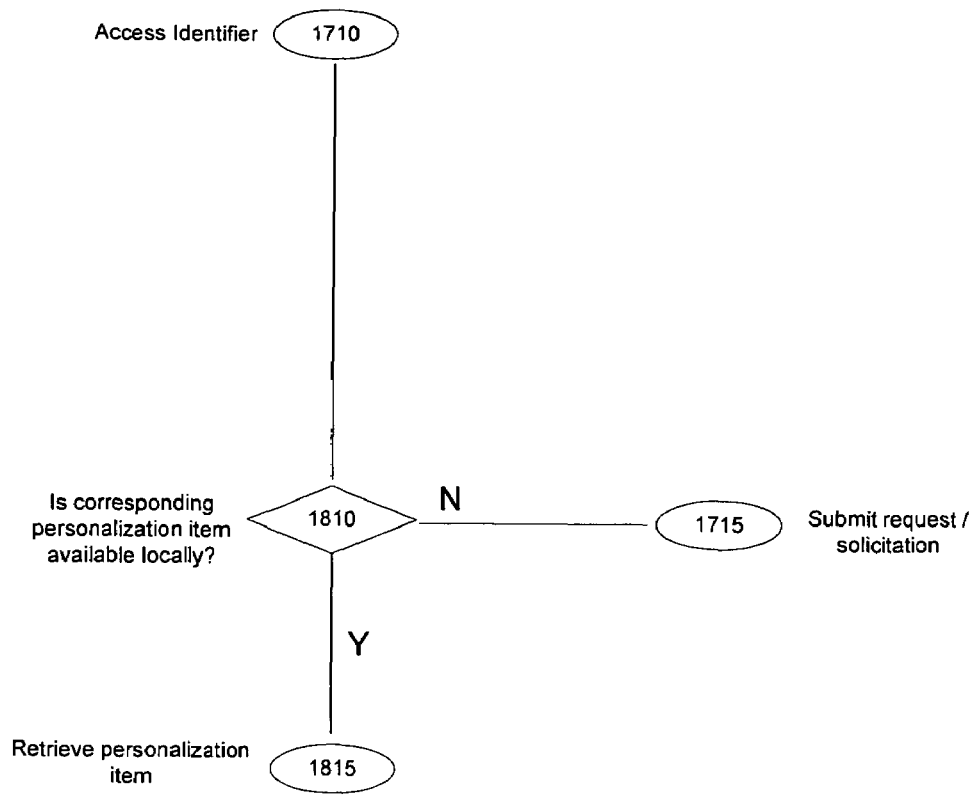

Referring to FIG. 18, procedure 1800 illustrates one possible method for discerning between personalization items to be retrieved locally by the first chat participant system 105 and items to be retrieved remotely from the first chat participant system. In procedure 1800, after the first chat participant system accesses identifier(s) associated with possible personalization items to be rendered (1710, see procedure 1700), the first chat participant system 105 determines whether the corresponding personalization item is available locally (step 1810). For example, the first chat participant system 105 may have stored the corresponding personalization in a local memory or another local storage location, and the identifier may specify or be otherwise useful in determining the location at which the corresponding personalization item is stored.

If the corresponding personalization item is not available locally, the first chat participant system 105 submits the identifiers to the appropriate host (step 1715), as described above with respect to procedure 1700.

If the corresponding personalization item is available locally, the first chat participant system retrieves the corresponding personalization item (step 1815), and then renders the personalization item (step 1735) as described above with respect to procedure 1700.

In another implementation, the host is first interrogated as to whether the corresponding personalization item is located on the host. In another implementation, a list is maintained and a search is performed on the list or on a known directory or location.

FIGS. 19, 21, 22, and 23 illustrate exemplary procedures 1900, 2100, 2200, and 2300 to make a personalization item selected by an intended chat destination recipient perceivable to the first chat participant during a chat communications session, and, more particularly, to render the personalization item associated with an intended second chat participant to the first chat participant prior to the communication of a chat message with the intended recipient system.

Procedures 1900, 2100, 2200, and 2300 generally involve rendering a personalization item and may be implemented by various types of hardware, software, device, computer, computer system, equipment, component, program, application, code, or storage medium. In one implementation, a host 110 may be used in place of the chat host 310. Furthermore, although not shown in FIGS. 19, 21, 22, and 23, the first chat participant system 105 and the chat host system 310 may be directly or indirectly interconnected through known or described delivery networks, examples of which are described with respect to network 160.

The procedures 1900, 2100, 2200, and 2300 may be implemented in a client/host context, or a standalone or offline client context. For example, while some functions of procedures 1900, 2100, 2200, and 2300 may be performed entirely by the first chat participant system 105, other functions may be performed by the chat host system 310 or the collective operation of the first chat participant system 105 and the chat host system 310. For instance, a personalization item may be rendered entirely by the first chat participant system 105, or the personalization item may be rendered based upon information provided to the first chat participant system 105 by the chat host system 310.

The personalization item may be rendered by the standalone/offline device and may be accessed or updated through a remote device in a non-client/host environment such as, for example, a LAN server serving an end user or a mainframe serving a terminal device. Thus, the procedures 1900, 2100, 2200, and 2300 described below may be implemented for any OSP, ISP, browser and/or other software program having a graphical user interface, such as programs for chat, chat, electronic mail and stand-alone browsers.

Figure 19:
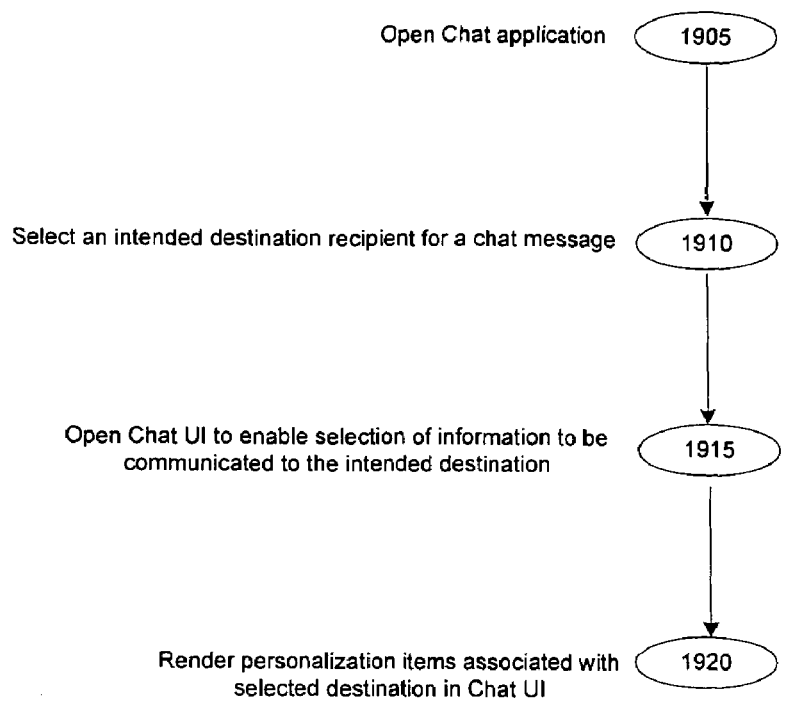

Referring to FIG. 19, in the procedure 1900, the first chat participant opens a chat application on the first chat participant system 105 (step 1905). FIG. 6 describes an exemplary interface available to the first chat participant, which may be used to open a chat application on the first chat participant system and which will be described below.

Figure 20:
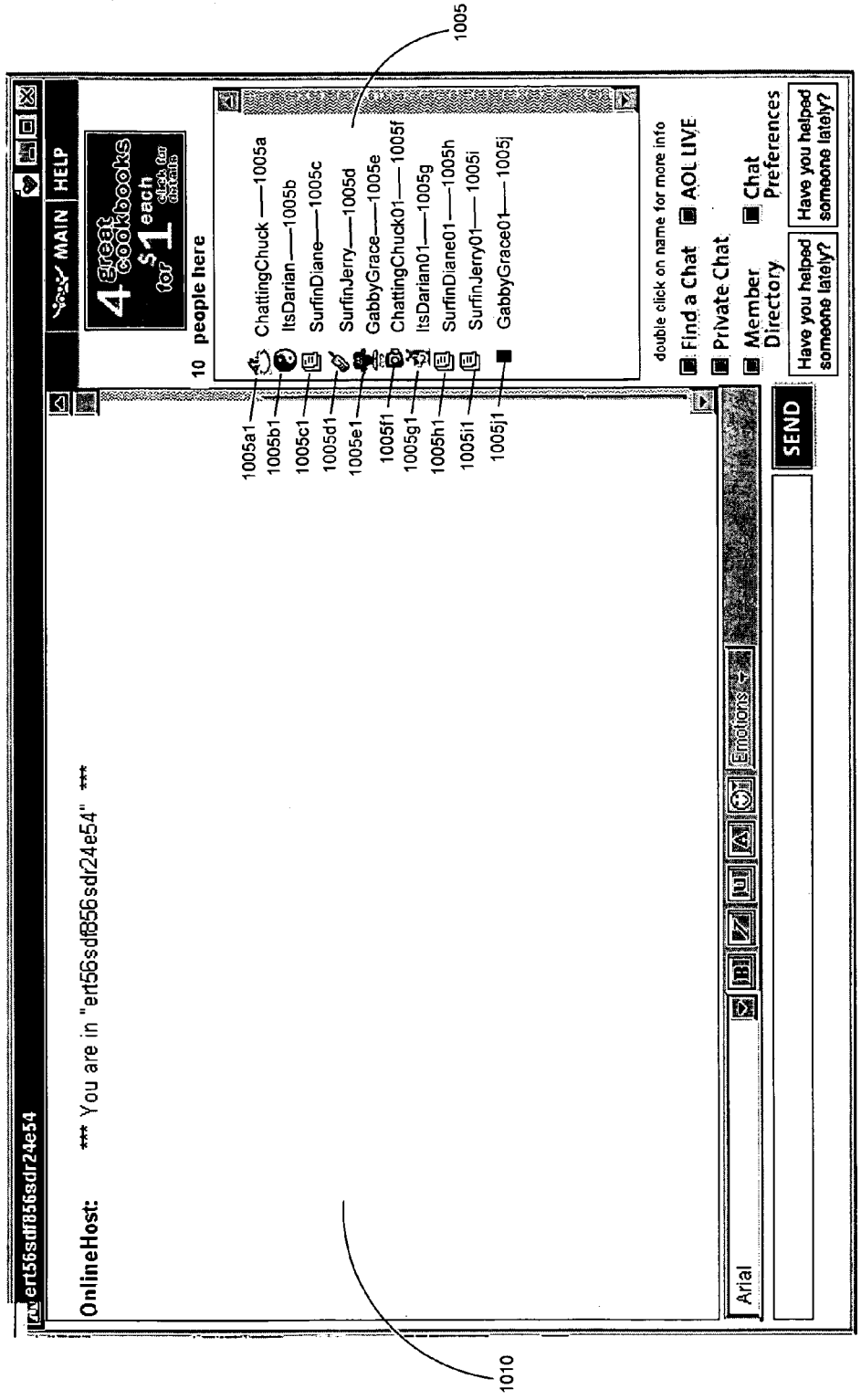

Next, an intended destination recipient (hereinafter "second chat participant") is selected (step 1910). Selecting an intended destination recipient includes making a selection so that a message will be posted in the chat room. FIG. 20 illustrates an exemplary interface available to the first chat participant, which will be described below, and which may be used to select an intended destination recipient.

Next, a chat user interface (UI) is opened to enable selection of information to be communicated to the intended destination (step 1915). A user interface may be manipulated to open a chat user interface.

Finally, the personalization items associated with the selected second chat participant are rendered in the chat UI subsequently, during the present and future chat sessions involving the intended destination (step 1920). FIG. 20 describes an exemplary interface available to the first chat participant which may be used when rendering the personalization items of the selected second chat participant, and which will be described below.

The second chat participant may have chosen a personalization item from a location including the second chat participant system 305, the chat host system 310, or another host system. When the second chat participant chooses a personalization item that is locally stored on the second chat participant system 305, an identifier may be created for the chosen personalization item based upon a hash of the item data. The identifier, when sent to a remote location such as the chat host 310, may be checked to determine if the chosen personalization item is already known to the host system, and if so, whether the personalization item is designated as, for example, an official item. This allows the second chat participant to select personalization items from the second chat participant's own client system, but prevents the host system or other remote location from needing to store duplicate copies of the same items. Also, the host system or other remote location is able to determine if such items are specially designated as, for example, official items and may be rendered to users who desire to view only items so designated.

FIG. 20 illustrates an example of a UI 2000 that may be presented to a user of a chat service provider. The UI 2000 is similar to that described above with respect to FIG. 10, however, not chat communications have yet taken place in the chat room with respect to a chat participant whose personalization items are to be rendered. More particularly, the UI 2000 includes a chat participant list 1005 that enables a first chat participant of a chat service to, among other things, perceive the presence state of other second chat participants that have joined the chat room, and to send chat messages to second chat participants on the chat participant list 1005. As shown, there are ten chat participants, including the first chat participant 1005*a* and nine second chat participants 1005*b*, 1005*c*, 1005*d*, 1005*e*, 1005*f*, 1005*g*, 1005*h*, 1005*j* present in the chat room. The chat participant list 1005 may include personalization items for each participant. As shown, the chat participants 1005*a*, 1005*b*, 1005*c*, 1005*d*, 1005*e*, 1005*f*, 1005*g*, 1005*h*, and 1005*j* have corresponding personalization items 1005$a_1$, 1005$b_1$, 1005$c_1$, 1005$d_1$, 1005$e_1$, 1005$f_1$, 1005$g_1$, 1005$h_1$, and 1005$j_1$ displayed respectively.

The UI 2000 includes a chat display area 1010 to display the messages of an active chat session 1015. An active chat session has not yet begun in the example of FIG. 20.

Personalization items of the second chat participant may be made available to the first chat participant upon activating UI 1000 and without having to wait to receive a communication such as a chat message from the second chat participant. The first chat participant system 105 selects the identifiers corresponding to the personalization items of the second chat participant. The identifiers may be associated with a screen name or other identifying information of the second chat participant. For example, the identifiers may be associated with the screen name of the second chat participant and stored locally at the first chat participant system 105, or the first chat participant system may retrieve the identifiers associated with the screen name of the second chat participant from another location such as the chat host system 310 or another remotely-accessible data store such as the second chat participant system 305 or a remote or third-party server.

The first chat participant system 105 uses the identifiers to determine if the corresponding personalization items are available locally at the first chat participant system, and if so, the first chat participant system retrieves the corresponding personalization items. If the personalization items are not available locally at the first chat participant system 105, the first chat participant system requests the personalization items from another location such as a chat host system 310 or another remotely-accessible data store. Once the first chat participant system 105 locates or receives the personalization items of the second chat participant, the first chat participant system renders the items on UI 1000 for perception by the first chat participant.

For example, wallpaper or a different personalization item reflective of settings established for a selected buddy may be rendered on the chat participant list 1010 of the first chat participant when the first chat participant rolls a mouse pointer over the name of the second chat participant or otherwise specifies a user in the chat participant list 1005. In another implementation, the first chat participant may tie the participant's wallpaper or other personalization item setting to follow that of a selected participant on the chat participant list 1010. In other words, the personalization item of the first chat participant may be set to follow that of a selected second chat participant, for example second chat participant 1005*b*, such that when second chat participant 1005*b* makes a change to the wallpaper or other personalization item, the resulting change is reflected to the first chat participant in the personalization items rendered for the first chat participant.

Chat personalization items of the second chat participant may be rendered by various types of hardware, software, device, computer, computer system, equipment, component, program, application, code, or storage medium. In one implementation, the chat personalization items may be rendered in a client/host context, and the chat personalization items may be accessed or updated through a remote device in a client/host environment. In another implementation, the chat personalization items may be implemented in a standalone or offline client context. The chat personalization items may be rendered by the standalone/offline device and may be accessed or updated through a remote device in a non-client/host environment such as, for example, a LAN (Local Area Network) server serving an end user or a mainframe serving a terminal device.

Figure 21:
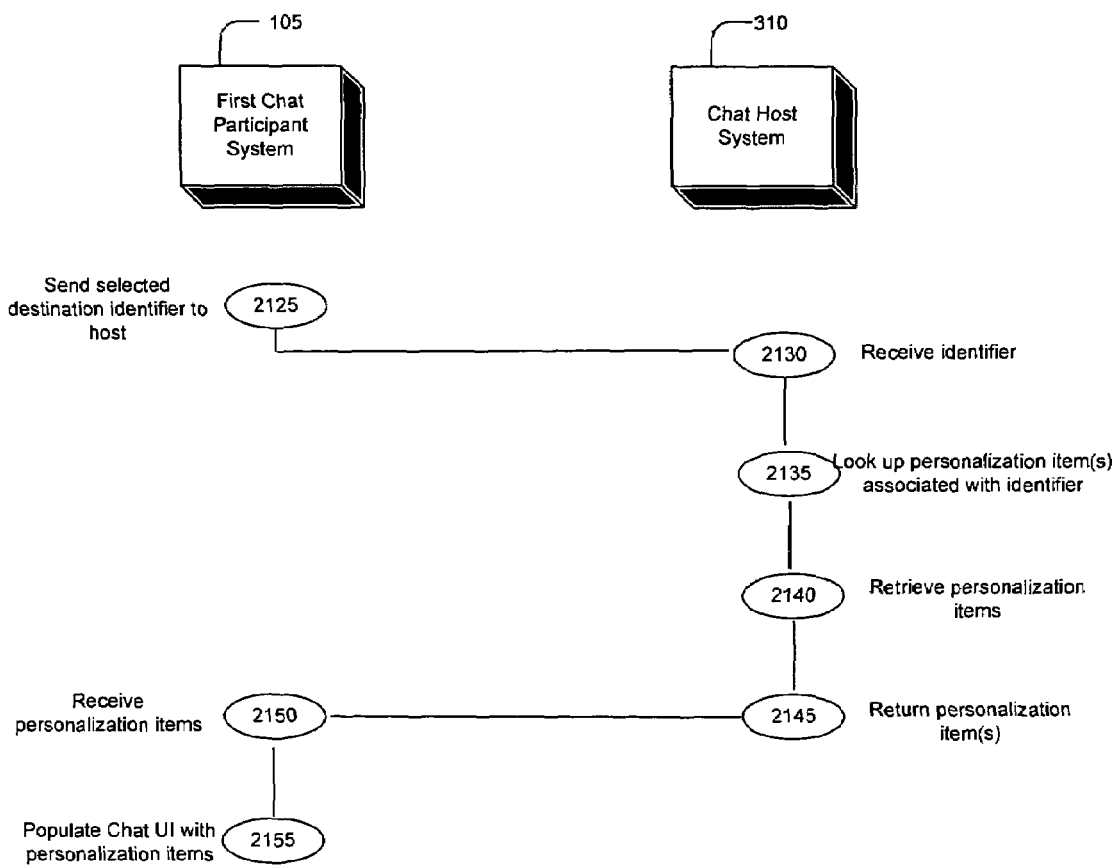

Regarding FIG. 21, procedure 2100 shows one possible implementation of rendering a personalization item associated with the selected second chat participant (step 1920), as described with respect to FIG. 19. In procedure 2100, personalization items of the selected second chat participant may be made available to the first chat participant system and rendered at the first chat participant system based on identifiers corresponding to the personalization items of the second chat participant, which may be maintained or accessed by the chat host system 310.

In procedure 2100, the first chat participant system 105 first sends the identifier corresponding to the personalization item to the chat host system 310 (step 2125). The identifiers may be associated with a screen name or other identifying information of the second chat participant. For example, the identifiers may be associated with the screen name of the second chat participant and stored locally at the first chat participant system, or the first chat participant system may retrieve the identifiers associated with the screen name of the second chat participant from another location, such as the chat host system or another remotely accessible data store.

The chat host system 310 receives the identifier from the first chat participant system 105 (step 2130).

Next, the chat host system 310 looks up the personalization item(s) associated with the identifier (step 2135), and retrieves the personalization item(s) corresponding to the identifier (step 2140). In other words, the first chat participant system uses the identifier to determine if the corresponding personalization item is available locally at the first chat participant system, and if so, the first chat participant system retrieves the corresponding personalization item. When the personalization item is not available locally at the first chat participant system, the first chat participant system 105 requests the personalization item by sending the selected identifier to the chat host system 310 or another remotely accessible data store (not shown). Alternatively, the personalization item itself may be associated with the second chat participant and retrieved by the first chat participant system 105.

Ultimately, the personalization item(s) are returned to the first chat participant system 105 (step 2145).

The corresponding personalization item(s) are received by the first chat participant system 105 (step 2150). Receiving the corresponding personalization item may include saving (e.g., caching) the personalization item in a memory or other storage at the local first chat participant system 105.

Finally, the chat UI is populated with the personalization item(s) (step 2155). That is, once the first chat participant system locates or receives the personalization item, the first chat participant system renders the item for perception by the first chat participant. As shown with respect to FIG. 7, the personalization items to be populated may include an icon 709 or chat wallpaper 707.

The relative order of steps 1905-1930 with respect to other steps in procedure 1900, and the relative order of steps 2125-

2155 with respect to other steps in procedure 2100, and also with respect to each other, may vary. Also, certain steps may be omitted entirely, as appropriate.

Figure 22:
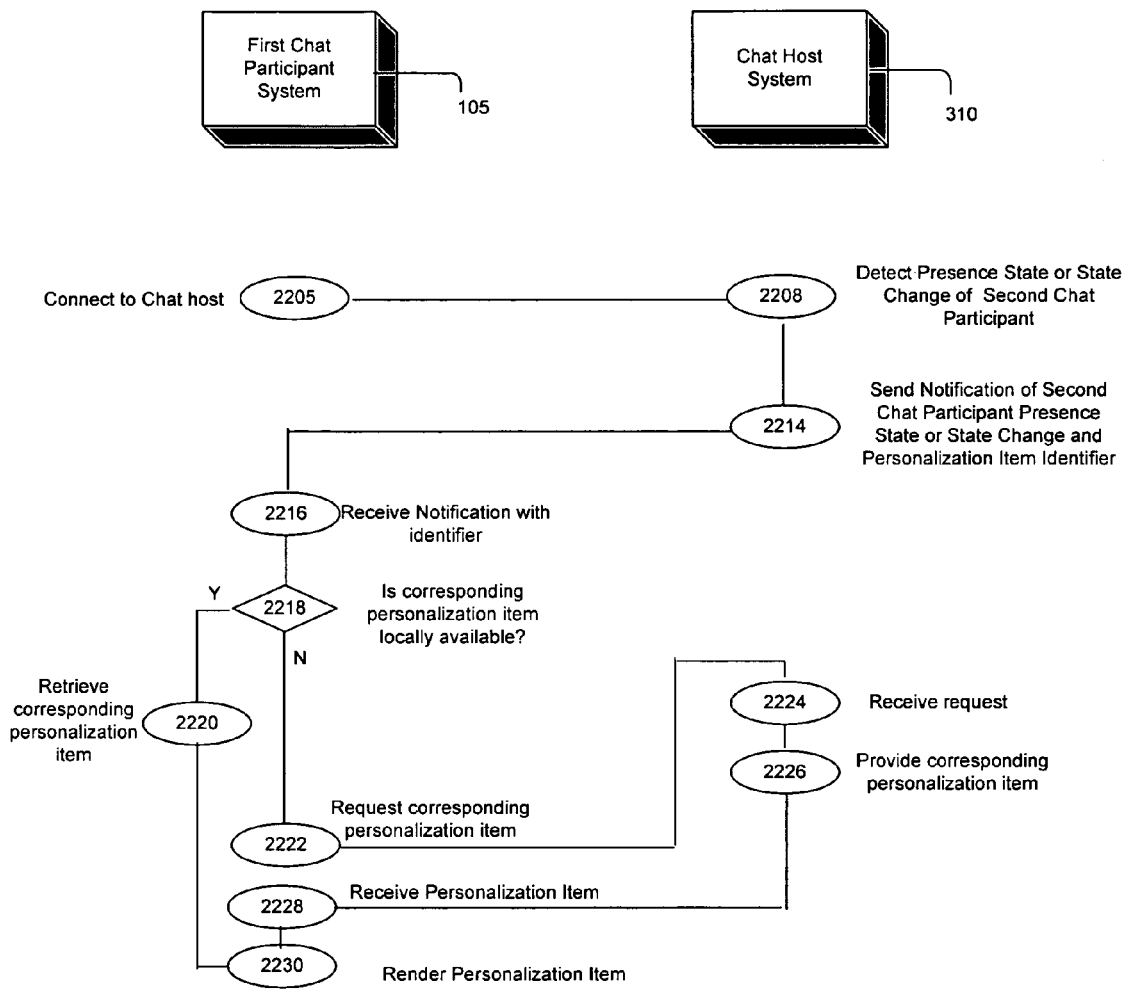
Figure 23:
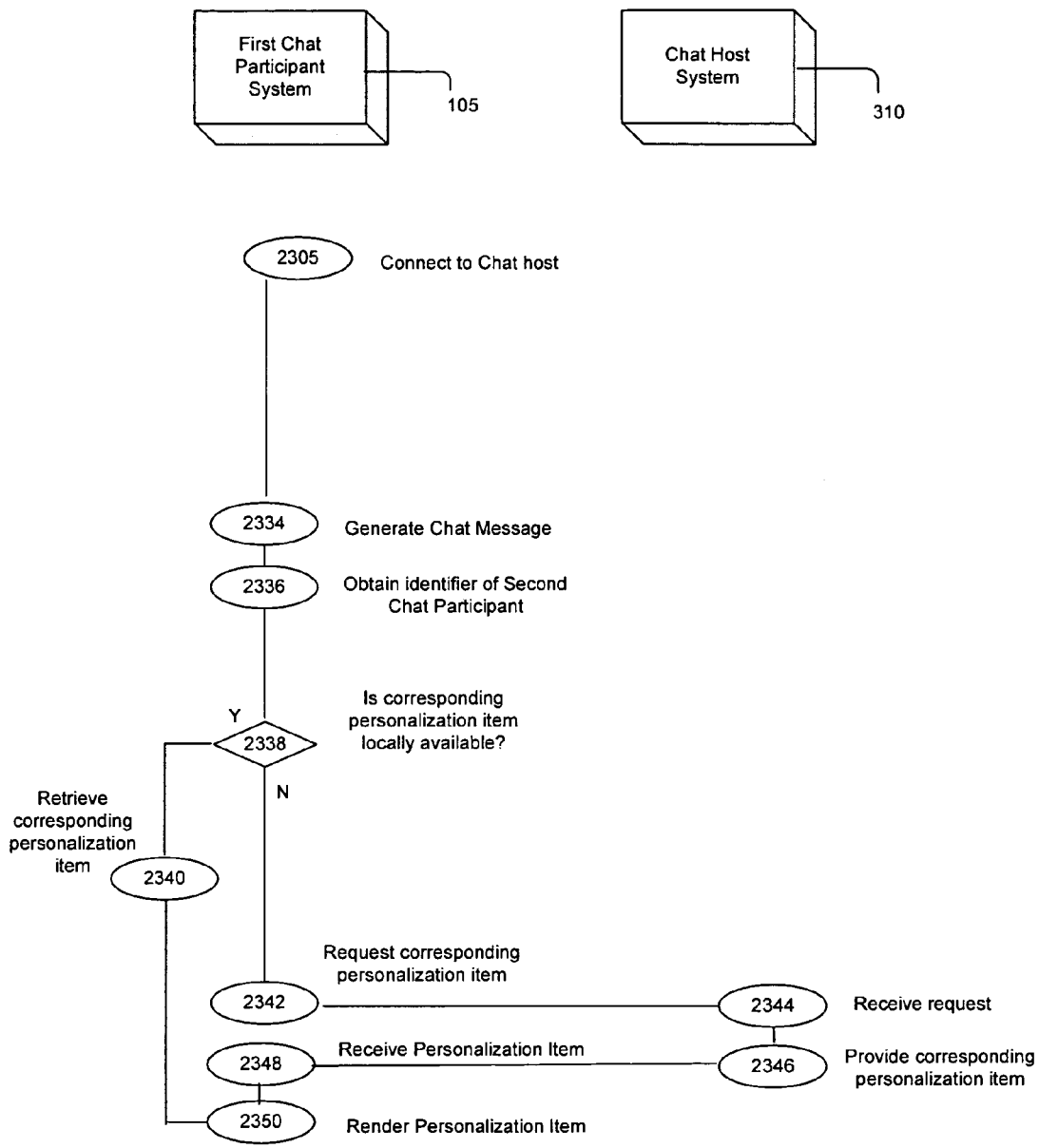

FIGS. 22 and 23 show one possible implementation of the procedures discussed with respect to FIGS. 19 and 21. The first chat participant system 105 and the chat host system 310 interact according to exemplary procedures 2200 and 2300 to make a personalization item selected by the second chat participant perceivable to the first chat participant during a chat communications session. FIGS. 22 and 23 differ from FIGS. 19 and 21 in that personalization items are made available in response to a triggering event (e.g., a detected change in presence of a user being monitored) rather than in response to invocation of an application or application interface.

Referring to FIG. 22, in the procedure 2200, the first chat participant system 105 and the chat host system 310 are physically and/or logically connected (step 2205). For instance, first chat participant system 105 may connect to the chat host system 310 across a network (e.g., network 160) by supplying a first chat participant identification and password to a server (e.g., a login server) in order to obtain access to the chat host system 310.

Next, the presence state or presence state change of the second chat participant system 305, e.g., login state, is detected by the chat host system 310 (step 2208). The chat host system 310 may detect presence states or state changes, such as, for example, when the second chat participant signs out, is inactive for a period of time, becomes active after having been inactive for a period of time, indicates an ability to receive chat messages, or indicates an inability to receive chat messages. A pool of potential second chat participants may be monitored and associated with the screen name of a sender through use of a chat participant list or similar mechanism. Alternatively, the entire user base may be monitored or some intelligent method of monitoring potential second chat participants may be used. The first chat participant may select one or more second chat participant to whom the first chat participant may wish to send a chat message.

After detecting the presence state or state change of the second chat participant system 305, the chat host system 310 may send or otherwise make accessible to the first chat participant system 105 and other chat systems a notification of the second chat participant presence state change or state change (step 2214). Sending notification of the presence state change may include sending an identifier corresponding to a personalization item selected by the second chat participant system 305. For example, the chat host system 310 may send an identifier corresponding to a sound chosen by the second chat participant for the presence state change.

In one implementation, the chat host system 310 assigns an identifier to the personalization item. In another implementation, the second chat participant system 305 assigns the identifier to the personalization item. In yet another implementation, the identifier is assigned by a host system other than the chat host system 310.

The identifier typically includes information allowing the corresponding personalization item to be located and retrieved. For example, the identifier may include a location of the personalization item. The identifier also may include a type identifier that identifies the personalization item as, for example, an icon or avatar, a chat wallpaper, an emoticon, or a sound. The type identifier also may include a file format of the personalization item. Also, the identifier may include one or more flags to indicate, for example, if the personalization item is a custom item or an "official" item, has been banned, or has expired. Another flag may redirect the sender to a different personalization item. The identifier may further include information concerning the size of the personalization item. The identifier may be in a predetermined format and may be of a predetermined length.

The first chat participant system 105 receives the notification from the chat host system 310 (step 2216). In the above example, receiving the notification may include receiving an identifier corresponding to a personalization item selected by the second chat participant system 305.

Next, the first chat participant system 105 determines whether the corresponding personalization item is locally available (step 2218). For example, the first chat participant system 105 may have stored the personalization in a local memory or another local storage location. The first chat participant system uses the identifier to determine whether the corresponding personalization item is locally available. For instance, the identifier may contain the location at which the corresponding personalization item is stored.

If the corresponding personalization item is available locally, the first chat participant system retrieves the corresponding personalization item (step 2220) and renders the personalization item (step 2230).

Otherwise, if the corresponding personalization item is not available locally, the first chat participant system 105 requests the corresponding personalization item from the chat host system 310 or a location otherwise specified by or inferred from the identifier (step 2222). That is, the first chat participant system 105 may request the corresponding personalization item from another location such as the second chat participant system 305 or a remote, third party server. Requesting the corresponding personalization item may include sending the identifier associated with the personalization item to the chat host system 310 along with a request to download the personalization item to the first chat participant system 105.

When the chat host system 310 receives the request for a personalization item from the first chat participant system (step 2224), the chat host system 310 provides the corresponding personalization item to the first chat participant system (step 2226). Receiving the request may include having the chat host system 310 receive the identifier associated with the personalization item along with a request to download the personalization item to the first chat participant system 105.

Next, the corresponding personalization item is received by the first chat participant system (step 2228), which may save the personalization item in a memory or other storage at the local first chat participant system 105. Then, the personalization item is rendered (step 2230). For example, as discussed above, the personalization items may include personalization items for a chat participant list.

Referring to FIG. 23, in procedure 2300, a chat message application is opened by the first chat participant system 105 (step 2305), in a similar manner to that discussed with respect to step 1905 of FIG. 19. The first chat participant may also open a chat UI, such as the UI 2000 shown in FIG. 20 and select an intended destination recipient, as discussed above with respect to steps 1910 and 1915 of FIG. 19, and generate a chat message (step 2334). In one implementation, rather than relying on a mechanism such as a chat participant list or a state change to identify users for which personalization items will be made available, a mechanism identifies the users for which personalization items will be made available based on users selected by the first chat participants for communications.

To make the personalization items of the second chat participant available to the first chat participant, the first chat participant system 105 selects the identifiers corresponding to the personalization items) of the second chat participant. The identifiers may be associated with a screen name or other identifying information of the second chat participant. As such, personalization items of the second chat participant may be made available to the first chat participant before the receipt by the first chat participant of a chat from the second chat participant.

The first chat participant system 105 uses the identifiers to identify the personalization item associated with the recipient, and to locate perceivable content corresponding to the identifier.

Because various aspects of steps 2336-2350 are similar to those discussed above with respect to steps 2216-2230 of procedure 2200, the following discussion of steps 2336-2350 is somewhat abbreviated.

The first chat participant system 105 obtains an identifier from the chat host system 310 (step 2336) corresponding to the personalization item selected by the first chat participant system 105, as discussed above with respect to step 2216.

Next, the first chat participant system 105 determines whether the corresponding personalization item is available locally (step 2338). As discussed above with respect to step 2218, the first chat participant system 105 may have stored the personalization in a local memory or other local storage location. The first chat participant system 105 uses the identifier to determine whether the corresponding personalization is available locally. For instance, the identifier may contain the location at which the corresponding personalization item is stored.

If the corresponding personalization item is available locally, the first chat participant system 105 retrieves the corresponding personalization item (step 2340) and the personalization item is rendered (step 2350).

Otherwise, if the corresponding personalization item is not available locally, the first chat participant system 105 requests the corresponding personalization item from the chat host system 310 (step 2342). Alternatively, as discussed above with respect to step 2222, the first chat participant system 105 may request the corresponding personalization item from another location. In one implementation, the personalization item may be provided by a third party, and may be made available in consideration of a payment by the first chat participant or the second chat participant. Requesting the corresponding personalization item may include sending to the chat host system 310 the identifier associated with the personalization item along with a request to download the personalization item to the first chat participant system 105.

The chat host system 310 receives the request for the personalization item from the first chat participant system 105 (step 2344). As discussed above with respect to step 2224, receiving the request may include receiving the identifier associated with the personalization item along with a request to download the personalization item to the first chat participant system 105. The chat host system 310 provides the corresponding personalization item to the first chat participant system 105 (step 2346).

The corresponding personalization item is received by the first chat participant system 105 (step 2348). As discussed above with respect to step 2228, receiving the corresponding personalization item may include saving the personalization item in a memory or other storage at the local first chat participant system 105.

Finally, the personalization item is rendered (step 2350). As discussed with respect to FIG. 7, the personalization item to be rendered may include an icon or avatar or chat wallpaper.

The relative order of steps 2205-2230 with respect to other steps in procedure 2200, and the relative order of steps 2335-2350 with respect to other steps in procedure 2300, and also with respect to each other, may vary. Also, certain steps may be omitted entirely, as appropriate. For example, referring to FIG. 22, if the second chat participant has not chosen a personalization item to be sent to the first chat participant system 105 upon a presence state change, then no such item will be sent and steps 2216-2230 may be eliminated entirely.

In one implementation, an icon or avatar of a second chat participant may be shown in a chat participant list, or other personalization items of a second chat participant may be shown in a chat participant list.

Figure 24:
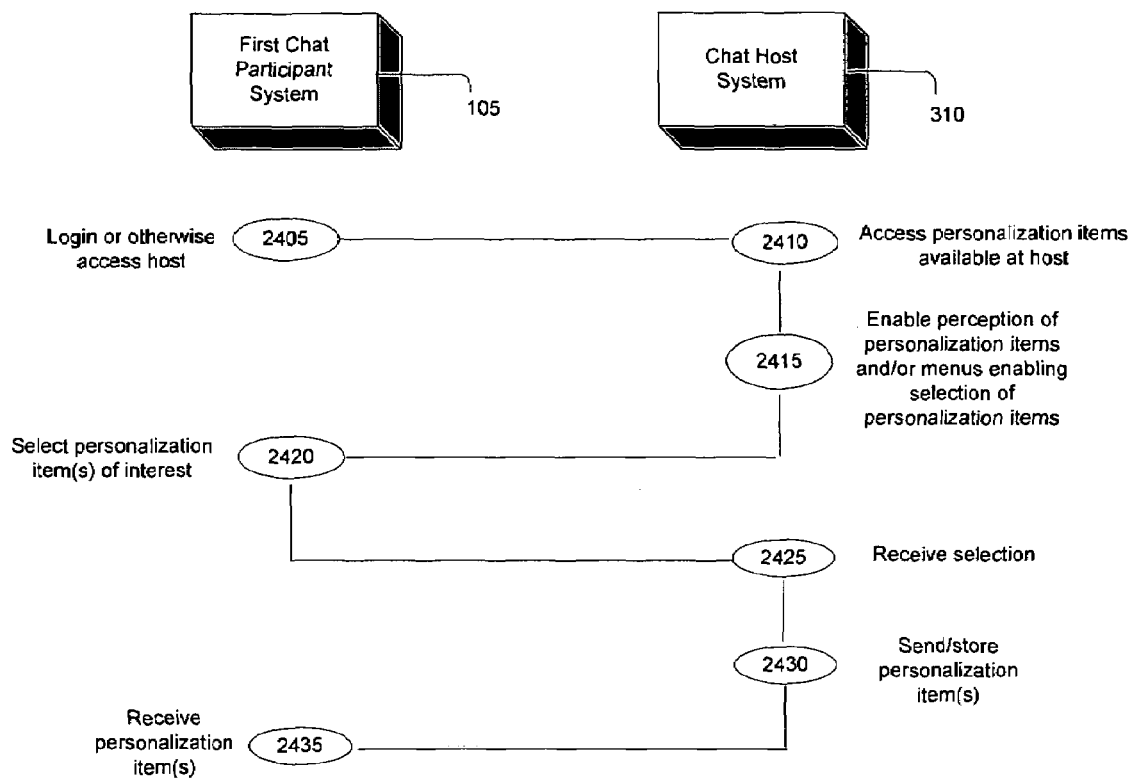
Figure 25:
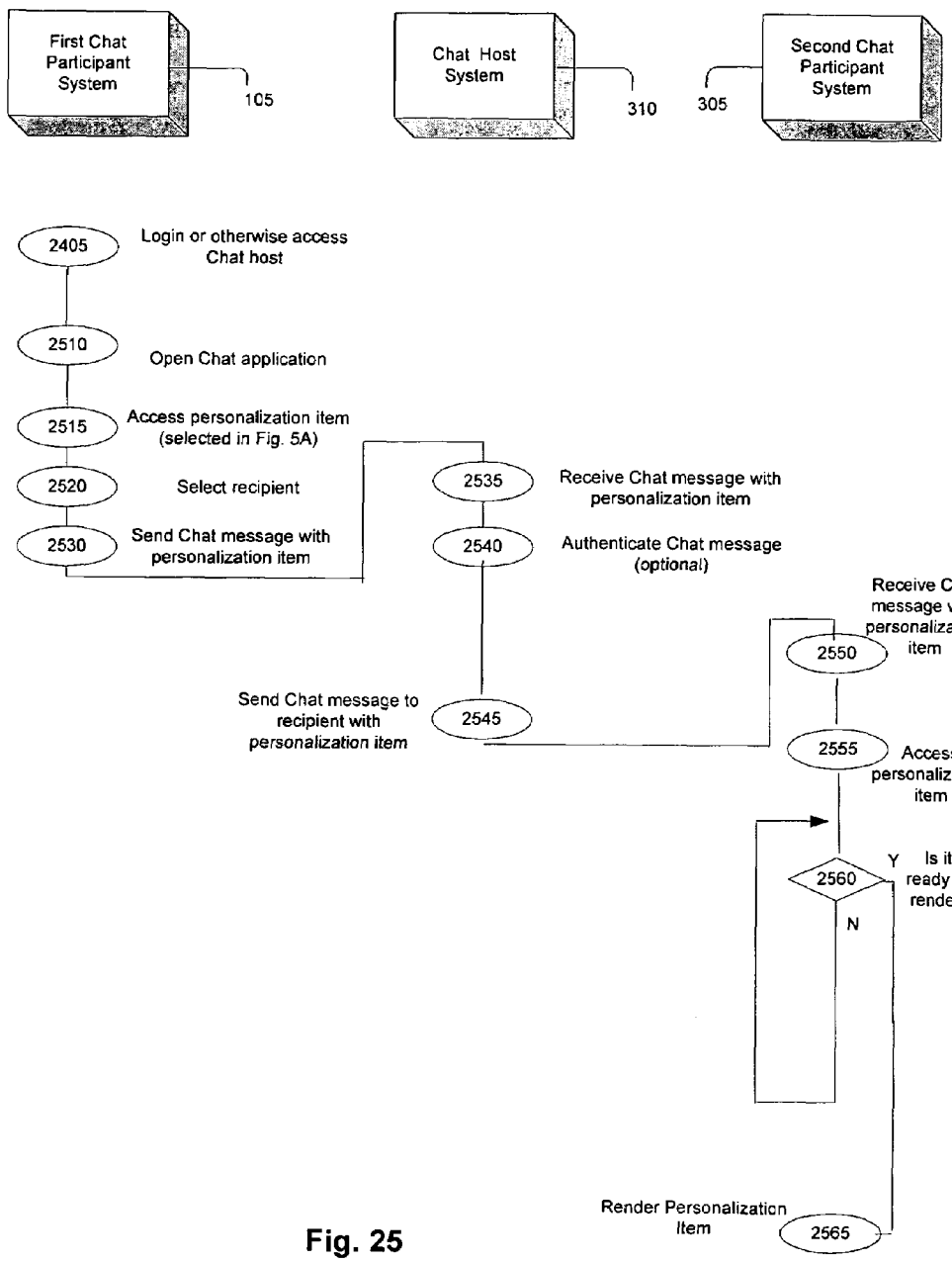

Referring to FIGS. 24 and 25, the first chat participant system 105 and the chat host system 310 interact according to exemplary procedure 2400 to enable a first chat participant to select a personalization item, and the first chat participant system 105, the chat host system 310, and the second chat participant system 305 interact according to exemplary procedure 2500 to make the personalization item selected in procedure 2400 perceivable to the second chat participant.

Procedures 2400 and 2500 may be implemented by various types of hardware, software, device, computer, computer system, equipment, component, program, application, code, or storage medium. Although not shown in FIGS. 24 and 25, the first chat participant system 105 and the chat host system 310 may be directly or indirectly interconnected through known or described delivery networks, examples of which are described with respect to network 160.

Procedures 2400 and 2500 may be implemented in a client/host context, or a standalone or offline client context. For example, while some functions of procedures 2400 and 2500 may be performed entirely by the first chat participant system 105 or the second chat participant system 305, other functions may be performed by the chat host system 310 or the collective operation of the first chat participant system 105, and/or the second chat participant system 305, and/or the chat host system 310. The personalization item may be respectively selected and rendered by the standalone/offline device, and the personalization item may be accessed or updated through a remote device in a non-client/host environment such as, for example, a LAN server serving an end user or a mainframe serving a terminal device. Thus, the procedures 2400 and 2500 described below may be implemented for any OSP, ISP, browser and/or other software program having a graphical user interface, such as programs for chat, instant messaging, electronic mail and stand-alone browsers.

Procedure 2400 generally involves selecting a personalization item. In the procedure 2400, the first chat participant system 105 logs into or otherwise accesses the chat host system 310 (step 2405). For instance, first chat participant system 105 may connect to the chat host system 310 across a network (e.g., network 160) by supplying credentials to a server (e.g., a login server). More specifically, a browser may be used to access a web-available interface, a chat message may be used to access a selectable interface, or a chat client that has an interface to a host may be used, among other options.

The chat host system 310 accesses personalization item appropriate for and selectable by the first chat participant system 105 (step 2410). In one implementation, the chat host system 310 may use a screen name of the first chat participant system 105 or another identification of the first chat participant system 105 to select/identify personalization item available to the first chat participant system 105.

Next, the chat host system 310 enables perception by the first chat participant system 105 of personalization item and/or menus enabling the selection of personalization item by the first chat participant system 105 (step 2415). FIGS. 6-9, discussed above, describe various interfaces available to the user, which may be used to select personalization item.

Based on the personalization item or menus provided or otherwise made perceivable to the first chat participant system, the first chat participant system selects personalization item of interest (step 2420).

The first chat participant may have selected personalization item from a location including the first chat participant system 105, the chat host system 310, or another host system. When the first chat participant chooses personalization item that is locally stored on the first chat participant system 105, an identifier may be created for the chosen personalization item based upon a hash of the item data. The identifier, when sent to the a remote location such as the chat host 310, may be checked to determine if the chosen personalization item is already known to the host system, and if so, whether the personalization item is designated as, for example, an official item. This allows the first chat participant to select personalization item from the first chat participant's own client system, but prevents the host system or other remote location from needing to store duplicate copies of the same items. Also, the host system or other remote location is able to determine if such items are specially designated as, for example, official items and may be rendered to users who desire to view only items so designated.

The chat host system 310 receives the personalization item selection from the first chat participant system 105 (step 2425), and responsive thereto, the chat host system 310 sends and/or stores one or more of the selected personalization item (step 2430). The chat host system 310 may store the item(s) in a memory or other storage, either local or remote to the chat host system 310. The chat host system 310 also may send the item(s) to the first chat participant system 105 in a communication such as a chat message, or in communication associated with such a message.

Finally, the first chat participant system 105 receives the selected personalization item (step 2435). The items may include information allowing the personalization item to be rendered by the second chat participant system. For example, the personalization item may include a type identifier that identifies the personalization item as personalization item. Also, the personalization item may include one or more flags to indicate, for example, if the personalization item is a custom item or an "official" item, has been banned, or has expired. The personalization item may further include information concerning its size. The personalization item may be in a predetermined format and may be of a predetermined length.

The relative order of steps 2405-2435 with respect to other steps in procedure 2400, and also with respect to each other, may vary. Furthermore, certain steps may be omitted entirely, as appropriate.

As discussed with respect to FIGS. 6-9, the personalization item perception and selection may be assisted by user interfaces 600, 700, 800 and 900, and the first chat participant may make the selection using a mouse or other input device. Personalization item may be selected manually by the first chat participant or the personalization item may be automatically selected for the first chat participant.

Procedure 2500 generally involves transporting and rendering personalization item. In procedure 2500, the first chat participant system 105 accesses the chat host system 310 as described with respect to FIG. 24 (2405).

The first chat participant opens a chat application on the first chat participant system 105 (step 2510).

Next, one or more personalization item are selected, for example, in the manner discussed with respect to FIG. 24, and the selected items are accessed by the first chat participant system 105 (step 2515). As discussed with respect to FIGS. 6-9 the selection may be made with the assistance of interfaces 600, 700, 800, and 900, and the first chat participant may make the selection using a mouse or other input device. The personalization item may be selected manually by the first chat participant or may be automatically selected for the first chat participant. Typically, the items are stored at the first chat participant system 105. However, the items may be stored at other locations such as the chat host system 310 or another host system.

Next, a second chat participant is selected (step 2520). For example, as shown with respect to FIG. 10, a buddy 1025a may be selected from a buddy list 1025.

Thereafter, a chat message, including the selected personalization item, is generated by the first chat participant system 105 and sent to the second chat participant system 305 (step 2530). The first chat participant system 105 need not supply the chat host system 310 with the selected personalization item. Rather, the chat host system 310 may append or otherwise communicate the personalization item to the second chat participant, even if a message without personalization item is sent by the first chat participant system 105, based upon the host having knowledge of the personalization item selected by the first chat participant system 105, or based upon an identifier that may be provided by the first chat participant system 105 to the chat host system 310 rather than the personalization item itself.

The chat host system 310 receives the instant message and the item (step 2535). The chat host system 310 then may optionally authenticate the instant message for security purposes (step 2540).

The chat host system 310 sends the chat message and the selected personalization item(s) to the second chat participant system 305 (step 2545).

The second chat participant system 305 receives the chat with the personalization item(s) from the chat host system 310 (step 2550). The personalization item(s) may be received in a single message, or portions of the personalization item(s) may be transported in more than one message and the complete personalization item assembled at the second chat participant system 305.

The second chat participant system 305 accesses the personalization item(s) or portions of the personalization item(s) available at the second chat participant system (step 2555).

Next, the second chat participant system 305 determines whether the personalization item is ready to be rendered (step 2560).

If the corresponding personalization item is ready for rendering, the second chat participant system 305 renders the personalization item (step 2565), as described below with respect to step 2565. The personalization item may be ready for rendering in its entirety if the entire personalization item has been received. The second chat participant system 305 may wait until the entire personalization item is received to render the personalization item. Otherwise, the personalization item may be progressively rendered by the second chat participant system 305.

If the personalization item is not available for rendering, the second chat participant system 305 waits until the personalization item is available for rendering.

The relative order of steps 2510-2565 with respect to other steps in procedure 2500, and also with respect to each other, may vary. For example, a recipient may be selected in step 2520 before accessing personalization item in step 2515.

FIG. 10, discussed above, illustrates an example of a UI 1000 that may be presented to a user of a chat service. The UI 1100 includes personalization items from the second chat participants and personalization items from the first chat participant. A personalization item may be transported from the second chat participant to the first chat participant by inserting the personalization item into a chat message from the second chat participant to the first chat participant. The first chat participant system 105 receives the instant message containing the embedded personalization item and renders the personalization item.

Similarly, a personalization item chosen by the first chat participant may be rendered in UI 1000. When the first chat participant sends a chat message to a second chat participant, the personalization item may be transported along with the chat message. Once received, the second chat participant system 305 renders the personalization item.

FIG. 10 also shows an example of a chat participant list 1005, and is described above. The chat participant list 1005 may include personalization items. The first chat participant may select a personalization item manually, or the personalization item may be selected automatically for the first chat participant. The personalization item may be rendered to the first chat participant as described above with respect to step 2432 of FIG. 25 and may be made perceivable to the second chat participant as described with respect to FIGS. 24 and 25.

One or more of these personalization item may be transmitted to a second chat participant and rendered on the second chat participant system 305. The transmission of the personalization item may occur during machine-to-machine communications that are not visible to the user.

In one implementation, the second chat participant and/or the first chat participant may pay a subscription fee to access/use certain personalization item, and the personalization item may be provided by a third party. In another implementation, the personalization item expire and must be replaced after a predetermined event such as a predetermined length of time, passage of a predetermined date, or a predetermined number of uses. Also, a personalization item may be banned if, for example, it is deemed to be offensive, inappropriate, or to otherwise violate a term of service agreement. If it is determined that the personalization item is expired or banned, display of such a personalization item will be disallowed and the user typically will be required to choose a different personalization item.

In one implementation, the second chat participant and/or the first chat participant may pay a subscription fee to access/use certain personalization items, and the personalization items may be provided by a third party such as a server other than the chat host 310. In another implementation, the personalization items expire and must be replaced after a predetermined event such as a predetermined length of time, passage of a predetermined date, or a predetermined number of uses. Also, a personalization item may be banned if, for example, it is deemed to be offensive, inappropriate, or to otherwise violate a term of service agreement. If it is determined that the personalization item is expired or banned, display of such a personalization item will be disallowed and the user typically will be required to choose a different personalization item.

Turning now to selecting one or more personalization items or personas to be projected by a user in a chat room based on an identity of a chat room, users may assign a personalization item or a persona to be projected when conversing with other users in a chat room, either in advance of or "on-the-fly" during a communication session. This allows the user to project different personas in different chat rooms or different groups of chat rooms. A chat user may pre-select a particular persona to be displayed while communicating in a particular chat room by associating a particular persona with a particular chat room identity. For example, a chat user may associate the name of a particular persona of the user with the chat room identity. When the chat user later enters the chat room, the predetermined association is used to select the persona to be projected by the chat user in the chat room. The association, that has been either pre-selected or otherwise determined by the chat user, may be stored so as to persist across communication sessions. Alternatively, the association may be used only in the communication session in which the association was pre-selected or otherwise determined.

A chat user also may select, during a communication session, a persona to be displayed before entering or while participating in a particular chat room during the same communication session. This may be referred to as selecting a persona "on the fly" during a communication session. A chat user may be able to override a previously made association between a persona and a chat room by selecting a persona "on the fly" during a communication session that may have another persona associated with the communication session.

In many instances, a chat user may have multiple online personas for use in a chat communications session. By associating personas with chat rooms identities, a chat user may choose to display a different persona in different chat rooms. Each online persona is associated with one or more personalization items, such as an icon or avatar, wallpaper, sounds, and smileys. In many cases, each online persona of a particular chat user is associated with different sounds or groups of sounds. This need not be necessarily so. Moreover, even when two or more online personas of a particular chat user include the same sounds, the settings for which sounds are played when may be different for each of the online personas. In one example, a chat user has a persona that includes sounds to alert the user when other users enter or exit the chat room. When a user enters the chat room, the sound of a door opening is played and when a user leaves the chat room, the sound of a door closing is played. This grouping of sounds may be associated with two of the chat user's online personas. However, the settings for the sounds may be different in each of the personas. For example, the sound group of the first persona may only play when a second chat user who is also on the first chat user's buddy list enters or leaves the chat room, whereas the sound group of the second persona may play when any other user enters or leaves the chat room.

Figure 26A:
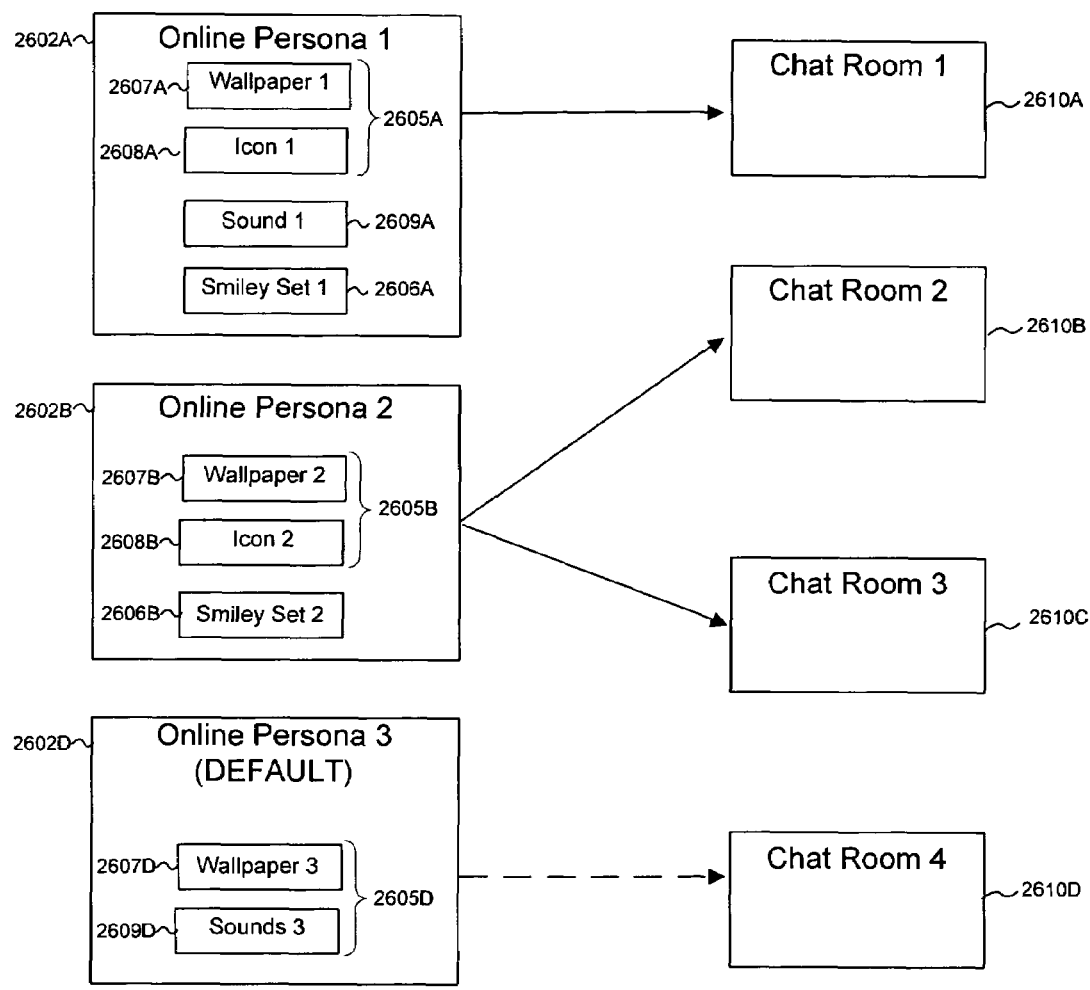
FIG. 26A is a block diagram illustrating relationships between online personas and chat rooms.

FIG. 26A shows an example 2600 of relationships between online personas of a user and chat rooms. More particularly, FIG. 26A shows online personas 2602A, 2602B, and 2602D of a user and chat rooms 2610A, 2610B, 2610C, and -2610D visited by the user. Each of the online personas 2602A, 2602B, or 2602D includes corresponding personalization items 2605A, 2602B or 2605D. More particularly, the online persona 2602A includes emoticons (e.g., smileys) 2606A, wallpaper 2607A, an icon 2608A, and a sound group 2609A as personalization items 2605A. The online persona 2602B includes emoticons 2606B, wallpaper 2607B and an icon 2608B as personalization items 2605B, which are different than the emoticons 2606A, the wallpaper 2607A, the icon 2608A, and the sound group 2609A of online persona 2602A. The online persona 2602D includes wallpaper 2607D and sound group 2609D as personalization items 2605D. The online persona 2602D represents a default online persona that is used in a chat room when neither of the online personas 2602A or 2602B are projected, as described more fully below. As illustrated, in the example 2600, each online persona may include the same or different types of personalization items. For example, online personas 2602A and 2602B each include emoticons, wallpaper, and an icon, whereas online persona 2602D only includes a wallpaper and sound personalization items.

Online persona 2602A is projected for the user in chat room 2610A. Online persona 2602B is projected for the user both in chat room 2610B and in chat room 2610C. Online persona 2602D is projected for the user in chat room 2610D. For example, online persona 2602A may be a music persona that is projected for the user in a music chat room 2610A. Online persona 2602B may be a sports persona that is projected for the user in a college football chat room 2610B and also in a professional football chat room 2610C. Online persona 2602D may be a persona that includes neutral wallpaper and sounds that are unlikely to disclose personal characteristics or affiliations of the chat user. The default online persona 2602D is projected in chat room 2610D because neither of online persona 2602A or 2602B is associated with chat room 2610D (as show by the dotted line 2612D).

An online persona also may be projected for a user based on a chat room identity and not based on the user's identity. A particular chat room may be configured to project a particular persona, for any user that enters the chat room regardless of any previous associations or "on the fly" selections of a persona made by the user. For example, a gardening chat room may be configured to project a flower icon for any user that enters the chat room. The same may be true for a particular personalization item.

Figure 26B:
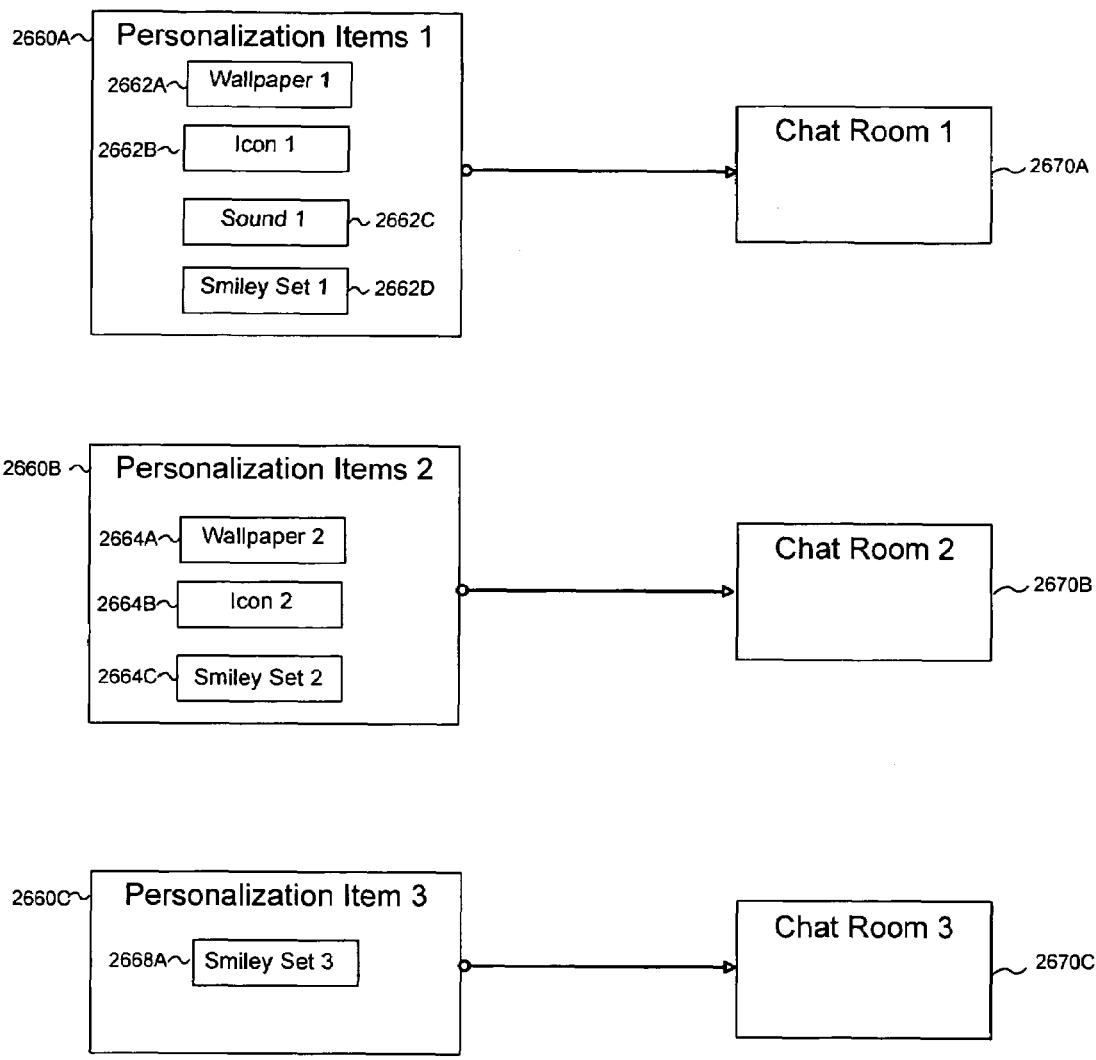
FIG. 26B is a block diagram illustrating relationships between personalization items and chat rooms.

FIG. 26B shows an example 2650 of relationships between chat rooms and online personalization items that are based on the chat room identities, but not a user identity. More particularly, FIG. 26B shows online personalization items 2660A and 2660B, as well as personalization item 2660C, and chat rooms 2670A, 2670B, and 2670C. Personalization items 2660A include wallpaper 2662A, an icon 2662B, a sound group 2662C, and emoticons (e.g., smileys) 2662A. Personalization items 2660B include wallpaper 2664A, an icon 2664B, and emoticons 2606B, which are different than the wallpaper 2662A, icon 2662B, and sound group 2662C, and emoticons 2662D of personalization items 2660A.

Personalization item 2660C includes emoticons 2668A. Personalization items 2660A may be projected when any user enters chat room 2670A. Personalization items 2602B may be projected when any user enters chat room 2670B. Personalization item 2670C may be projected when any user enters chat room 2670C. For example, personalization items 2660A may be related to music, such that the music personalization items may be projected when a user enters a music chat room 2670A. Personalization items 2660B may be related to sports, such that the sports personalization items may be projected when a user enters a football chat room 2670B. Personalization item 2660C may be a smiley set including flowers having faces, such that the smiley set may be projected when a user enters a gardening chat room.

Personalization items 2660A, 2660B, and 2660C may be projected on an individual basis when a user enters chat rooms 2670A, 2670B, and 2670C. Even though individual personalization items may change upon a user entering one of chat rooms 2670A, 2670B, or 2670C, a user's current persona will remain the same. If a user is not currently projecting a persona, no persona will be selected for the user upon entering one of chat rooms 2670A, 2670B, or 2670C. Similarly, if a user is not currently projecting any personalization items, or is currently projecting some, but not other personalization items, upon entering one of chat rooms 2670A, 2670B, or 2670C, personalization items 2670A, 2660B, or 2660C, respectively, may be selected for the user, but no other personalization items may be projected. For example, a user may currently project a football persona including a football helmet icon, wallpaper depicting a football field, and sports-related sounds. The user may then enter a gardening chat room. The trigger of entering the gardening chat room may cause certain personalization items, rather than an entire persona, to be selected for the user. For example, upon entering the gardening chat room, the user may be provided a flower icon and sounds of birds chirping. However, the rest of the user's current football persona will remain unchanged. In another example, a user may not currently project a persona, but may have selected several unrelated personalization items, such as an orange wallpaper, a chocolate-chip cookie icon, and office sounds. The user may then enter the gardening chat room. and be provided with a flower icon and sounds of birds chirping. The user's chocolate-chip cookie icon may change to the flower icon and the user's office sounds may change to sounds of birds chirping. However, the user's orange wallpaper may remain unchanged because a particular wallpaper personalization item has not been associated with the gardening chat room.

A user may choose to override projection of individual personalization items associated only with a chat room identity. In some implementations, a user may override the projection of chat room-specific personalization items "on the fly." In some implementations, before changing one or more of a user's personalization items, the user may be presented with a choice to accept, or reject, the personalization items associated with the chat room in which the user is currently participating. If the user rejects the personalization items, the user's current personalization items may remain unchanged. Additionally, a user may choose to accept some personalization items associated with the chat room, while rejecting others. In some implementations, the user's personalization items may automatically change to the chat room-specific personalization items. However, the user may have an option to reject the change and revert to the user's previous personalization items. In some implementations, a user may elect to always disallow a chat room from changing the user's personalization items. A user may choose this option through general personalization item, or persona, options.

Figure 27:
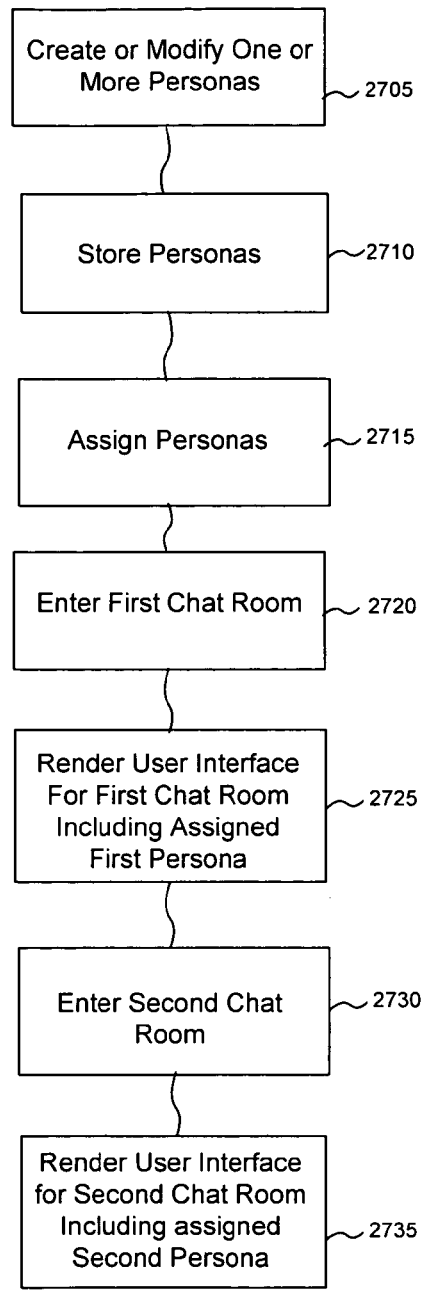
FIG. 27 is a flow chart of an exemplary process that may be implemented by systems such as those in FIGS. 1-4.

FIG. 27 shows an exemplary procedure 2700 to enable a chat user to select an online persona to be made perceivable in a chat room.

The procedure 2700 may be implemented in a client/host context, or a standalone or offline client context. For example, while some functions of procedure 2700 may be performed entirely by the first chat participant system 105, other functions may be performed by host system 110, or the collective operation of the first chat participant system 105 and the host system 110. In procedure 2700, the online persona may be respectively selected and rendered by the standalone/offline device, and the online persona may be accessed or updated through a remote device in a non-client/host environment such as, for example, a LAN server serving an end user or a mainframe serving a terminal device. Thus, the procedure 2700 described below may be implemented for an OSP, ISP, browser and/or other software program having a graphical user interface, such as programs for instant messaging, chat, electronic mail and stand-alone browsers. Moreover, procedure 2700 may be implemented by hardware, software, devices, computers, computer systems, equipment, components, programs, applications, code, or storage media.

Procedure 2700 generally involves creating, selecting and projecting an online persona. The chat user creates or modifies one or more online personas (step 2705).

The one or more personas created or modified are then stored (step 2710). The persona may be stored on the first chat participant system 105, on the chat system 310, or on a different host system 110 such as a host system of an authorized partner.

Next the chat user associates a persona to be projected during future chat sessions based on the identity of a chat communications session (step 2715). The chat user may wish to display different personas when participating in different chat communication sessions depending on the identity of the chat room.

The chat user may assign or otherwise associate a persona to a chat room based on the chat room identity. A chat room identity may be related to a group of chat rooms. For example a chat room identity may be related to a category that descriptively associates a group of chat rooms with similar or related subject matter. Examples of chat room categories include sports, football, travel, and gardening. A chat room created to discuss professional football may have a "sports" or "football" identity.

A chat room identity may be based on the subject matter actually being discussed in the chat room (as opposed to, for example, the subject matter that is expected to be discussed). For example, when the chat conversation in a football chat room turns to gardening, the chat room identity may reflect gardening in addition to, or in lieu of, the chat room identity of football or sports. A user in the chat room may project a different persona based on the gardening identity of the chat room. For example, a persona associated with a gardening chat room identity may be enabled and made perceivable (replacing projection of a sports persona based on the football identity of the chat room) in that chat room when the chat room identity changed from sports to gardening. In some implementations, a chat user may control whether a persona is projected based on a category of chat room or subject matter being discussed in a chat room.

A chat room identity may relate to a chat format employed by the chat room. For example, a chat room may host a question-and-answer session with an expert or celebrity. A chat room with such a format may have a different identity than a chat room identity where users communicate among themselves, even when the subject matter or topic discussed in the chat rooms is the same or substantially the same. Alternatively or additionally, a chat room identity may depend on the type of language allowed in the room, such as whether adult language or risqué comments are permitted.

In one example, a chat user may associate a "sports" persona with chat rooms that have a "sports" identity. To do so, for example, a user may explicitly associate the "sports" persona with a chat room having a "sports" identity. Alternatively or additionally, the "sports" persona may be associated with chat rooms having a "sports" identity based on deriving the identity of the chat room from the chat room title or a category associated with the chat room. When the chat user enters a chat room having a "sports" identity and is associated with the user's hometown football team, the chat users "sports" persona (including, for example, a combination of a sports-related icon or avatar, wallpaper, sounds, and smileys) is enabled and made perceivable to the other chat participants. In another example, a chat user may associate a "risqué" persona with chat rooms having an "adult-theme" identity. Here, when the chat user enters a dating chat room, having an "adult-theme," the chat users "adult" persona is enabled and made perceivable to the other chat participants. In yet another example, a chat user may associate a "gardening" persona (including, for example, gardening related personalization items) with chat rooms related to gardening. When the chat user enters a gardening chat room, the user's "gardening" persona is projected.

In another example, a chat user may associate a persona with a chat room by explicitly selecting a particular chat room. For example, the chat user may specify that upon entering the "football" chat room, his "sports" persona is enabled and made perceivable to the other chat participants.

The chat user may also associate other persona attributes to be made perceivable based upon the occurrence of certain predetermined events or triggers, rather than based on the selection status or identity of a chat room. For example, certain chat rooms may be designated to display certain aspects of a "rainy day" persona if the weather indicates rain at the geographic location of the chat user.

Default priority rules may be implemented to resolve conflicts, or the user may select priority rules to resolve conflicts among personas being projected or among personalization items being projected for an amalgamated persona. For example, a set of default priority rules may resolve conflicts among assigned personas by assigning the highest priority to personas and personalization items of personas assigned on an individual basis, e.g., assigned to particular chat rooms, assigning the next highest priority to assignments of personas and personalization items made on a group basis, e.g., categories of chat rooms, and assigning the lowest priority to assignments of personas and personalization items made on a global basis, e.g., the default persona. However, the user may be given the option to override these default priority rules and assign different priority rules for resolving conflicts.

A chat user may use similar techniques to associate, with a chat room or rooms, one or more personalization items that are not necessarily associated with a persona of the chat user.

Next, the chat user initiates a chat communication session by entering a first chat room (step 2720). The first chat room's user interface is then rendered (step 2725). Rendering the first chat room user interface also includes enabling rendering of the persona the chat user has associated with the first chat room. Enabling the persona to be rendered may include sending the persona from chat host 310 to first chat participant system 105. Alternatively, enabling the persona to be rendered may include receiving and rendering the persona on chat host 310 only. The associated and rendered persona for the first chat room can be seen by other chat room participants when the chat user enters the first chat room.

The chat user may enter a second chat room (step 2730). The chat user may enter the second chat room while present in the first chat room (e.g., the chat room user enters the second chat room without exiting the first chat room). For example, the chat user may enter a gardening chat room and then later, the chat user may enter a football chat room without leaving the gardening chat room.

Relative to the second chat room, a second chat room user interface is rendered and configured to enable rendering of a second persona associated with the second chat room (step 2735). The persona may be projected in a similar manner to that described above with respect to step 2725. However, the persona projected in the second chat room may differ from the persona projected for the chat user in the first chat room. For example, a chat user may participate in the chat rooms at the same time by being present in each of the chat rooms and, a different persona is made perceivable in each chat room.

Figure 28A:
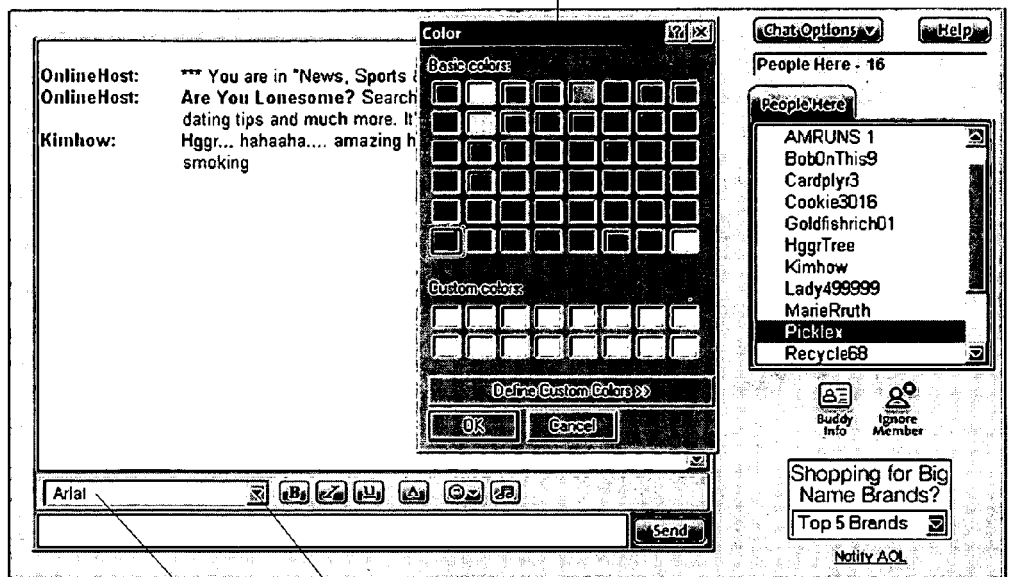
FIGS. 28A, 28B, 29 and 30 are an illustration of different graphical user interfaces that may be implemented by systems such as those in FIGS. 1-4 when executing a process such as that of FIG. 27.

FIG. 28A shows a user interface (UI) 2800 for font 2820 and color 2810 adjustments that a chat user may employ in creating a persona. Specifically, a chat user may use UI 2800 to specify the font and color to be applied to text communicated during a chat communications session in a chat room. The chat user may select text color by accessing color palette 2810 and selecting a color from the color palette 2810.

Figure 28B:
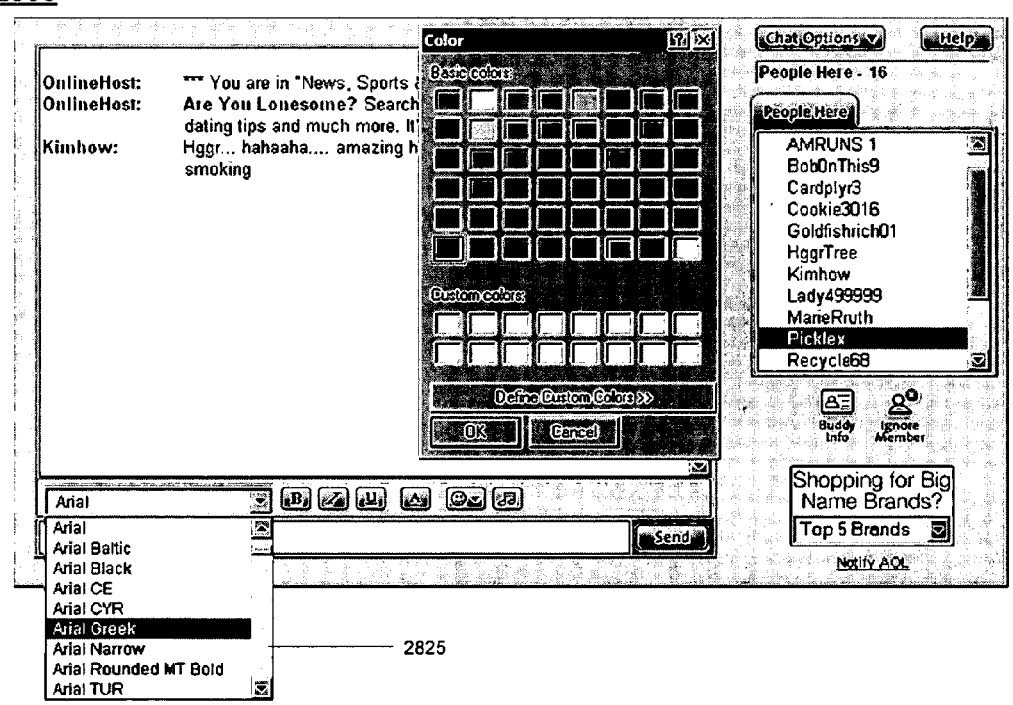

Referring also to FIG. 28B, the chat user may select a font for text by selecting a control 2822 adjacent to the currently selected font name 2820 to cause drop-down menu 2825 of available fonts to appear. The UI 2800 with selection screens 2810 and 2820 may be invoked by user action such as, for example, right clicking on a mouse button or otherwise manipulating a user input device.

The chat user can personalize a chat persona by selecting a font and color for text. Text attributes (such as font, size, and color selections) may be persistently stored or otherwise associated with a persona. This may enable a chat user to project text with attributes in a chat room that is different than the text attributes projected by the user in a different chat room. More particularly, text attributes may be associated with a persona, which in turn, may be associated with a chat room identity.

In one example, when a chat user is communicating in a football chat room, the chat user may select a large, bright red, sans serif font to project that the user is passionate about football. The same chat user may select a small, green, serif font for the chat user's communications in a gardening chat room.

The text attributes that are associated with the persona projected for a chat room are used as a default text style when the chat user enters a chat room having an identity associated with the persona.

Figure 29:
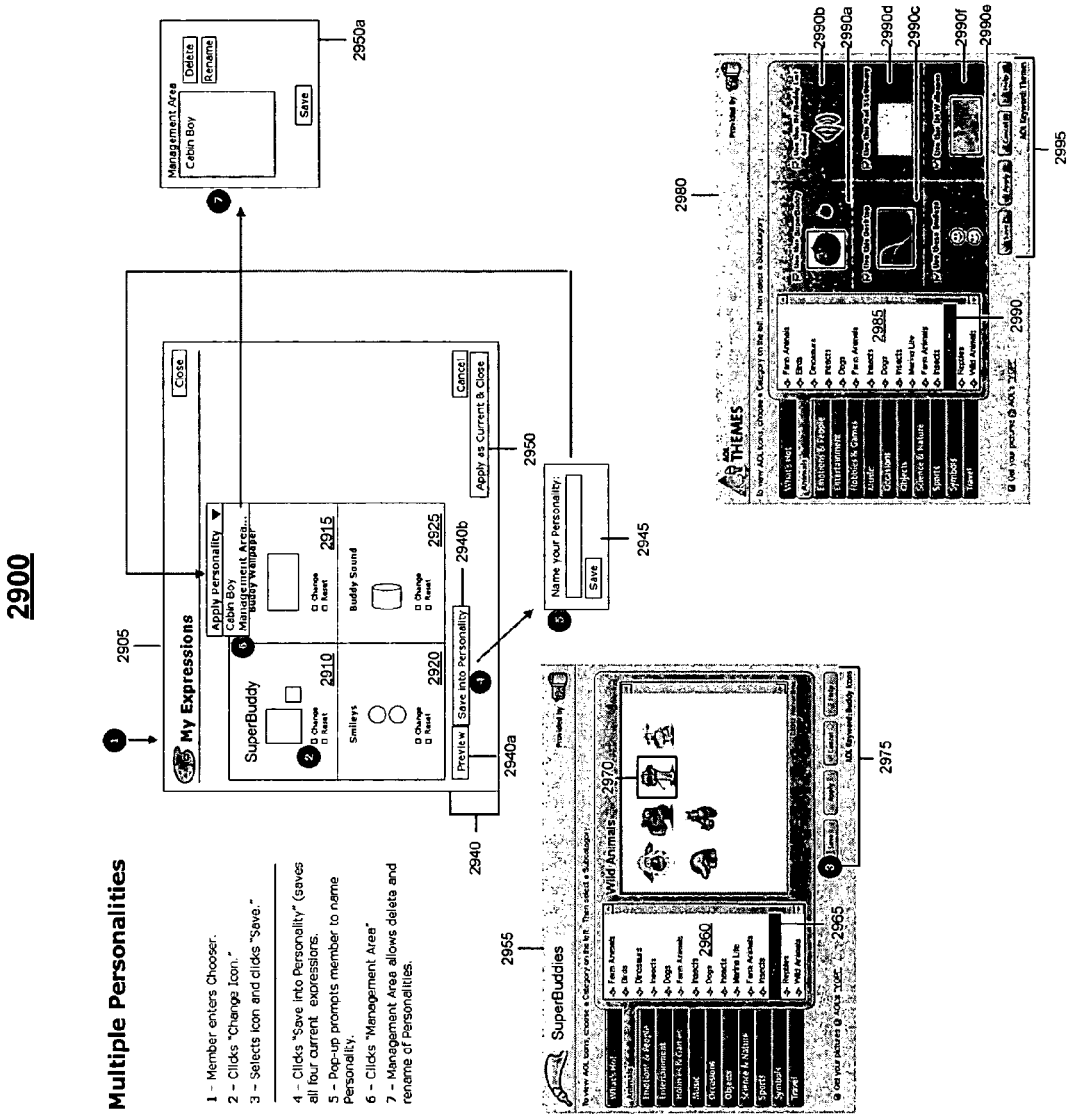

In addition to, or in lieu of, selecting text attributes to create a persona, a chat user may also select one or more personalization items and/or features and functionalities to create a persona. FIG. 29 shows a series 2900 of exemplary U's 2905, 2955, 2980 for enabling a chat user to create and store a persona, and/or select various aspects of the persona such as icons or avatars, wallpaper, sounds, and smileys. As shown, UI 2905 enables a chat user to select a set of one or more personalization items and save the set of personalization items as a persona. The UI 2905 also enables a chat user to review and make changes to a chat persona. For example, the UI 2905 enables a chat user to choose an icon 2910, wallpaper 2915, emoticons 2920, and sounds 2925. A set of controls 2940 is provided to enable the chat user to preview 2940a the profile and to store 2940b the selected personalization items as a persona. The chat user is able to name and store the persona 2945 and then is able to associate the persona 2950 to one or more chat rooms based on the chat room identity or by selecting one or more particular chat rooms.

A management area 2950a is provided to enable the chat user to delete, save, or rename various chat personalities. In choosing the personalization items, other interfaces such as UI 2955 may be displayed to enable the chat user to select the particular personalization items. UI 2955 includes a set of themes 2960 for icons which enables a chat user to select a particular theme 2965 and choose an individual icon 2970 in the selected theme. A set of controls 2975 is provided to assist the chat user in making the selection of personalization items. Also, a chat user may be enabled to choose a pre-determined theme, for example, by using a UI 2980. In UI 2980, the chat user may select various categories 2985 of pre-selected themes and upon selecting a particular category 2990, a set of default pre-selected, personalization items is displayed, 2990a, 2990b, 2990c, 2990d, 2990e, and 2990f. The set may be unchangeable or the chat user may be able to individually change any of the pre-selected personalization items in the set to create an even more personalized persona. A control section 2995 is also provided to enable the chat user to select the themes.

In another implementation, the features or functionality of the chat interface may vary based upon user-selected or pre-selected options for the persona selected or currently in use.

The features or functionality may be transparent to the chat user. For example, when using the "work" persona, all communications taking place in a particular chat room may be encrypted, and a copy may be recorded in a log, or a copy may be forwarded to a designated contact such as an administrative assistant. A warning may be provided to other chat room users that the chat communications are being recorded or viewed by others, as appropriate to the situation. By comparison, if the non-professional "casual" persona is selected, the communications taking place in the chat room may not be recorded or forwarded to a contact designated by the chat user.

In one implementation, the features and functionality associated with the persona is transparent to the chat user, and may be based upon one or more pre-selected profile types when setting up the persona. For example, the chat user may be asked to choose from a group of persona types such as professional, management, informal, vacation, offbeat, etc. In the example above, the "work" persona may have been be set up as a "professional" persona type and the "casual" persona may have been set up as an "informal" persona type. In another implementation, the chat user may individually select the features and functionalities associated with the persona.

An "enterprise mode" may be provided for use with a persona, and the features and functionality associated with the enterprise mode may be established by an employer or its agent, and may vary depending upon the requirements of the environment. For example, where a record of the chat room communications is being maintained, a legal notice may be provided to one or more of the participants in the chat communications, where such notice is necessary or desirable. The enterprise mode may enable functionality such as encryption, recording of the chat communications, and forwarding of the transcript of the chat communications to an administrative assistant.

In one implementation, the chat user may pay a subscription fee to access/use certain personas, and the personas may be provided by a third-party. In another implementation, the personas expire and must be replaced after a predetermined event such as a predetermined length of time, passage of a predetermined date, or a predetermined number of uses. Also, a persona may be banned if, for example, it is deemed to be offensive, inappropriate, or to otherwise violate a term of service agreement. If it is determined that the persona is expired or banned, display of such a persona will be disallowed and the chat user typically will be required to choose a different persona. One or more personalization items may be treated in a substantially similar way.

Default global personas, default group personas, or default personal personas, may be provided, depending on the implementation. For example, if a list of particular chat rooms, or particular categories of chat rooms, is provided as the default chat rooms for the chat user, upon installation of the chat client program a default persona may be provided for whenever the chat user enters one of those chat rooms.

As another example, a default global persona may be provided when the chat client program is installed so that a persona exists for a chat room the chat user enters, regardless of whether the chat user has selected a persona to be presented or has previously associated a particular persona with that chat room. Similarly, a default persona may be provided for any newly joined chat rooms, whether or not a global persona is provided. Additionally, one or more default personalization items (which are not combined into a persona) may exist and be used in a way similar to that described above with respect to default personas.

Features and functionality may be assigned to personas in a similar manner as described with respect to personalization items.

Figure 30:

In another implementation, the chat user may select a persona to be perceivable by other chat room participants at the time the chat user decides to enter a particular chat room. This method for selecting a persona to be displayed in a chat room, "on-the-fly" is available to the chat user as an alternative to associating a persona with chat rooms based on their identity or one or more chat rooms explicitly selected from a list. FIG. 30 shows a chooser UI 3000 that enables the chat user to select among available personalities 3005, 3010, 3015, 3020, 3025, 3030, 3035, 3040, 3045, 3050, and 3055 to be displayed in a chat room in which the chat user is currently participating and communicating. The UI also has a control 3060 to enable the chat user to "snag" the persona of another chat participant, and a control 3065 to review the persona settings currently selected by the chat user. Through the use of the chooser UI 3000, the user may change the persona being projected in the current chat room before entering the chat room or while communicating in the chat room.

Figure 31:
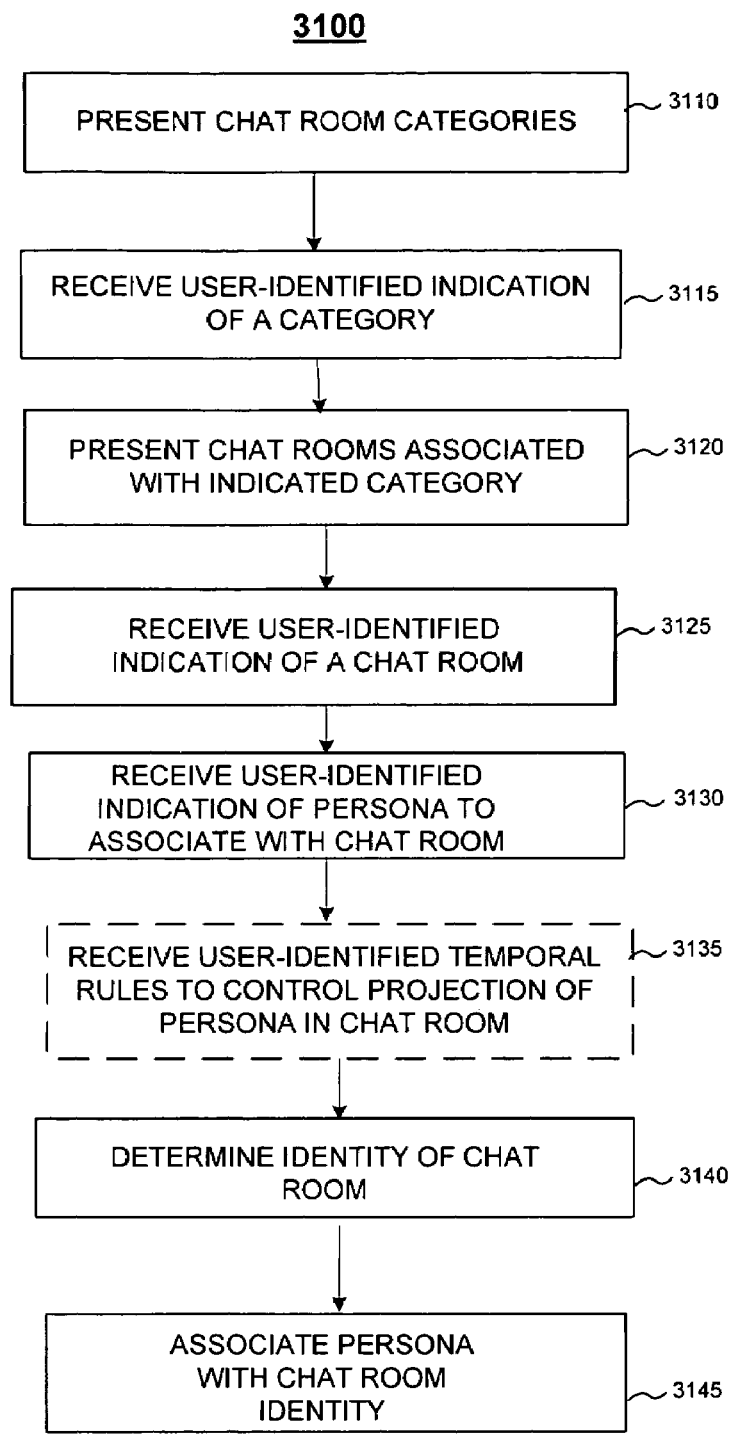
FIGS. 31 and 32 are flow charts of an exemplary process that may be implemented by systems such as those in FIGS. 1-4 when further executing a process such as that of FIG. 27.

FIG. 31 shows an exemplary procedure 3100 for associating a persona with a chat room identity. The procedure 3100 may be used, for example, as a way to implement assigning a persona to a chat room, as described previously with respect to step 2715 of FIG. 27. The procedure 3100 may be performed, for example, by a host system, such as host system 100 of FIG. 1, or a chat participant system, such as chat participant system 105 of FIG. 1. The procedure 3100 may be initiated in response to an indication received from a chat user, such as, for example, a selection by a chat user of a menu item to assign a persona to a chat room identity.

The procedure 3100 begins when the system executing the procedure 3100 presents chat room categories (step 3110). This may be accomplished, for example, by the system displaying on a display device a list of chat room categories. The system receives a user-identified indication of a category (step 3115). For example, the chat user may select a category from the presented categories by entering keyboard input or using a pointing device, such as a mouse, to indicate a category.

The system presents chat rooms that are associated with the indicated category (step 3120). This may be accomplished, for example, by the system displaying on a display device a list of chat rooms that are associated with the indicated category. The system receives a user-identified indication of a chat room (step 3125). For example, the chat user may select a chat room from the presented chat rooms by entering keyboard input or using a pointing device, such as a mouse, to indicate a chat room. In some implementations, a user may indicate multiple chat rooms.

The system receives a user-identified indication of a persona to associate with the indicated chat room (step 3130). This may be accomplished, for example, by enabling a chat user to select a persona from a list of indications of the chat user's personas, such as user interface 3000 of FIG. 30. Additionally or alternatively, a chat user may create a persona to be associated with the identified chat room, as described previously. In some implementations, the system may receive a user-identified temporal rule, or rules, to control the projection of a persona in the chat room (step 3135). This may be accomplished, for example, by display of a calendar and/or a clock to enable a user to identify temporal periods during which the indicated persona should be projected in the identified chat room. For example, the chat user may choose to associate a neutral persona when communicating in a chat room during work hours, but associate a risqué or aggressive persona when communicating in a chat room after 5:00 PM. Further by way of example, the chat user may select a "football" persona to be associated with all chat rooms on Sundays and Mondays during football season.

The system determines an identity of the indicated chat room (step 3140). To do so, for example, the system may use a category associated with the chat room as the identity or may look-up an identity based on the title or identifier of the chat room. More particularly, when a chat room identity is to be derived from the category associated with the chat room, the identity may be the category. For example, a chat room that appears in a "sports" category may have a "sports" identity. A chat room within the "sports" category may have other additional and/or different identities not necessarily based on the category of the chat room. For example, a "football" chat room selected by the chat user may have identities of a "sports" chat room, a "football" chat room, a "professional football" chat room and a "user format" chat room. A "user format" chat room describes a chat room format in which users communicate among themselves, as opposed to a question-and-answer chat room format where perhaps an expert or celebrity interacts with other chat room participants.

In some implementations, the identity of a chat room may be determined based on the subject matter being discussed in the chat room. In such a case, the system may determine the identity of the chat room by determining the subject matter discussed in the chat room during the execution of procedure 3100, though this need not necessarily be so.

The system stores an association between the chat room identity and the indicated chat user persona (step 3165). This enables the persona to be automatically rendered when the chat user enters a chat room having the associated identity.

The procedure 3100 determines a chat room identity to be associated with a chat user persona based on a category of chat rooms and a particular chat room. Other methods to associate a persona and chat room identity may also be used. For example, a chat user may select one or more chat room identities from a list of presented identities. In another example, some implementations may indirectly associate a chat room with a category by using sub-categories to further describe a category. In such a case, a sub-category may be used to determine a chat room identity in addition to, or in lieu of, a category associated with the chat room. In yet another example, a chat user may identify multiple chat rooms that are from the same category or different categories. In still another example, a chat user may select a category, or perhaps a sub-category, of chat rooms as a proxy, surrogate or other type of indication, to help the system determine a chat identity to be associated with a chat user persona. The concepts and techniques described with respect to procedure 3100 also may be used to associate multiple chat user personas with a chat room identity.

Figure 32:
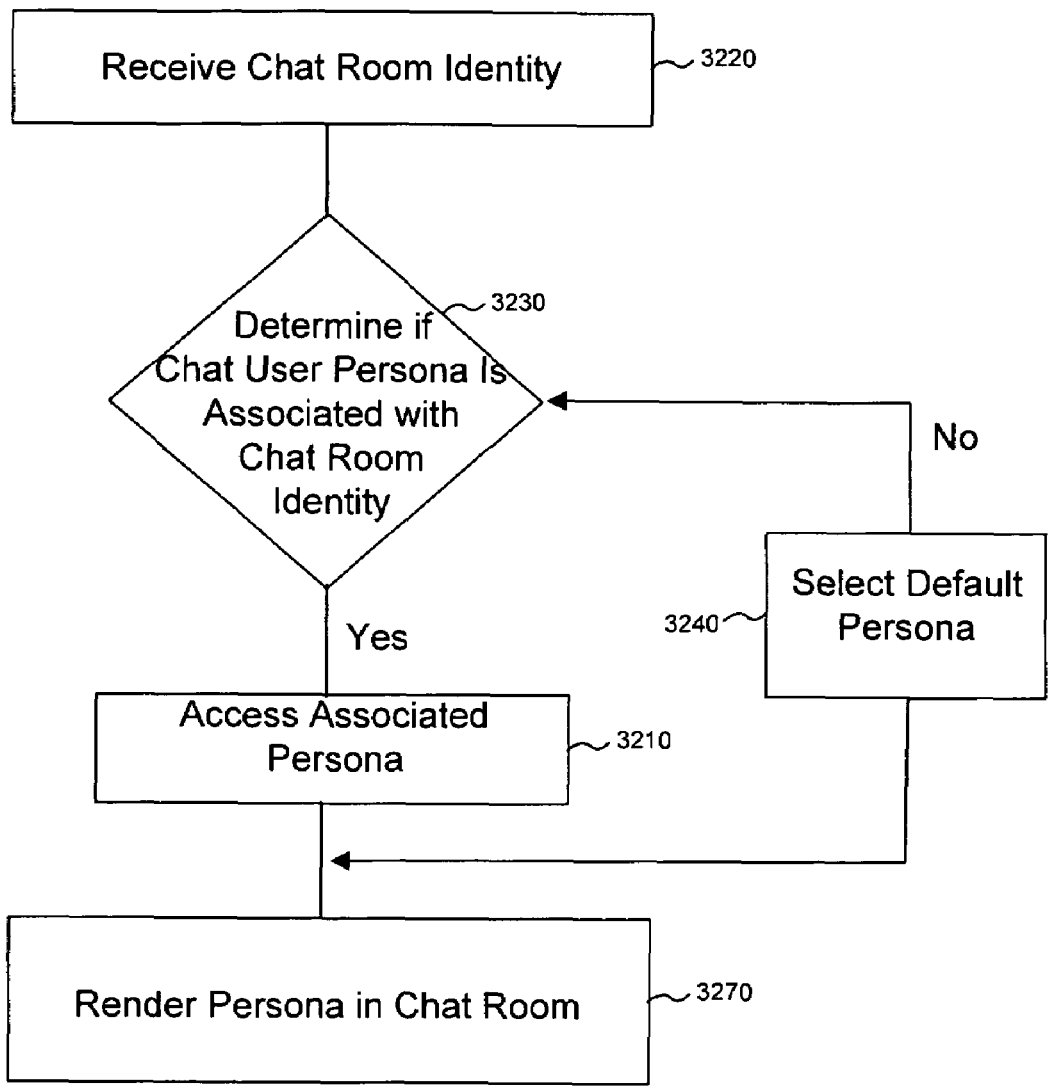

FIG. 32 shows an exemplary procedure 3200 for rendering the user interface for a chat room that includes projecting a chat user persona associated with an identity of the chat room. The procedure 3200 may be used, for example, as a way of rendering a user interface for a first or second chat room and projecting a first or second chat user persona associated with an identity of the first or second chat room, as described previously with respect to step 2725 or step 2735, both of FIG. 27. The procedure 3200 may be performed, for example, by a host system, such as host system 100 of FIG. 1, or a chat participant system, such as chat participant system 105 of FIG. 1. The procedure 3200 may be initiated, in response to an indication received from a chat user to enter a chat room.

The procedure 3200 begins when the identity of a chat room is received in response to an indication received from a chat user to enter the chat room (step 3220). This may be accomplished, for example, by receiving an identity that is associated with the particular chat room, a category associated with the particular chat room, or by determining the subject matter being discussed in the chat room.

The system determines if a persona is associated with the received chat room identity (step 3230). This may be accomplished, for example, by determining whether an association of a persona of the chat user and the received chat room identity is stored. When a persona is associated with the received chat room identity, the system accesses the associated persona (step 3250). For example, the associated persona may be accessed from a storage medium or memory.

When a persona is not associated with the chat room identity received, the system selects a default persona for the chat user to project. Additionally or alternatively, the chat user may be presented with a user interface prompting the chat user to associate an existing persona, or create a new persona to be associated, with the chat room identity. In one implementation, if the chat user does not select or create a persona to associate with the chat room identity presented, then the chat user's default persona will be associated with those identities. Additionally, because a particular chat room may have more than one identity, the chat user optionally may select or create one persona to be associated with all of the chat room identities presented, some of the chat room identities presented, or only one of the chat room identity presented. Furthermore, a chat user may select or create different personas to be associated with one or more of the different chat room identities presented. Alternatively, the chat user's default persona may be rendered for use only in the particular chat communication session.

The system then enables the persona to be rendered in the chat room (step 3260). This may be accomplished as described previously.

As described in FIG. 32, a persona (and/or one or more personalization items) may be automatically provided for a user when the user enters a chat room having an identity with which the user has previously associated a persona or one or more individual personalization items. In this way, personalization items may be directly or indirectly selected. Direct selection of personalization items includes individual personalization items being selected upon entering a particular chat room, as discussed below. Whereas in indirect selection of personalization items, an entire group of personalization items, organized as a persona, are selected upon entering a particular chat room.

An entire persona may be automatically provided for a user when the user enters a chat room having an identity with which the user has previously associated the persona. For example, a user may currently project a football persona including a football helmet icon, wallpaper depicting a football field, and sports-related sounds. However, the user's persona, and thus the individual personalization items associated with the persona, may change when the user enters a chat room having a different one of the user's personas associated with the chat room. For example, a user may enter a gardening chat room, with which the user has previously associated the user's gardening personality, including a watering can icon, flower wallpaper, and a sunshine smiley set. The gardening persona may be selected upon entering the gardening chat room, such that the user's current football personalization items may automatically be changed to the personalization items associated with the user's gardening persona. This is an example of an indirect selection of personalization items. Each individual personalization item related to the gardening persona is not selected for projection by the user, but rather, due to the trigger of entering the gardening chat room, with which the user has previously associated the gardening persona, the user's personalization items change, as a group, from football personalization items to gardening personalization items.

Instead of automatically selecting an entire persona when a user enters a particular chat room, only one or more individual personalization items may be selected when the user enters the chat room. If a user is currently projecting a persona, upon entering a particular chat room, individual personalization items may be selected for the user, but the user's entire persona will remain the same. If the user is not currently projecting a persona, individual personalization items still may be selected for the user, but no persona will be selected for the user. For example, a user may currently project a football persona including a football helmet icon, wallpaper depicting a football field, and sports-related sounds. The user may then enter a gardening chat room. The trigger of entering the gardening chat room may cause certain personalization items, rather than an entire persona, to be selected for the user. For example, upon entering the gardening chat room, the user may be provided a flower icon. However, the rest of the user's current football persona will remain unchanged. This is an example of a direct selection of personalization items. One or more individual personalization items are changed directly based on the trigger of entering a particular chat room.

It will be understood that although the above description of the techniques generally address associating and rendering a persona during a chat communication session in a chat room, the same, or substantially similar, techniques may be used for associating and rendering one or more personalization items (such as an icon or avatar, wallpaper, sounds and/or smileys) that are not grouped and stored as part of a persona.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. As another example, a screen name is used throughout to represent a unique identity of an account, but any other unique identity of an account may be used when linking accounts. Accordingly, other implementations are within the scope of the following claims. For example, one identity could correspond to a group of personalization items, or a personalization item could have more than one identity. As a further example, although the examples above are given in a chat message context, other communications systems with similar attributes may be used. For example, personalization items may be used in a chat room or in e-mail communications. Also, the user interface may be a viewable interface, an audible interface, a tactile interface, or any combination of these.

What is claimed is:

1. A method, performed at least partially on a computer, for making a personalization item perceivable to an online identity, the method comprising:
   accessing an indication of a chat room in which an online identity is configured to participate;
   making one or more selected personalization items available for perception by a computer user corresponding to the online identity during their participation in the chat room; and
   changing at least some of the personalization items being made available for perception by a computer user corresponding to the online identity based on triggers indicating changes to the chat room with which the online identity is configured to participate.

2. The method of claim 1, wherein the indication of the chat room in which an online identity is configured to participate is accessed prior to entry by the online identity into the chat room indicated.

3. The method of claim 1, wherein the indication of the chat room in which an online identity is configured to participate is accessed after entry by the online identity into the chat room indicated.

4. The method of claim 1, wherein making selected personalization items available for perception by the online identity includes:
   using the chat room in which the online identity is configured to participate as a basis upon which to select the personalization items to be made available;
   selecting the personalization items to be presented to the online identity during participation by the online identity within the chat room; and
   presenting the selected personalization items to the computer user corresponding to the online identity.

5. The method of 4, further comprising enabling selection, by the online identity, of the personalization items presented to the online identity.

6. The method of claim 4, wherein selection of the personalization items includes indirect selection through a selection among more than one selectable online personas, wherein the selectable online personas are associated with different combinations of personalization items.

7. The method of claim 6, wherein selection among more than one selectable online personas includes selection among online personas associated with different sets of personalization items.

8. The method of claim 6, wherein selection among more than one selectable online personas includes selection among online personas associated with at least one different configuration for a common same set of personalization items.

9. The method of claim 4, wherein the selection of at least one personalization item is made directly by comparing the chat room to an attribute of the personalization item that associates the personalization item itself to the chat room.

10. The method of claim 4, wherein selection of the personalization items includes selection among more than one selectable graphical personas corresponding to the online identity.

11. The method of claim 10, wherein the graphical persona is animated.

12. The method of claim 10, wherein selection of the personalization items includes selection among more than one perceivable attribute of a graphical persona corresponding to the online identity.

13. The method of claim 12, wherein the perceivable attributes include at least one of color, dimension, and type.

14. The method of claim 4, wherein selection of the personalization items includes selection among more than one perceivable accessory for a graphical persona corresponding to the online identity, where the accessory includes at least one of clothing or object displayed in association with the graphical persona.

15. The method of claim 4, wherein selection of the personalization items includes selection among more than one selectable sounds, emoticons, and text attributes to be presented to the online identity during participation by the online identity within the chat room.

16. The method of claim 4, wherein using the chat room in which the online identity is configured to participate as a basis upon which to select the personalization items to be made available comprises:
   identifying an attribute of the chat room in which the online identity is configured to participate;
   comparing the identified attribute with a collection of chat room attributes; and
   selecting at least one personalization item based on results of comparison of the identified attribute with the collection of chat room attributes.

17. The method of claim 16, wherein identifying the attribute of the chat room includes identifying the chat room name.

18. The method of claim 16, wherein identifying the attribute of the chat room includes identifying the chat room subject matter.

19. The method of claim 16, wherein identifying the attribute of the chat room includes identifying a category of the chat room.

20. The method of claim 16, wherein identifying the attribute of the chat room includes analyzing chat room communications.

21. The method of claim 16, wherein identifying the attribute of the chat room includes analyzing attributes of participants of the chat room.

22. The method of claim 4, wherein using the chat room in which the online identity is configured to participate as a basis upon which to select the personalization items to be made available comprises:

identifying a state of activity within the chat room in which the online identity is configured to participate;

comparing the identified state of activity with a collection of potential chat room activity states; and selecting at least one personalization item based on results of comparison of the identified state of activity with the collection of potential chat room activity states.

23. The method of claim 22, wherein the state of activity is identified by determining that the state of activity within the chat room visited by the online identity has changed.

24. The method of claim 4, wherein using the chat room in which the online identity is configured to participate as a basis upon which to select the personalization items to be made available comprises:

identifying a transition by the online identity into or from a chat room;

comparing the identified transition with a collection of potential chat room transitions; and selecting at least one personalization item based on results of comparison of the identified transition with the collection of potential chat room transitions.

25. The method of claim 24, wherein the transition is identified by determining that the online identity enters or leaves a chat room.

26. The method of claim 24, wherein the transition is identified by determining that the online identity has transitioned from one particular chat room to another particular chat room.

27. The method of claim 1, wherein making one or more selected personalization items available for perception by a computer user includes suppressing a personalization item.

28. The method of claim 1, wherein triggers indicating changes to the chat room with which the online identity is configured to participate include transitions in chat room.

29. The method of claim 1, wherein triggers indicating changes to the chat room with which the online identity is configured to participate include at least one of content, participants, and attributes of the chat room.

* * * * *